(12) United States Patent
Chou et al.

(10) Patent No.: US 10,524,246 B2
(45) Date of Patent: Dec. 31, 2019

(54) TWO-STAGE DOWNLINK CONTROL INFORMATION CONFIGURATIONS FOR BEAM OPERATION

(71) Applicant: FG INNOVATION COMPANY LIMITED, Tuen Mun OT (CN)

(72) Inventors: Chie-Ming Chou, Zhubei (TW); Yu-Hsin Cheng, Hsinchu (TW)

(73) Assignee: FG INNOVATION COMPANY LIMITED, Tuen Mun, New Territories (HK)

( * ) Notice: Subject to any disclaimer, the term of this patent is extended or adjusted under 35 U.S.C. 154(b) by 9 days.

(21) Appl. No.: 15/871,127

(22) Filed: Jan. 15, 2018

(65) Prior Publication Data
US 2018/0227886 A1    Aug. 9, 2018

Related U.S. Application Data

(60) Provisional application No. 62/446,496, filed on Jan. 15, 2017.

(51) Int. Cl.
   *H04W 72/04* (2009.01)
   *H04B 7/06* (2006.01)
   *H04B 7/024* (2017.01)

(52) U.S. Cl.
   CPC ........ *H04W 72/042* (2013.01); *H04B 7/0695* (2013.01); *H04W 72/046* (2013.01); *H04B 7/024* (2013.01); *Y02D 70/00* (2018.01); *Y02D 70/10* (2018.01); *Y02D 70/12* (2018.01); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/146* (2018.01); *Y02D 70/20* (2018.01); *Y02D 70/21* (2018.01); *Y02D 70/26* (2018.01)

(58) Field of Classification Search
   CPC .............. H04W 72/042; H04W 72/046; H04B 7/0695; Y02D 70/12
   See application file for complete search history.

(56) References Cited

U.S. PATENT DOCUMENTS

| | | | | |
|---|---|---|---|---|
| 2013/0286960 | A1* | 10/2013 | Li | H04W 72/042 370/329 |
| 2015/0358064 | A1* | 12/2015 | Benjebbour | H04B 7/0452 370/329 |
| 2016/0337916 | A1* | 11/2016 | Deenoo | H04W 8/22 |
| 2018/0048375 | A1* | 2/2018 | Guo | H04B 7/088 |

* cited by examiner

*Primary Examiner* — Mohammad S Anwar
(74) *Attorney, Agent, or Firm* — ScienBiziP, P.C.

(57) ABSTRACT

A method of communicating downlink control information (DCI) from a transmit/receipt point (TRP) to a user equipment (UE) is disclosed. The method includes transmitting a first stage DCI and a reference signal (RS) by a coarse beam; transmitting a second stage DCI by a refine beam; where the first stage DCI includes information of the second stage DCI.

28 Claims, 40 Drawing Sheets

TWO-STAGE DOWNLINK CONTROL INFORMATION CONFIGURATIONS FOR BEAM OPERATION

CROSS-REFERENCE TO RELATED APPLICATION(S)

The present application claims the benefit of and priority to a provisional U.S. Patent Application Ser. No. 62/446,496 filed Jan. 15, 2017, entitled "TWO-STAGE DOWNLINK CONTROL INFORMATION FORMATS FOR BEAM OPERATION," (hereinafter referred to as "US61790 application"). The disclosure of the US61790 application is hereby incorporated fully by reference into the present application.

TECHNICAL FIELD

The present disclosure generally relates to wireless communication, and more particularly, to methods for reducing control channel overhead and transmission latency, and increasing power savings of user equipment using two-stage downlink control information (DCI) formats/configurations in a wireless network.

BACKGROUND

The 3$^{rd}$ Generation Partnership Project (3GPP) is developing the architecture and protocols for the next generation (e.g., 5$^{th}$ Generation (5G)) wireless communication networks (e.g., new radio (NR)). An NR network strives to deliver sub-millisecond latency and at least 1 Gbps (e.g., 10 Gbps) downlink speed, and support billions of connections. In comparison, a 4$^{th}$ Generation (4G) wireless network, such as a legacy long-term-evolution (LTE) network, can support at most 150 Mbps downlink speed with a single carrier. Thus, an NR network may have a system capacity that is 1000 times of the capacity of the current 4G wireless network. To meet these technical requirements, the NR exploits higher frequencies of the radio spectrum in the millimeter wave range (e.g., 1 to 300 GHz) which can provide greater bandwidth.

Extensive studies have been focused on millimeter wave, directional antenna, and beamforming technologies, which are imperative to meet the anticipated 1000 times system capacity for the NR requirements. For example, millimeter wave components such as antenna array elements are found suitable for multiple spatial streams, beamforming and beam steering. However, due to high path loss of the millimeter waves, high gain directional antennas and beamforming methods need to be carefully designed to support transmission in the millimeter wave frequency range (e.g., 1 to 300 GHz). Antenna arrays having hundreds or thousands of antenna elements may be used for beamforming to reduce the high path loss of the millimeter waves. Since the number of beamforming precoding matrices is proportional to the number of antenna elements, the processing time for beam sweeping may become unbearably long. Thus, group-based beamforming precoding matrices are introduced to reduce the processing time. The beamforming precoding matrix can be separated into two categories, namely, coarse beams and refine beams. The beam-widths of the coarse beams are larger than the beam-widths of the refine beam. It is noted that the coverage area of a refine beam may be overlapped with the coverage area of a coarse beam. Each coarse beam may contain several refine beams. The refine beams may be grouped into different coarse beam groups because the refine beam direction or transmission path can be covered by the corresponding coarse beam. Coarse beam information may be visible with longer period than refine beam information. For example, the coarse beam index is a long term parameter and the refine beam index is a short term parameter.

In a 4G wireless network, such as a legacy LTE network, Downlink Control Information (DCI) is used to carry control information (e.g., such as scheduling of downlink (DL) and uplink (UL) transmission, Channel State Information (CSI) report format, and hybrid auto repeat request (HARM), and etc.) from a base station to user equipment (UE). There are several DCI configurations for carrying different information. The UE can determine the DCI configurations received from the base station based upon transmission mode (TM) and radio network temporary identifier (RNTI). That is, in the legacy LTE network, the UE would blindly decode the DCI from the base station without any knowledge of which TM and/or RNTI the DCI currently uses.

As the DCI may be composed of different numbers of control channel elements (CCEs), it may undesirably take a long time for blind decoding the DCI in the legacy LTE system. FIG. 1A illustrates a frame structure having CCEs 102 and resource elements (REs) 104 carried by a physical downlink control channel (PDCCH) 106. FIG. 1B illustrates a blind decoding process in which a UE blindly searches through different CCEs and aggregation levels (ALs) to decode the DCI. Such blind decoding process is both time consuming and power inefficient.

As the 3GPP is working on the basics of 5G NR standardization, a two-stage (or two-level) DCI format/configuration design has recently been proposed for transmitting control signals. However, the details of the two-stage DCI configuration have not yet been discussed extensively.

Thus, there is a need in the art for methods for reducing control channel overhead and transmission latency, and improve power efficiency in a wireless network using two-stage DCI formats/configurations.

SUMMARY

The present application is directed to two-stage downlink control information configurations for beam operation.

DETAILED DESCRIPTION

Figure 1B:
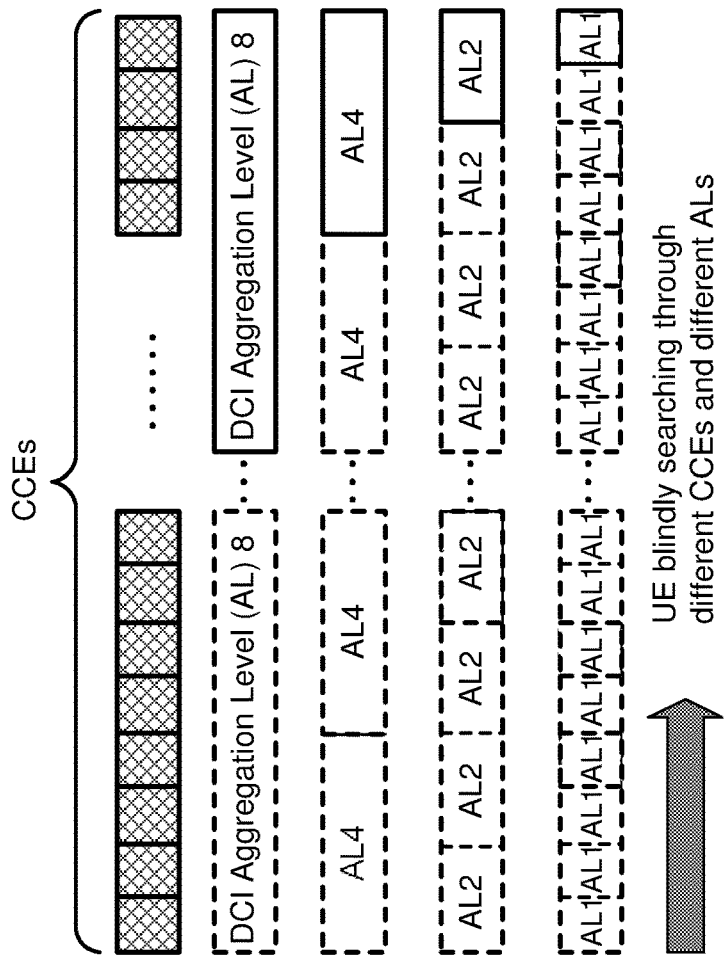
FIG. 1B illustrates a blind decoding process in which a UE blindly searches through different CCEs and aggregation levels to decode the DCI.
Figure 1A:
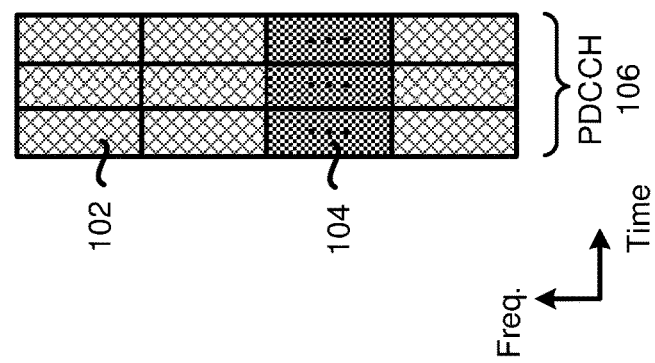
FIG. 1A illustrates a frame structure having CCEs and resource elements (REs) carried by a PDCCH.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present application may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in the present application are oriented to software installed and executing on computer hardware, nevertheless, alternative exemplary implementations implemented as firmware or as hardware or combination of hardware and software are well within the scope of the present application.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

The present application provides a method for signaling RAN parameters adopting a RAN profile indexing mechanism to facilitate the transmission and reception operations, where the RAN profile indices correspond to the physical layer compositions between a cell in a radio access network and at least one mobile station (e.g., a UE). By using the indexing mechanism to indicate the RAN profile information, the amount of signaling overhead and latency incurred for RAN profile may be greatly reduced, while supporting the flexibility of NR network system.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access (E-UTRA) network, a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A TRP (e.g., HF-TRP or LF-TRP), which is also be regarded as a remote radio head (RRH), may be a transceiver under the protocols of 5G NR wireless communication system and/or the protocols of a 4G wireless communication system. A TRP may be communicatively connected to a base station, which may be, but not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through one or more TRPs in the radio communication system.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage indicated by 3GPP TS 36.300, which is hereby also incorporated by reference. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC) more efficiently, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, three candidate coding schemes are considered for NR: (1) low-density parity-check (LDPC), (2) Polar Code, and (3) Turbo Code. The coding scheme adaption may be configured based on the channel conditions and/or the service applications.

Moreover, it is also considered that in a transmission time interval $T_x$ of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR.

According to implementations of the present application, a two-stage DCI configuration may include a first stage DCI having time critical information, such as broadcast information and acknowledgment/negative-acknowledgment (ACK/NACK) for uplink (UL) transmission, and a second stage DCI having the remaining control information. The resource allocation of the second stage DCI may be indicated by the first stage DCI.

Figure 2A:
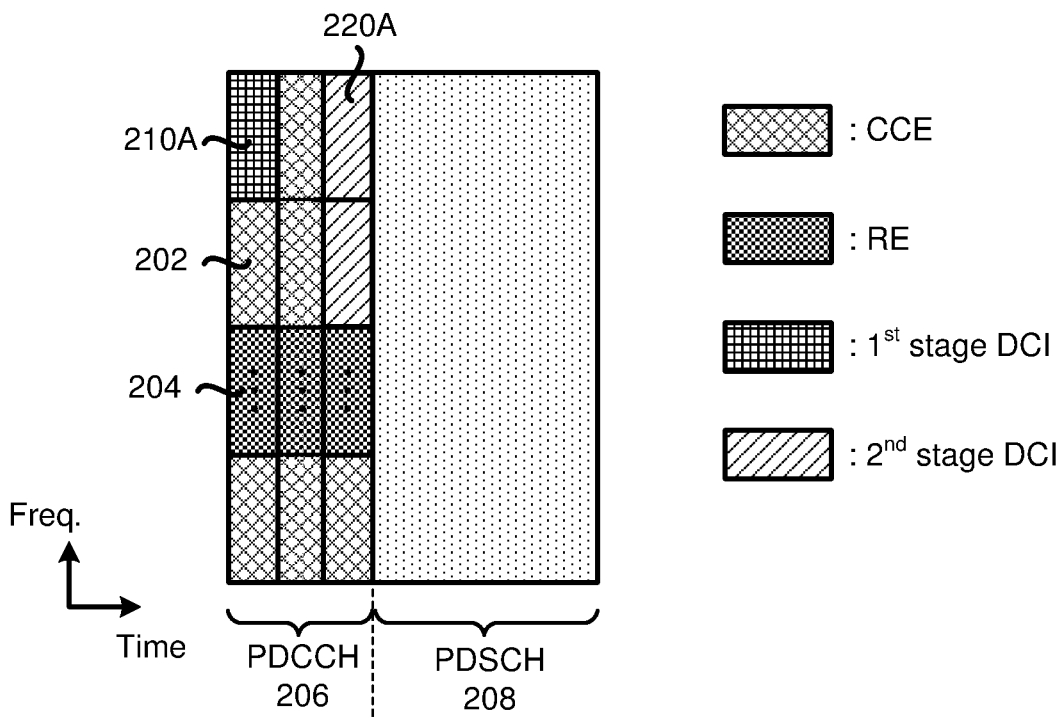
FIGS. 2A and 2B illustrate exemplary frame structures of two-stage DCI configurations, in accordance with exemplary implementations of the present application.
Figure 2B:
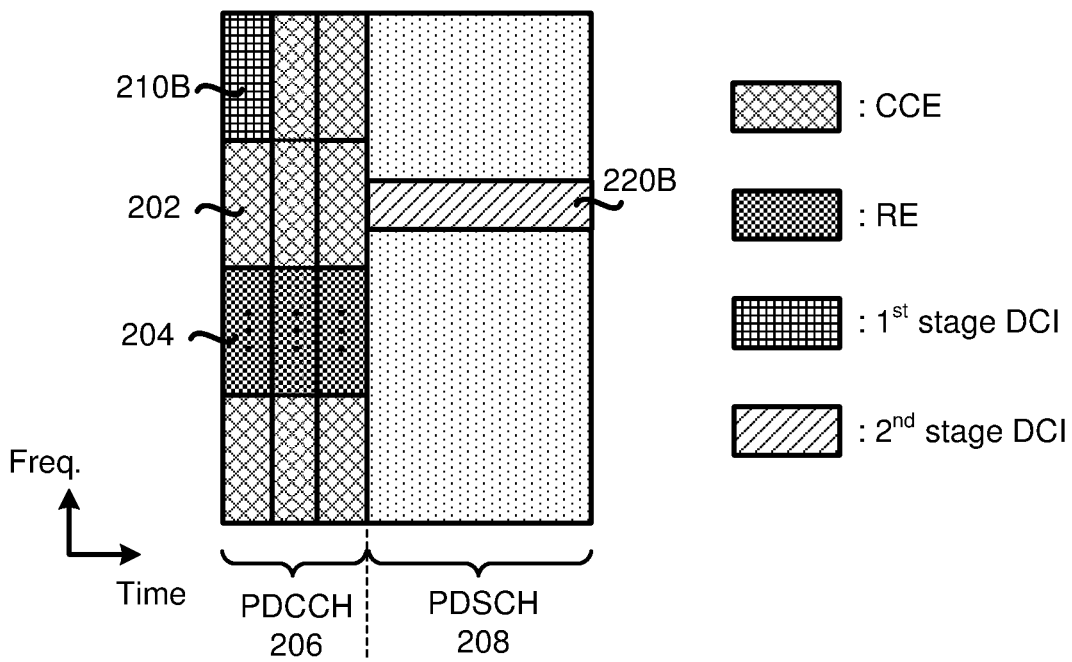

FIGS. 2A and 2B illustrate exemplary frame structures of two-stage DCI configurations, in accordance with exemplary implementations of the present application. In FIG. 2A, in one implementation, CCEs 202 and REs 204 are carried by PDCCH 206. First stage DCI 210A is in a resource (e.g., a CCE) carried by PDCCH 206. Second stage DCI 220A is in a later resource (e.g., another CCE) also carried by PDCCH 206. It is noted that physical downlink shared channel (PDSCH) 208 in FIG. 2A is not used to carry first stage DCI 210A or second stage DCI 220A, but may be used to subsequently transmit control information and/or data, for example. In FIG. 2B, in one implementation, CCEs 202 and REs 204 are carried by PDCCH 206. First stage DCI 210B is in a resource (e.g., a CCE) carried by PDCCH 206, while second stage DCI 220B is in a later resource carried by PDSCH 208.

Among other advantages, by using the two-stage DCI configurations as shown in FIGS. 2A and 2B, the resource allocation of the second stage DCI may be indicated to the UE in advance by the first stage DCI. Therefore, the processing time of detecting the first and second stage DCI can be reduced. Also, the first stage DCI can be transmitted by a coarse beam for easy detection, and the second stage DCI can be transmitted by a refine beam for spectral efficiency. For time critical service like URLLC, the control information may be transmitted by the first stage DCI.

A two-stage DCI configuration, in accordance with an implantation of the present application, may include a first stage common DCI precoded and/or transmitted by beams formed by one or more coarse beamforming precoding matrices, and a second stage DCI precoded and/or transmitted by beams formed by one or more refine beamforming precoding matrices. The first stage DCI may be precoded with common PDCCH reference signals (RSs), and contain information of the second stage DCI. The second stage DCI may be either UE-specific or beam-specific. A UE-specific second stage DCI may be precoded with information of the resource allocation of a front-load RS. The UE-specific second stage DCI can reduce the transmit frequency of a demodulation reference signal (DMRS), which may result in better capacity (more resources for real/actual data). A beam-specific second stage DCI may be precoded with common PDCCH RS, which is transmitted by one or more refine beamforming precoding matrices. The beam-specific second stage DCI can reduce the frequency and/or time granularity of the common PDCCH RS(s). Moreover, the two-stage DCI configurations, in accordance with exemplary implementations of the present application, can also improve radio resource management (RRM) in RRC Idle state, RRC Connected state, and other new RRC states in an NR network.

Figure 3:
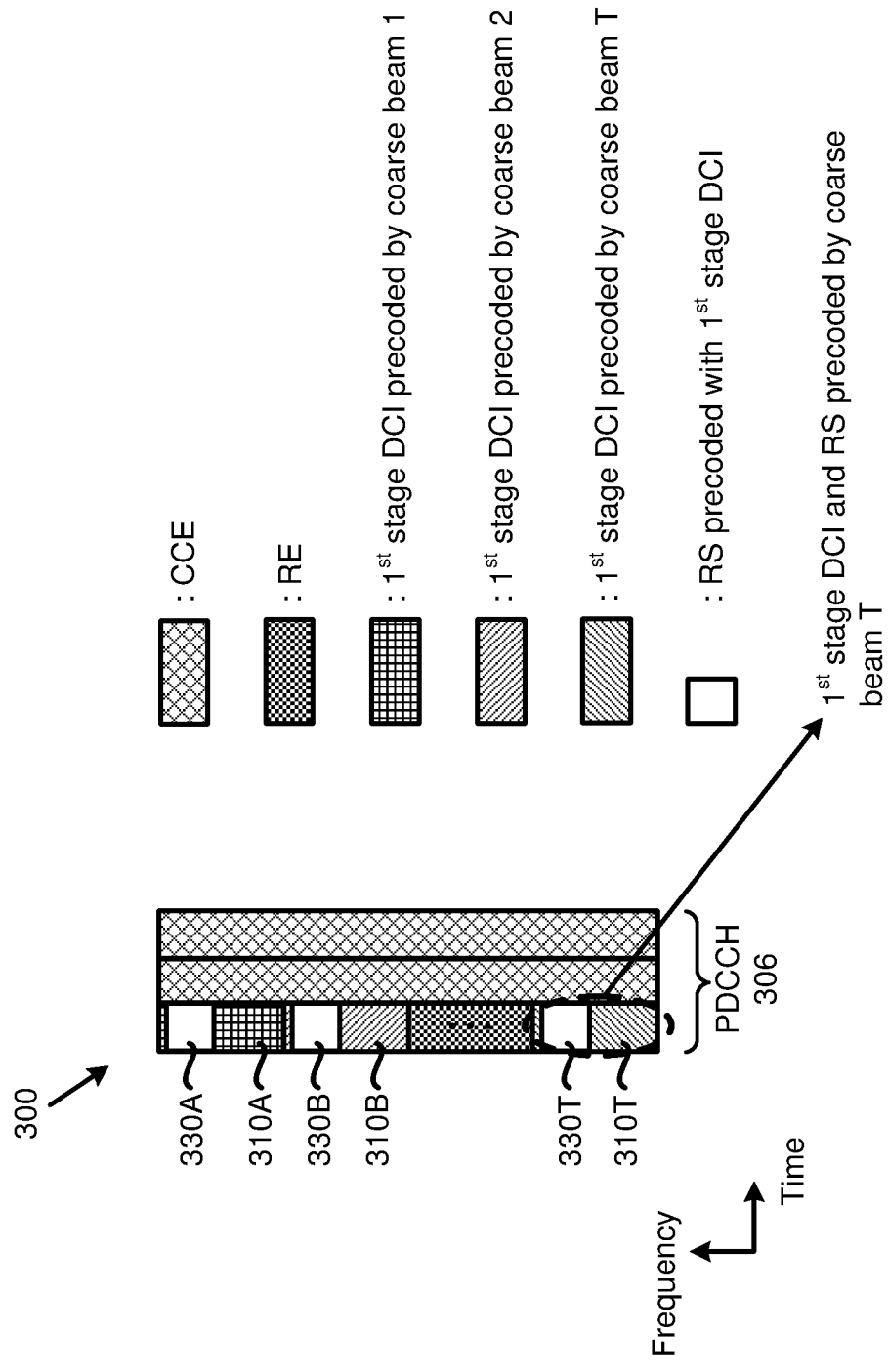
FIG. 3 illustrates an exemplary frame structure of a first stage DCI configuration, in accordance with an exemplary implementation of the present application.

FIG. 3 illustrates an exemplary frame structure of a first stage DCI configuration, in accordance with an exemplary implementation of the present application. In FIG. 3, frame structure 300 includes first stage DCIs transmitted by coarse beams in PDCCH 306, for example, from a transmission reception point (TRP) of a base station (e.g., gNB) to a UE. In addition, each of the first stage DCIs may include a reference signal (RS) which is precoded by a corresponding coarse beam together with a corresponding first stage DCI, for example, in the same control channel resource location or region. For example, RS 330A is precoded by coarse beam 1 together with first stage DCI 310A; RS 330B is precoded by coarse beam 2 together with first stage DCI 310B; RS 330T is precoded by coarse beam T together with first stage DCI 310T.

In one implementation, the first stage DCI configuration 300 may be a common DCI, such that every UE may decode the first stage DCI if necessary. Also, the reference signals precoded by the corresponding coarse beams together with the corresponding first stage DCIs can be used to perform coarse beam radio resource management (RRM) by one or more UEs. The first stage DCI may also contain information of the second stage DCI. Since the second stage DCI may be transmitted in one or more refine beams, the first stage DCI may contain refine beam information to help UEs detect and/or receive the second stage DCI. The first stage DCI may contain at least one of the following parameters:

a beam index (e.g., a coarse beam index);
a number of antenna ports for refine beams;
a format/configuration of the second stage DCI (e.g., beam-specific/UE-specific) where:
for a beam-specific second stage DCI, the first stage DCI may contain the information of the refine beam. The information may contain at least one refine beam index with respective resource allocation;
for UE-specific second stage DCI, the information may only contain a specific refine beam index and the resource allocation for that particular refine beam;
if the second stage DCI does not contain refine beam information, UE may perform blind decoding to search for a DMRS in the data channel.

It should be noted that, in one implementation, a beam index may include an index of RS which indicates a specific beam direction in which the beam is transmitted, so that and UE may know which beam is used upon receiving the index of RS. For example, a synchronization signal block (SSB) index may be regarded as an example of a beam index. A beam index may also refer to a Transmission Configuration Indication (TCI) which indicates the quasi co-location (QCL) relationship of the RS precoded and transmitted with the first stage DCI.

Figure 4:
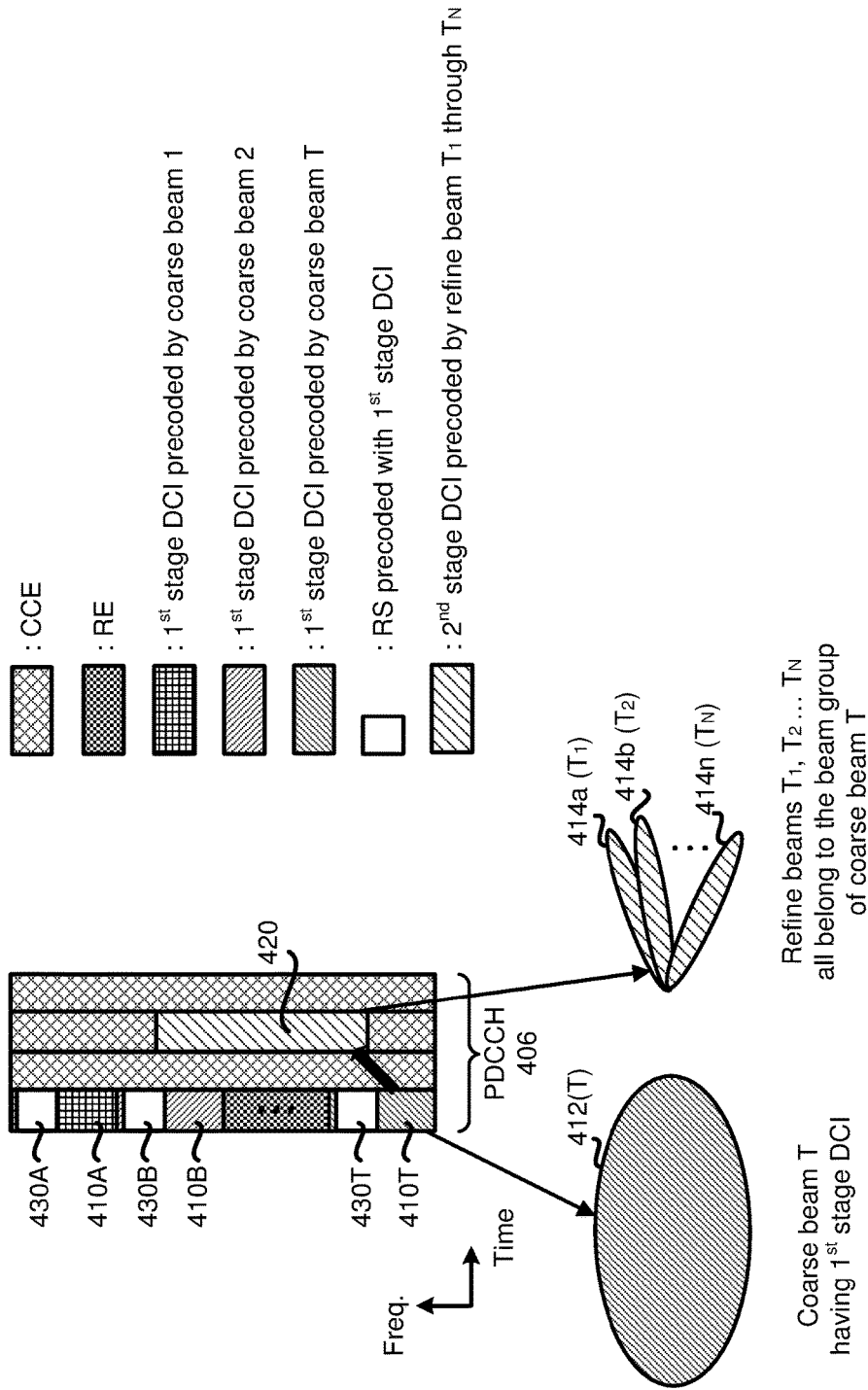
FIG. 4 illustrates an exemplary frame structure having a first stage DCI configuration and a second stage DCI configuration, in accordance with an exemplary implementation of the present application.

FIG. 4 illustrates an exemplary frame structure having a first stage DCI configuration and a second stage DCI configuration, in accordance with an exemplary implementation of the present application. In FIG. 4, first stage DCIs are transmitted by one or more coarse beams in PDCCH 406, for example, from a transmission reception point (TRP) of a base station (e.g., gNB) to a UE. In addition, each of the first stage DCIs may include a reference signal (RS) which is precoded by a corresponding coarse beam together with a corresponding first stage DCI, for example, in the same control channel resource location or region. For example, RS 430A is precoded by coarse beam 1 together with first stage DCI 410A; RS 430B is precoded by coarse beam 2 together with first stage DCI 410B; RS 430T is precoded by coarse beam 412 (e.g., with a coarse beam index T) together with first stage DCI 410T.

FIG. 4 also shows that second stage DCI 420 may be precoded within one or more refine beams. The refine beam information may include refine beam indices and resource information, such as transmitting time and frequency. For example, second stage DCI 420 is precoded by refine beams 414a, 414b, . . . 414n with refine beam indices $T_1, T_2, \ldots T_N$, respectively. It is worthy to note that in the present implementation, the refine beam indices contained in the second stage DCI all belong to a coarse beam group by which the first stage DCI is precoded. For example, refine beams 414a, 414b, . . . 414n, having respective refine beam indices $T_1, T_2, \ldots T_N$, all belong to the coarse beam group T. As such, the UE can obtain refine beam information. It is noted that the second stage DCI may be situated in another allocation of the PDCCH (e.g., ePDCCH) which is non-contiguous with the PDCCH allocation for the first stage DCI.

Figure 5B:
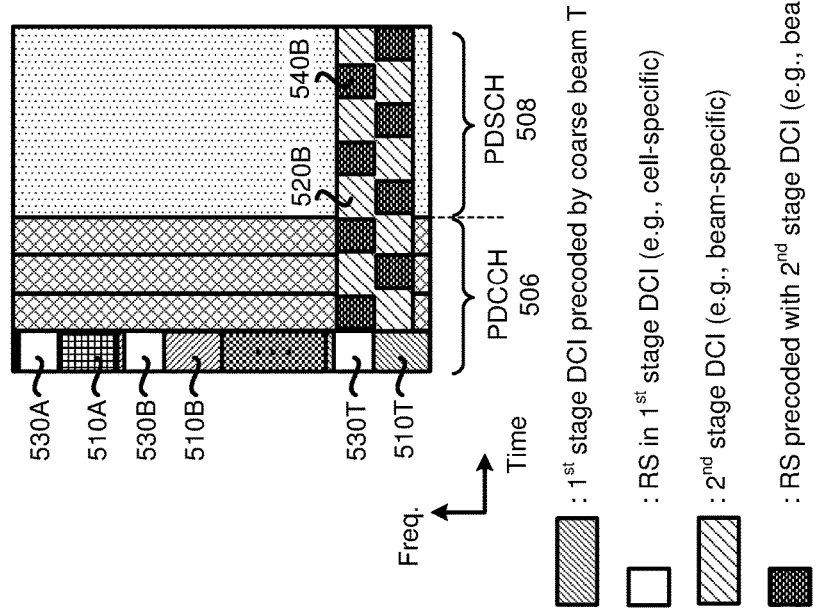
FIG. 5B illustrates a beam-specific second stage DCI configuration in which the second stage DCI is allocated in a long time/duration range, in accordance with an exemplary implementation of the present application.
Figure 5A:
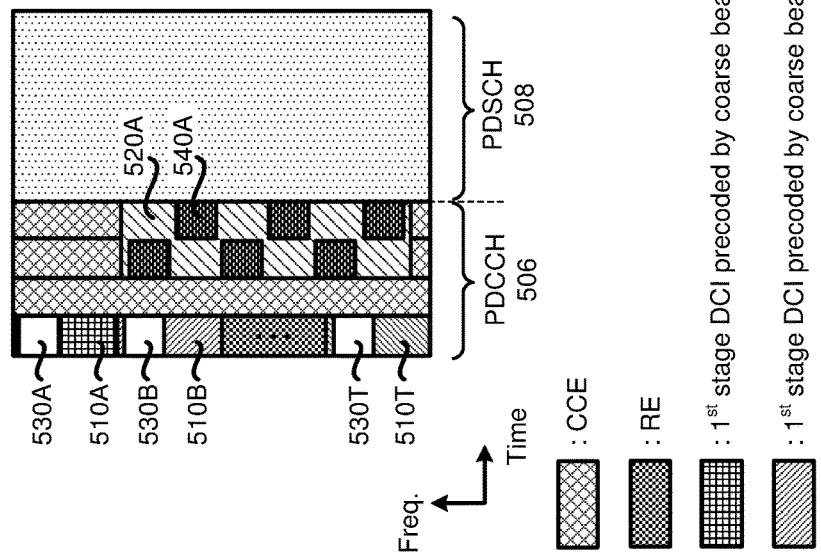
FIG. 5A illustrates a beam-specific second stage DCI configuration in which the second stage DCI is allocated in a wide frequency range, in accordance with an exemplary implementation of the present application.

In one implementation of the present application, the second stage DCI configuration may be precoded and transmitted with beam-specific RSs. For example, for a beam-specific RS, an RS sequence may be generated with a random sequence such as M sequence or ZC sequence by a refine beam index ID, and the beam-specific RSs may be distributed uniformly in the second stage DCIs as shown in FIGS. 5A and 5B. FIG. 5A illustrates a beam-specific second stage DCI configuration in which the second stage DCI is allocated in a wide frequency range. FIG. 5B illustrates a beam-specific second stage DCI configuration in which the second stage DCI is allocated in a long time/duration range. It should be noted that in another implementation, the second stage DCI configuration may be precoded and transmitted with cell-specific RSs. For example, for a cell-specific RS, an RS sequence may be generated with a random sequence, such as an M sequence or a ZC sequence by a cell ID.

The beam-specific second stage DCI may contain at least one of the following parameters:
  a number of serving UEs;
  for each UE, a CSI-RS configuration and resource allocation information for a data channel, where the CSI-RS configuration includes CSI-RS resource and QCL information.

In addition, different formats/configurations of the second stage DCI may be used in different implementations. For a beam-specific second stage DCI configuration, beam-specific RSs may save more control signal resource than UE-specific and cell-specific RSs. This is because the beam-specific RSs can be configured by a gNB with respect to the usage of refine beam in the cell. For example, if the UEs gather in a certain area, (e.g., the gNB can serve all UEs using a single refine beam), then, the gNB may only need to transmit the second stage DCI in a long periodicity, where the second stage DCI can be used by all of the UEs.

FIG. 5A illustrates a beam-specific second stage DCI configuration in which the second stage DCI is allocated in resources in a wide frequency range, in accordance with one implementation of the present application. In the present implementation, first stage DCIs 510A, 510B, . . . 510T, and RSs 530A, 530B, . . . 530T may be substantially similar to first stage DCIs 410A, 410B, . . . 410T, and RSs 430A, 430B, . . . 430T, respectively, in FIG. 4.

As shown in FIG. 5A, second stage DCI 520A may be allocated in resources in a wide frequency range, and precoded within one or more refine beams. Also, beam-specific RSs 540A may be allocated in resources along the wide frequency range. In the present implementation, both first stage DCIs 510A, 510B, . . . 510T (along with RSs 530A, 530B, . . . 530T) and second stage DCI 520A (along with RSs 540A) may be carried by resources in PDCCH 506, while PDSCH 508 may be used to transmit data or other control information.

FIG. 5B illustrates a beam-specific second stage DCI configuration in which the second stage DCI is allocated in resources in a long time/duration range, in accordance with one implementation of the present application. In the present implementation, first stage DCIs 510A, 510B, . . . 510T, and RSs 530A, 530B, . . . 530T may be substantially similar to first stage DCIs 510A, 510B, . . . 510T, and RSs 530A, 530B, . . . 530T, respectively, in FIG. 5A.

As shown in FIG. 5B, second stage DCI 520B may be allocated in resources in a long time/duration range, and precoded by one or more refine beams. Also, beam-specific RSs (e.g., RSs 540B) may be allocated in resources along the long time/duration range. In the present implementation, first stage DCIs 510A, 510B, . . . 510T (along with RSs 530A, 530B, . . . 530T) may be carried by resources in PDCCH 506. Second stage DCI 520B (along with RSs 540B) may be carried by resources in both PDCCH 506 and PDSCH 508.

In the beam-specific second stage DCI configurations shown in FIGS. 5A and 5B, data transmission in PDSCH 508 may be precoded in the same refine beam group as the refine beam group of the second stage DCI. As such, a UE that transmits/receives data with one or more refine beams can utilize the beam-specific RSs for demodulating data signals. Thus, the demodulation RSs in the legacy LTE network are no longer needed in the data channel, thereby making more resource available for high-speed data transmission.

Moreover, for the beam-specific second stage DCI configuration, since a base station (e.g., gNB) may schedule different refine beams on different resources, a UE may use this information for inter-beam switching. For example, at first a UE-A may use a refine beam A so that the UE-A can measure the second stage DCI transmitted in the refine beam A. Once the UE-A determines that the quality of the beam-specific RS(s) in the refine beam A has deteriorated, the UE-A may attempt to measure the beam-specific RSs of other refine beams by the refine beam information precoded and transmitted with the first stage DCI, and send the measurement reports to the base station. As such, the UE-A does not need to monitor other RSs for measurement report. It should be noted that, the measurement reports in the present application may include Layer-3 beam level measurement reports and Layer-1 beam reports.

In another implementation of the present application, the second stage DCI configuration may be precoded and transmitted with UE-specific RSs. A base station (e.g., gNB) may send several second stage DCIs in different refine beam directions using the same control channel resource by multiplexing the second stage DCIs.

The UE-specific second stage DCI may require demodulation of control and/or data signals for each UE by transmitting DMRSs precoded with the second stage DCI. In one implementation, RSs precoded with the first stage DCI may be used to estimate frequency and time offset toward the second stage DCI to substantially reduce the amount of control channel resource required for successfully decoding and/or demodulating data signals in a PDSCH, for example.

Figure 6:
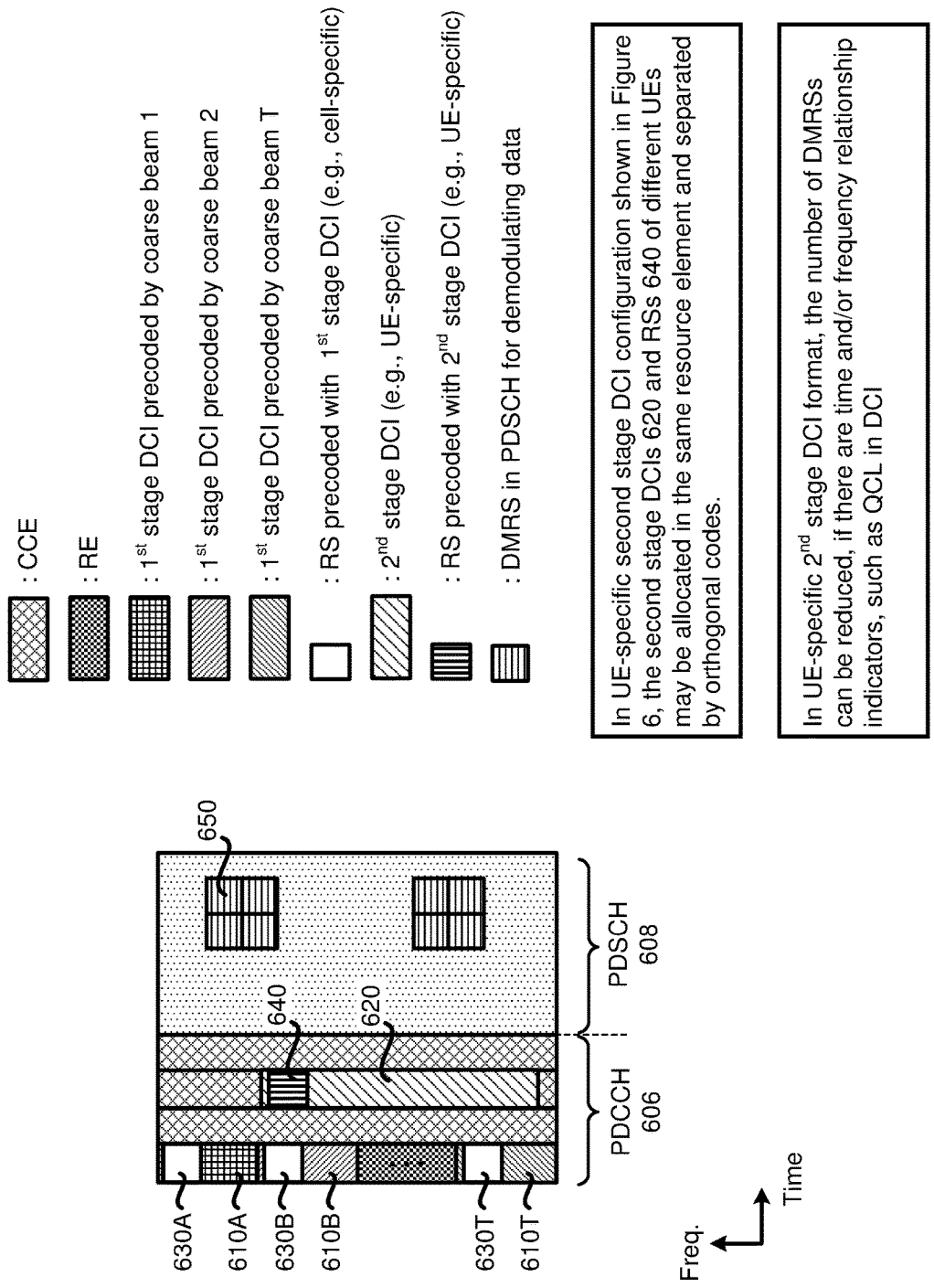
FIG. 6 illustrates a UE-specific second stage DCI configuration, in accordance with an exemplary implementation of the present application.

FIG. 6 illustrates a UE-specific second stage DCI configuration, in accordance with an exemplary implementation of the present application. In the present implementation, first stage DCIs 610A, 610B, . . . 610T, and RSs 630A, 630B, . . . 630T may be substantially similar to first stage DCIs 410A, 410B, . . . 410T, and RSs 430A, 430B, . . . 430T, respectively, in FIG. 4.

In FIG. 6, the RSs (e.g., RS 630A, 630B, . . . 630T) are precoded with the first stage DCI (e.g., first stage DCI 610A, 610B, . . . 610T) to estimate frequency and time offset toward the second stage DCI (e.g., UE-specific second stage DCI 620). The UE-specific second stage DCI may contain at least one of the following parameters:

a DMRS pattern for data channel of a UE;
a CSI-RS configuration having CSI-RS resource and QCL information of the UE;
resource allocation information for data channel;
a QCL indicator of DMRS in data channel.

It is noted that a QCL indicator may refer to Transmission Configuration Indication (TCI), which is an index. A UE may find the corresponding QCL information of the DMRS, for example, according to a mapping table configured by RRC signaling.

In the UE-specific second stage DCI configuration shown in FIG. 6, second stage DCIs 620 and RSs 640 of different UEs may be allocated in the same resource element and separated by orthogonal codes, as will be discussed in FIG. 9A below.

In the UE-specific second stage DCI configuration shown in FIG. 6, the number of DMRSs 650 can be reduced in PDSCH 608, if there are time and/or frequency relationship indicators, such as QCL in UE-specific second stage DCI 620.

In addition, different formats/configurations of the second stage DCI may be used in different implementations. For the UE-specific second stage DCI configuration, in one implementation, with the assistance of the first stage DCI, demodulating the second stage DCI can be performed with less control channel resource. For example, the second stage DCI can obtain time and frequency offset through receiving a cell-specific RS precoded with the first stage DCI, where the cell-specific RS may be applied to all of the UEs served by the same cell. In should be noted that the cell-specific RS may not need to exist at all time, which is different from the CRS in legacy LTE networks.

For the UE-specific second stage DCI configuration, in another implementation, the density of DMRSs in the data channel can be reduced with the assistance of the RSs precoded with the first and second stage DCIs. For example, a base station (e.g., gNB) can set up certain parameters in the second stage DCI to indicate how to reuse the DMRS(s) in the control channel for data demodulation. For example, a UE can estimate frequency offset or timing offset information by second stage DCI 620. As a result, the base station can reduce the amount of DMRS 650 resources needed in PDSCH 608, thereby making more resource available for high-speed data transmission.

Figure 7A:
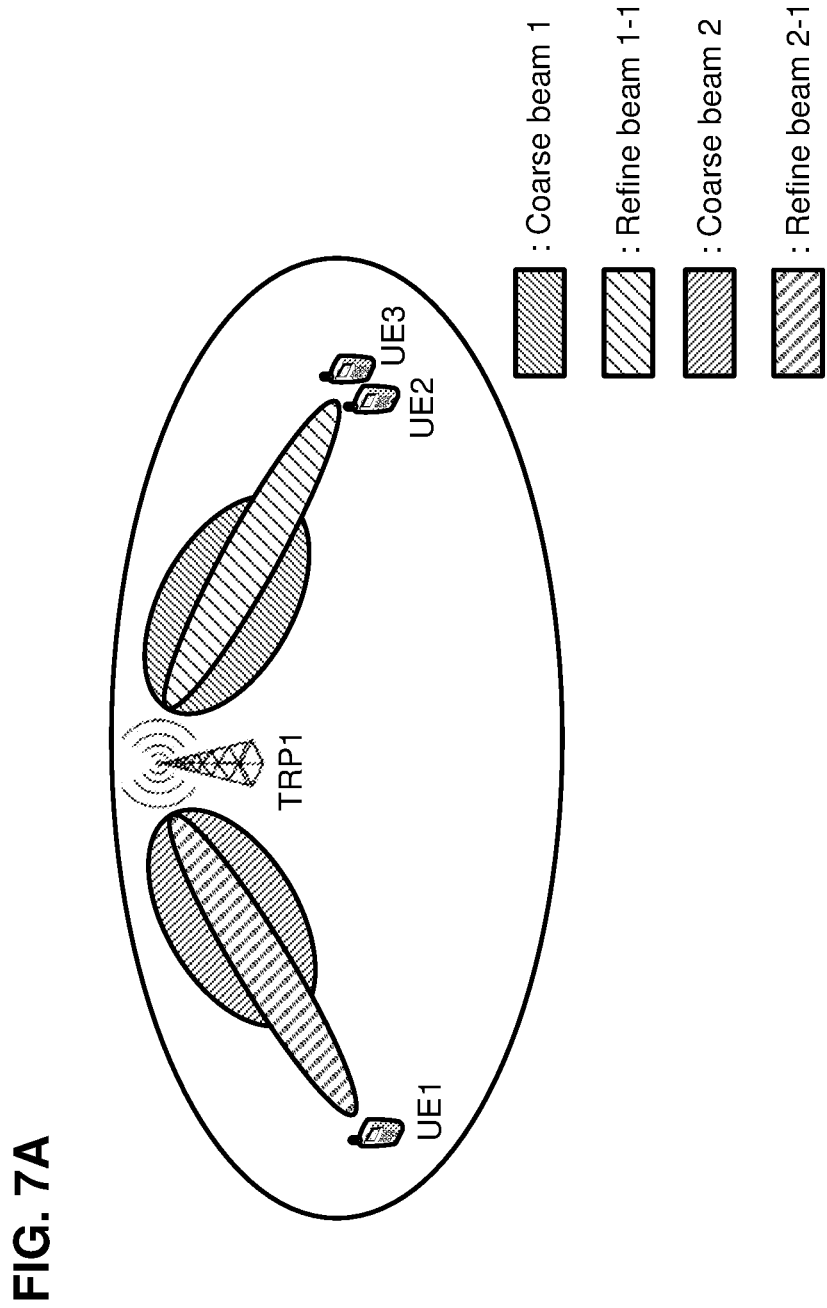
FIG. 7A illustrates a diagram of an exemplary network using a two-stage DCI configuration having beam-specific second stage DCIs, in accordance with an exemplary implementation of the present application.
Figure 8A:
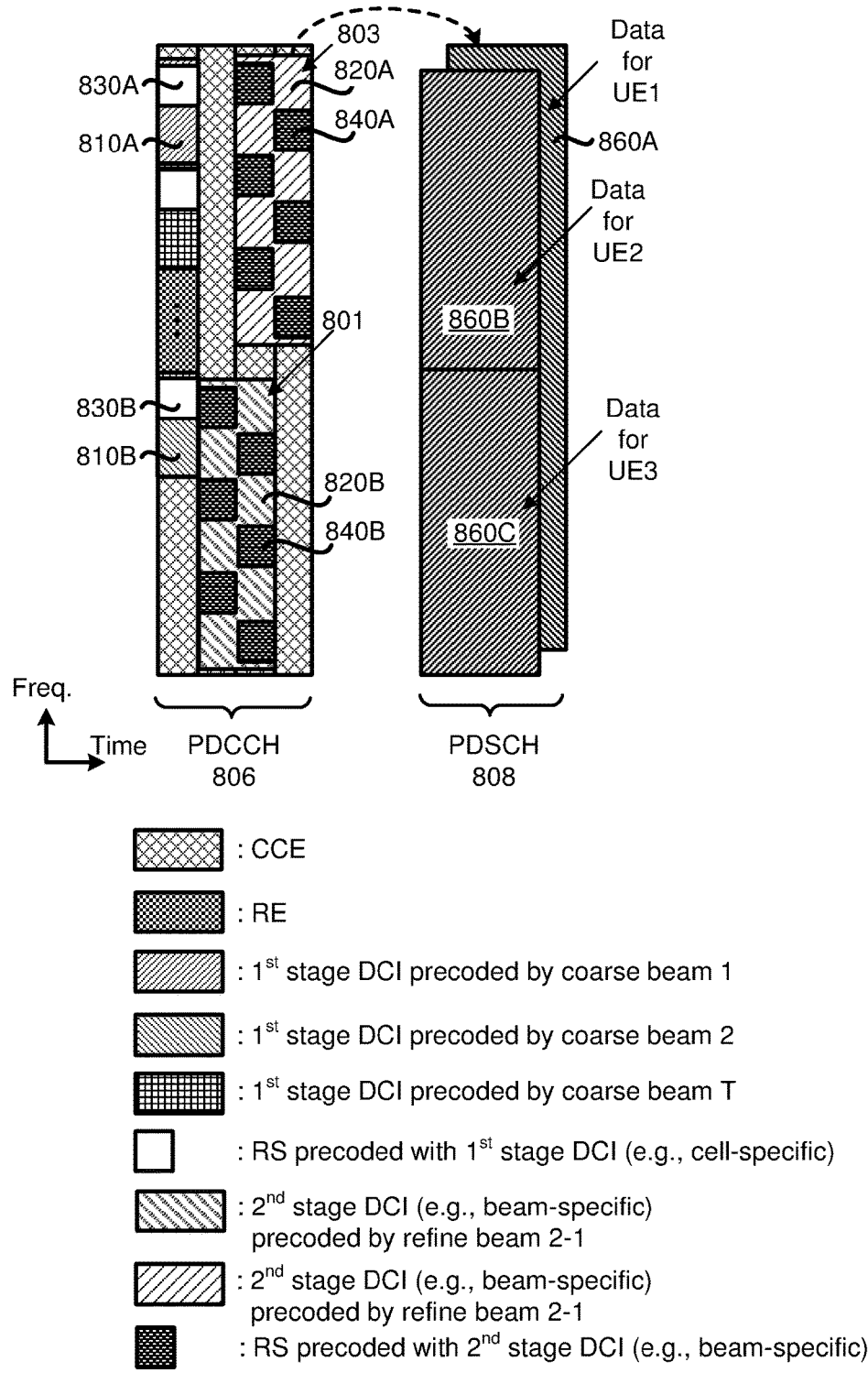
FIG. 8A illustrates an exemplary frame structure and exemplary resource allocation of a PDCCH and a PDSCH for the UEs in FIG. 7A, in accordance with an exemplary implementation of the present application.
Figure 8B:
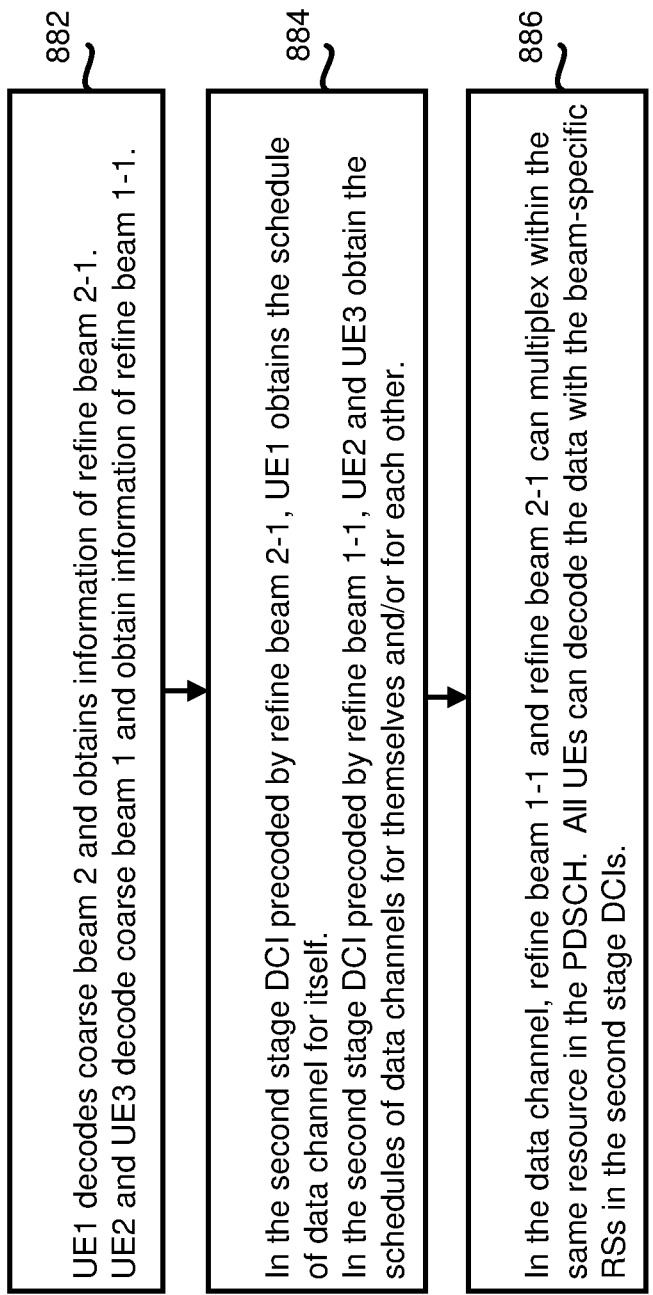
FIG. 8B illustrates exemplary actions for the UEs to communicate with the TRP in FIG. 7A using beam-specific second stage DCIs in FIG. 8A, in accordance with an exemplary implementation of the present application.

FIG. 7A illustrates a diagram of an exemplary network using a two-stage DCI configuration having beam-specific second stage DCIs, in accordance with an exemplary implementation of the present application. FIG. 8A illustrates an exemplary frame structure and exemplary resource allocation of a PDCCH and a PDSCH for the UEs (e.g., UE1, UE2 and UE3) in FIG. 7A. FIG. 8B illustrates exemplary actions for the UEs to communicate the TRP, in FIG. 7A, using beam-specific second stage DCIs in FIG. 8A, in accordance with one implementation of the present application.

As shown in FIG. 7A, TRP1 serves UE1, UE2, and UE3 within a cell using, for example, millimeter wave transmission/reception. After UE1, UE2, and UE3 finish their initial access procedures, UE1 may decide to use coarse beam 2 for transmission, while UE2 and UE3 decide to use coarse beam 1 for transmission. All three UEs may decode the first stage DCI with their corresponding coarse beams.

In action 882 of FIG. 8B, with reference to FIGS. 7A and 8A, UE1 may decode first stage DCI 810B precoded by coarse beam 2 in PDCCH 806 in FIG. 8A to obtain information of refine beam 2-1. UE2 and UE3 may decode first stage DCI 810A precoded by coarse beam 1 in PDCCH 806 in FIG. 8A to obtain information of refine beam 1-1.

After the three UEs decode their corresponding first stage DCIs successfully, they may obtain indices of the corresponding refine beams that belong to the corresponding coarse beams and resource allocation information of the corresponding second stage DCI. For example, if coarse beam 1 contains 16 refine beams (e.g., refine beams 1-1, 1-2, . . . 1-16), then UE2 and UE3 may know when and where to detect the second stage DCI 820A of each of the refine beams. As shown in FIGS. 8A, UE2 and UE3 may detect in region 803 of the second stage DCI 820A to measure the quality of different refine beam precoding signals, while UE1 may detect region 801 of the second stage DCI 820B to measure the quality of different refine beam precoding signals. It is noted that regions 801 and 803 may be overlapped in time domain depending on the scheduling of TRP1. Each of the UEs may evaluate all the refine beams belong to the chosen coarse beam group to select the refine beam with the best signal quality for transmission. As shown in FIG. 7A, both UE2 and UE3 select refine beam 1-1 within coarse beam 1, while UE1 selects refine beam 2-1 within coarse beam 2.

In action 884 of FIG. 8B, with reference to FIGS. 7A and 8A, UE1 may obtain the scheduling information of the data channel for itself in the second stage DCI (e.g., in second stage DCI 820B in FIG. 8A) precoded by refine beam 2-1. UE2 and UE3 may obtain the scheduling information of their data channels for themselves and/or for each other in the second stage DCI (e.g., in second stage DCI 820A in FIG. 8A) within refine beam 1-1.

Since UE2 and UE3 use the same refine beam (e.g., refine beam 1-1 in FIG. 7A), TRP1 may schedule them together within the same sub-frame with frequency and/or time diversity. Because UE1 uses a different refine beam (e.g., refine beam 2-1 in FIG. 7A), TRP1 may multiplex the second stage DCI for UE1 with the second stage DCI for UE2 and UE3 within the same resource in PDCCH 806 as shown in FIG. 8A.

In action 886 of FIG. 8B, with reference to FIGS. 7A and 8A, in the data channel, refine beam 1-1 and refine beam 2-1 can multiplex within the same resource in the PDSCH 808 as shown in FIG. 8A. All UEs can decode their corresponding data with their beam-specific RSs precoded with the corresponding second stage DCIs.

Moreover, the data for each of the UEs in the PDSCH can be decoded without DMRS because the beam-specific RSs in the second stage DCI are precoded in the same refine beams as the corresponding data channels. Therefore, the DMRS overhead can be substantially eliminated from the PDSCH.

Figure 7B:
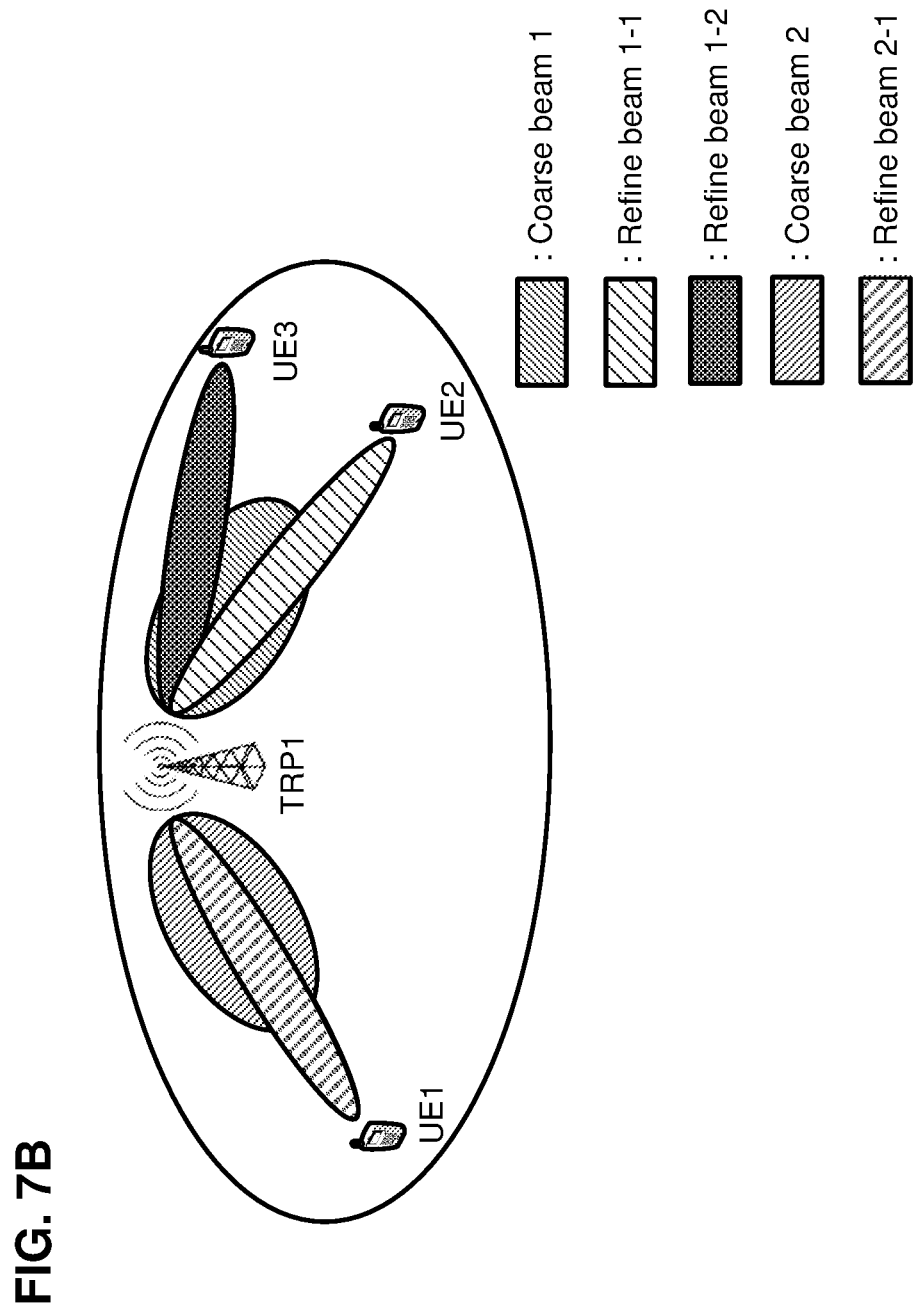
FIG. 7B illustrates a diagram of an exemplary network using a two-stage DCI configuration having UE-specific second stage DCIs, in accordance with an exemplary implementation of the present application.

FIG. 7B illustrates a diagram of an exemplary network using a two-stage DCI configuration having UE-specific second stage DCIs, in accordance with one implementation of the present application. FIG. 9A illustrates an exemplary frame structure and exemplary resource allocation of a PDCCH and a PDSCH for the UEs (e.g., UE1, UE2 and UE3) in FIG. 7B, in accordance with an exemplary implementation of the present application. FIG. 9B illustrates exemplary actions for the UEs to communicate with the TRP (e.g., TRP1) in FIG. 7B using UE-specific second stage DCIs in FIG. 9A, in accordance with one implementation of the present application.

As shown in FIG. 7B, TRP1 serves UE1, UE2, and UE3 within a cell using, for example, millimeter wave transmission/reception. After UE1, UE2, and UE3 finish their initial access procedures, UE1 may decide to use coarse beam 2 for transmission, while UE2 and UE3 decide to use coarse beam 1 for transmission. All three UEs may decode the first stage DCI with their corresponding coarse beams.

Figure 9A:
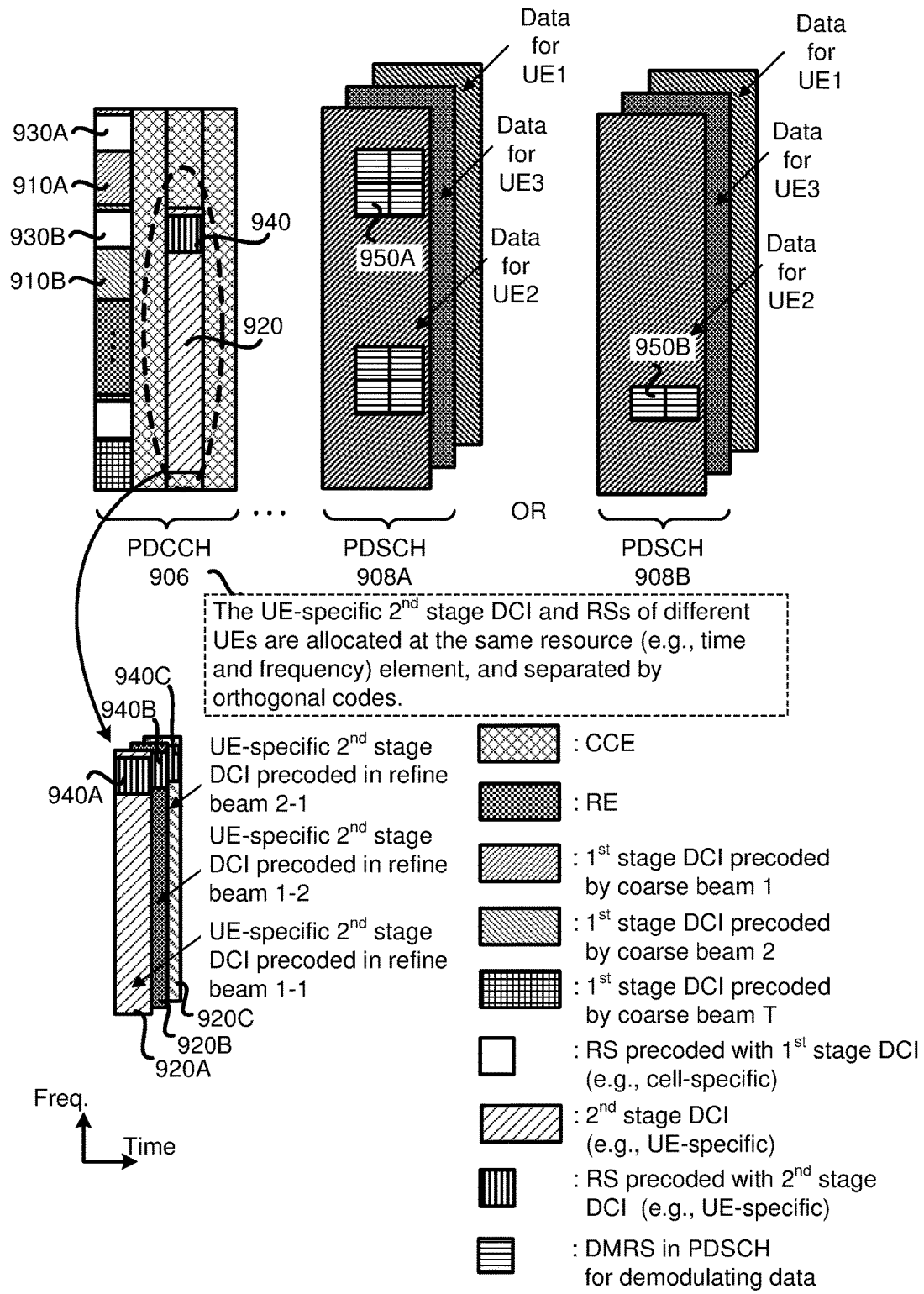
FIG. 9A illustrates an exemplary frame structure and exemplary resource allocation of a PDCCH and a PDSCH for the UEs in FIG. 7B, in accordance with an exemplary implementation of the present application.
Figure 9B:
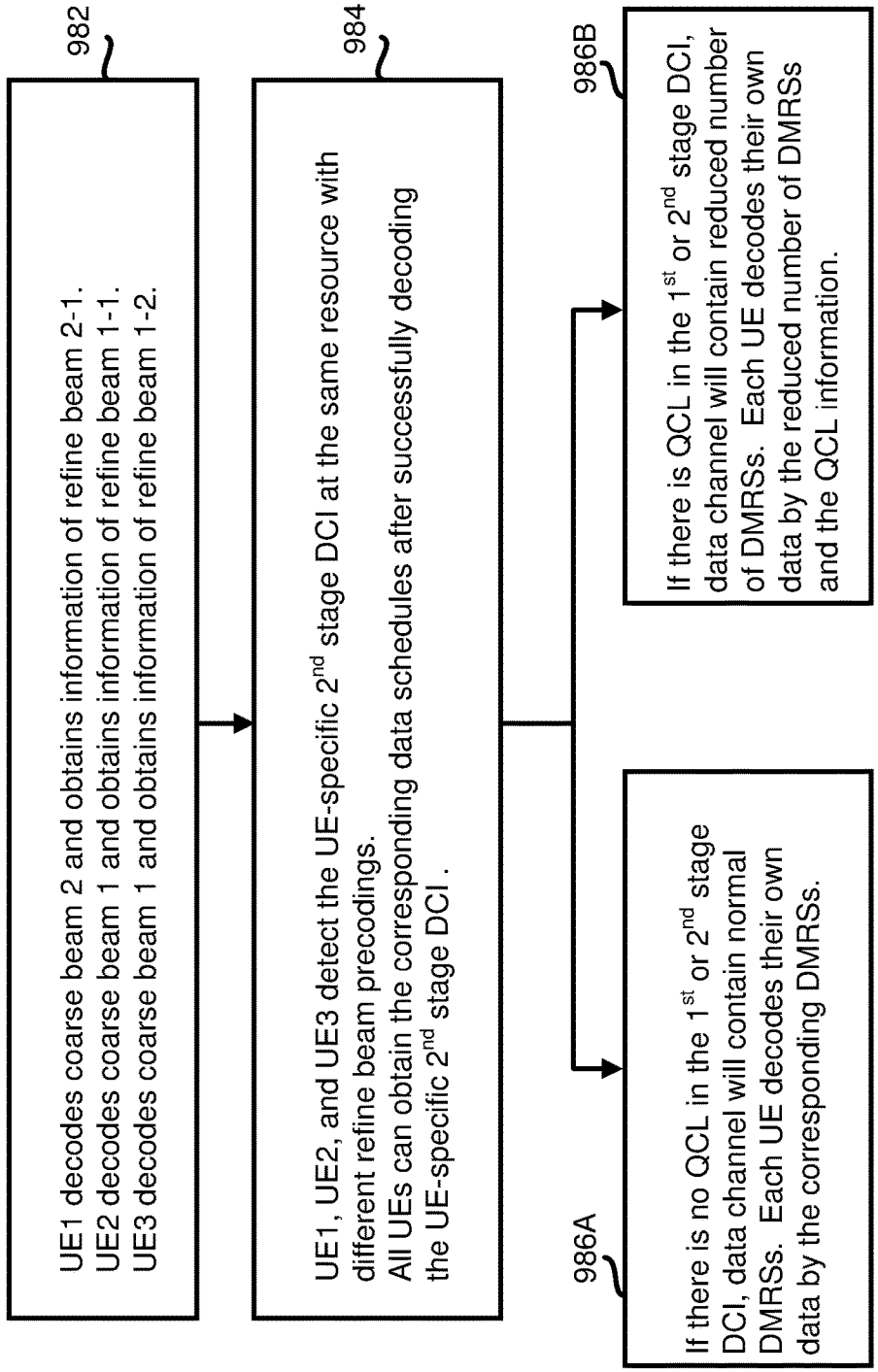
FIG. 9B illustrates exemplary actions the UEs to communicate with the TRP in FIG. 7B using UE-specific second stage DCIs in FIG. 9A, in accordance with an exemplary implementation of the present application.

In action 982 of FIG. 9B, with reference to FIGS. 7B and 9A, UE1 may decode first stage DCI 910B precoded by coarse beam 2 in PDCCH 906 in FIG. 9A to obtain information of refine beam 2-1. UE2 may decode first stage DCI 910A precoded by coarse beam 1 in PDCCH 906 in FIG. 9A to obtain information of refine beam 1-1. UE3 may decode first stage DCI 910A precoded by coarse beam 1 in PDCCH 906 in FIG. 9A to obtain information of refine beam 1-2. That is, UE1 selects a coarse beam (i.e., coarse beam 2), and refine beam 2-1 within coarse beam 2. UE2 and UE3 select a same coarse beam (e.g., coarse beam 1), but different refine beams (e.g., UE2 selecting refine beam 1-1, while UE3 selecting refine beam 1-2) within coarse beam 1. UE1, UE2, and UE3 may select their respective refine beams by beam-specific RSs or CSI-RSs, for example.

Each of the UEs may know whether there is incoming second stage DCI because their corresponding first stage DCIs may contain such refine beam information. For example, TRP1 may transmit certain parameters in the first stage DCI, such as the resource allocation and demodulation information for the second stage DCI and time critical data. The information contained in the first stage DCI is allocated in a region, where the first stage DCI is precoded by coarse beam 1, to indicate that there are second stage DCIs precoded by and transmitted within refine beam 1-1 and refine beam 1-2. UE2 and UE3 may then detect their corresponding second stage DCIs. Otherwise, if the first stage DCI only indicates that there is only one refine beam (e.g., refine beam 1-1), UE3 does not perform detection (e.g., for the second stage DCI) to save power.

In action 984 of FIG. 9B, with reference to FIGS. 7B and 9A, UE1, UE2, and UE3 detect the UE-specific second stage DCIs at the same resource with different refine beam precodings. All of the UEs may obtain the corresponding data schedules after successfully decoding the corresponding UE-specific second stage DCIs.

As shown in FIG. 9A, the resource allocation of the second stage DCI indicated by the first stage DCI, and the second stage DCI, for all the UEs may be transmitted in the same resources. As shown in FIG. 9A, RSs 940A, 940B, and 940C (collectively referred to as RSs 940) precoded with the respective UE-specific second stage DCIs 920A, 920B, and 920C (collectively referred to as UE-specific second station DCIs 920) are transmitted in the same resource (e.g., time and frequency) element, where the RSs are separated by orthogonal codes, for example. Since the second stage DCI may contain the UE-specific RSs for demodulation, all of the UEs can decode their corresponding second stage DCI by using their corresponding UE-specific RSs.

In action 986A of FIG. 9B, with reference to FIGS. 7B and 9A, if there is no QCL in the first or second stage DCI, data channel (e.g., PDSCH 908 in FIG. 9A) may contain normal DMRSs 950A. Each UE decodes their own data by the corresponding DMRSs. In action 986B of FIG. 9B, with reference to FIGS. 7B and 9A, if there is QCL in the first or second stage DCIs, data channel (e.g., PDSCH 908B in FIG. 9A) may contain a reduced number of DMRSs 950B. Each UE may decode their own data by the reduced number of DMRSs 950B and the QCL information.

The second stage DCI may contain data channel scheduling information for each UE, and may be precoded within the same refine beam as the data channel. After obtaining the data channel scheduling information, all three UEs can decode their corresponding data channels with the help of the corresponding DMRSs (e.g., DMRSs 950A/950B in PDSCH 908A/B). As such, the overhead of the DMRSs in the data channels can be substantially reduced by using indications, such as QCL indication. That is, RSs in the first stage DCI and/or the second stage DCI may be used to estimate the timing offset and frequency offset of DMRSs (e.g., 950B of PDSCH 908B).

In FIG. 9A, if TRP1 transmits QCL indication in the first stage DCI and/or second stage DCI, the overhead of DMRSs (e.g., DMRSs 950B) in PDSCH 908B can be reduced. The QCL information can be obtained by detecting the frequency and time offset of RSs in the first stage DCI and/or the second stage DCI. That is, if there is a QCL indication in the first and/or second stage DCI, the data channel may contain reduced DMRSs. As such, each UE may decode their own data by using the corresponding reduced DMRSs and the QCL indication. Also, reduced DMRSs may result in the frequency or time domain pattern of DMRSs of a PDSCH having a lower density than the DMRSs of a PDSCH without QCL indication contained in the first and/or second stage DCI.

Case 1

Intra/Inter TRP Coarse Beam Management

Figure 10B:
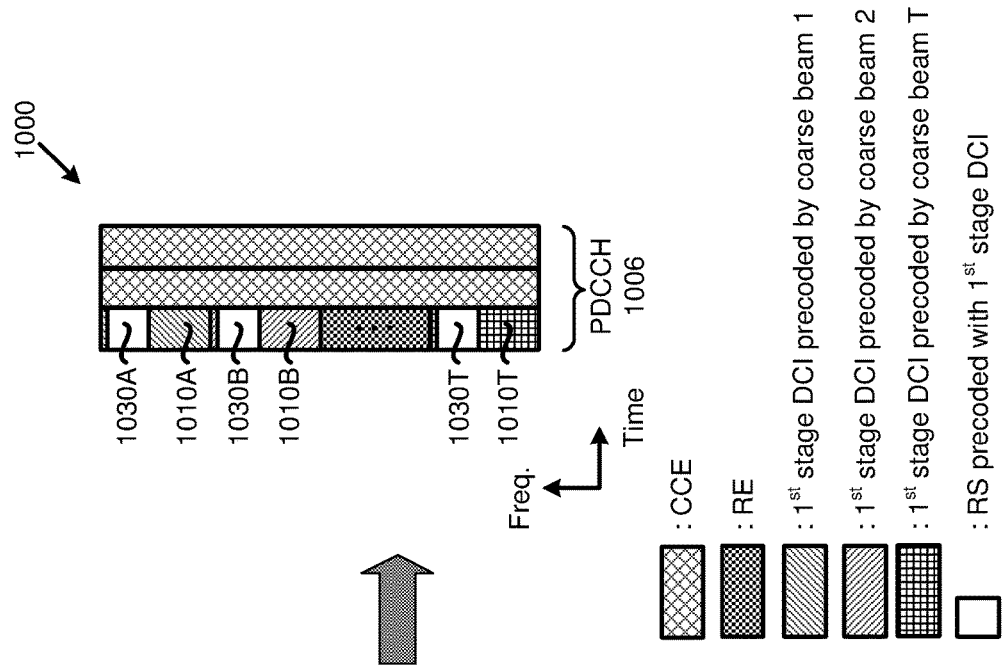
FIG. 10B is a diagram illustrating an exemplary frame structure and resource allocation for intra/inter TRP coarse beam management, in accordance with an exemplary implementation of the present application.
Figure 10A:
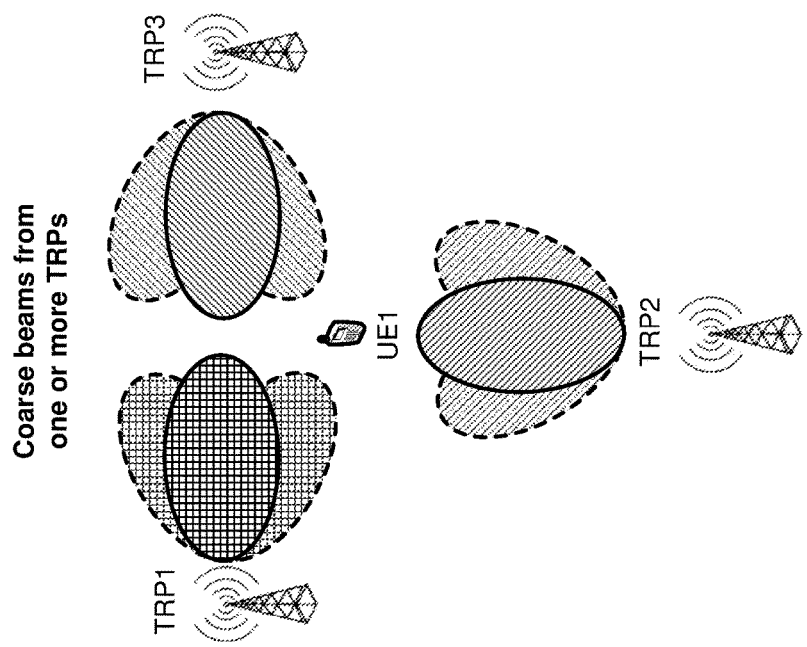
FIG. 10A is a diagram illustrating an exemplary network for intra/inter TRP coarse beam management, in accordance with an exemplary implementation of the present application.

FIG. 10A is a diagram illustrating an exemplary network for intra/inter TRP coarse beam management, in accordance with one implementation of the present application. In FIG. 10A, TPR1, TRP2, and TPR3 each include multiple coarse beams in a cell for beam-based transmission to one or more UEs, such as UE1, in the cell. In 3GPP beam-based transmission, if UE1 desires to switch to a different beam when the current beam is no longer available or suitable for transmission (e.g., the quality of the current beam has deteriorated below a predetermined threshold level), UE1 may need to perform beam sweeping to measure quality of other beams. However, assigning resource for beam sweeping can increase the overhead of the serving TRP or other TRPs in the cell. For example, the serving TRP may need additional bits to indicate to UE1 where to perform beam sweeping. Also, the serving TRP may need to transmit extra reference signals. According to implementations of the present application, the serving TRP may transmit respective first stage DCI for every supported coarse beam in the PDCCH, so that UE1 can measure other coarse beams by detecting the corresponding first stage DCI in the coarse beams. Furthermore, if UE1 only needs to switch to another refine beam within the same coarse beam, implementations of the present application can save resources that would have been spent on blind detection because the serving TRP has already transmitted in the first stage DCI about the information on the refine beams within the coarse beam.

FIG. 10B is a diagram illustrating an exemplary frame structure and resource allocation of the first stage DCI for intra/inter TRP coarse beam management. As shown in FIG. 10B, frame structure 1000 includes first stage DCI transmitted by coarse beams in PDCCH 1006, for example, from one or more TRPs (e.g., TRPs 1, 2, and 3 in FIG. 10A) to UE1. In addition, each of the first stage DCI may include a reference signal (RS) which is precoded by a corresponding coarse beam together with the first stage DCI, for example, in the same control channel resource location or region. For example, RS 1030A is precoded by coarse beam 1 together with first stage DCI 1010A; RS 1030B is precoded by coarse beam 2 together with first stage DCI 1010B; RS 1030T is precoded by coarse beam T together with first stage DCI 1010T.

Figure 11A:
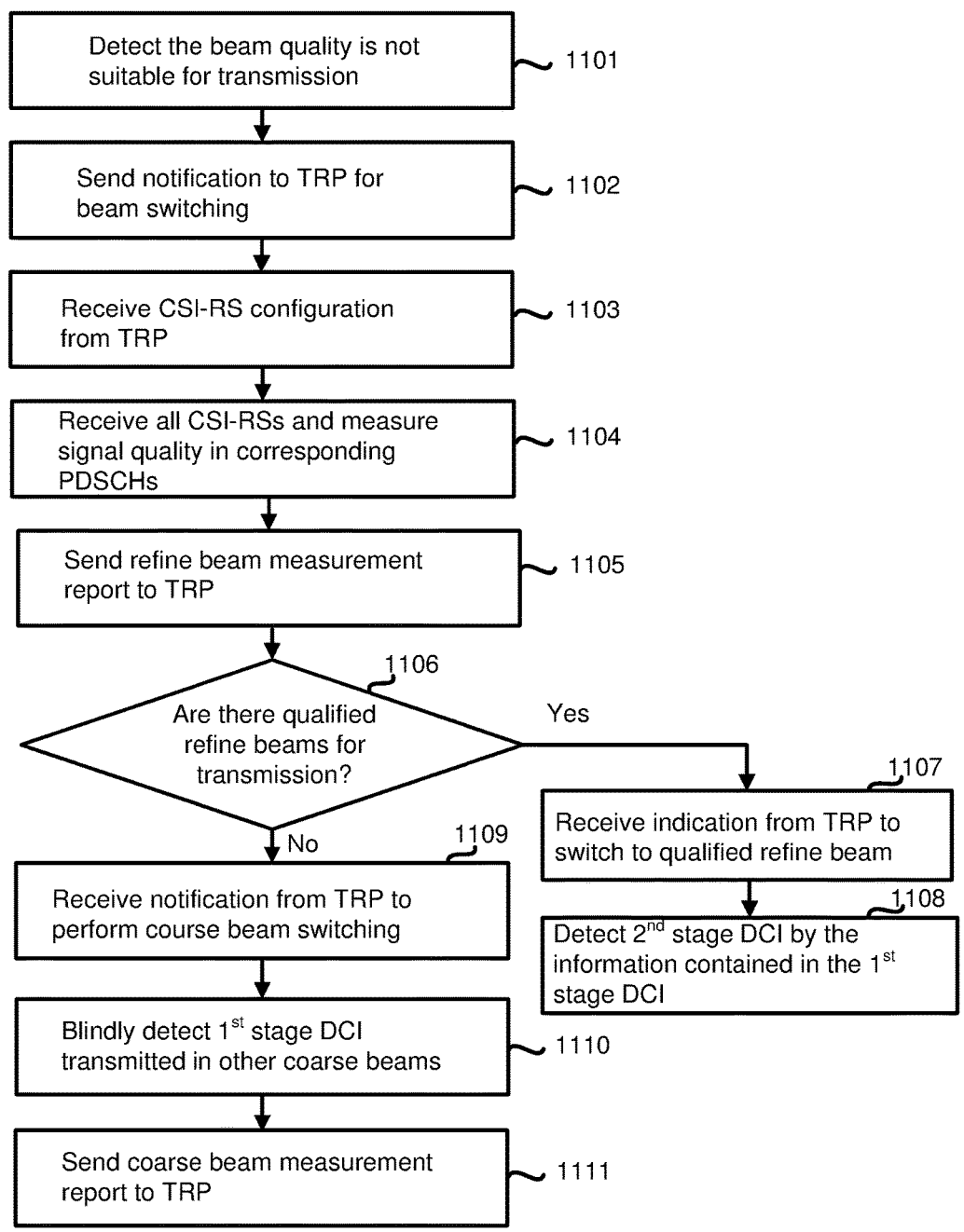
FIG. 11A is a diagram illustrating actions taken by a UE for intra/inter TRP coarse beam management, in accordance with to an exemplary implementation of the present application.
Figure 11B:
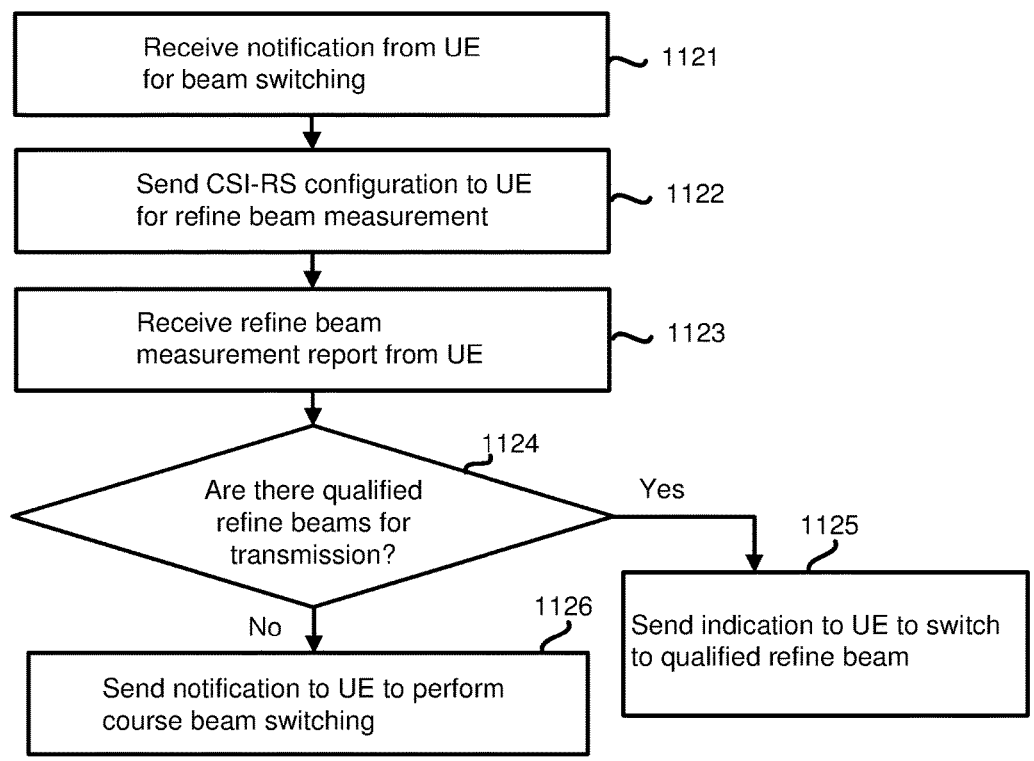
FIG. 11B is a diagram illustrating actions taken by a TRP for intra/inter TRP coarse beam management, in accordance with to an exemplary implementation of the present application.

The detailed operations for intra/inter TRP coarse beam management are shown in FIGS. 11A and 11B. FIG. 11A is a diagram illustrating actions taken by a UE for intra/inter TRP coarse beam management, in accordance with an exemplary implementation of the present application. As shown in FIG. 11A, in block 1101, a UE (e.g., UE1 in FIG. 10A) detects and/or determines that a current beam's quality has deteriorated such that the current beam (e.g., a refine beam) is no longer suitable for transmission. For example, the quality of the current beam has deteriorated below a predetermined threshold level. In block 1102, the UE notifies the TRP that the UE may need to perform beam switching to prevent radio link failure. The TRP first requests the UE to find a refine beam in the same coarse beam group for TRP beam switching. For example, the TRP sends corresponding CSI-RS configuration(s) to the UE for refine beam measurement(s). In block 1103, the UE receives the CSI-RS configuration(s) from the TRP. In block 1104, the UE receives all the CSI-RSs, and measures the signal quality in the corresponding PDSCHs. In block 1105, the UE sends the refine beam measurement report(s) to the TRP. Block 1106 determines whether there are refine beams qualified for transmission. If the result of the determination of block 1106 is Yes, then the UE receives indication from the TRP to switch to a qualified refine beam as shown in block 1107. Thereafter, the UE detects the second stage DCI by the information contained in the first stage DCI, as shown in block 1108. If the result of the determination of block 1106 is No, then the UE receives indication from the TRP to perform coarse beam switching as shown in block 1109. In block 1110, the UE blindly detects first stage DCI transmitted within other coarse beams from the serving TRP. It should be noted that, in another implementation, the UE may detect first stage DCI transmitted within coarse beams from other TRPs. In block 1111, the UE sends coarse beam measurement report(s) to the current TRP to determine whether there are qualified coarse beams for coarse beam switching.

FIG. 11B is a diagram illustrating actions taken by a TRP for intra/inter TRP coarse beam management, in accordance with an exemplary implementation of the present application. As shown in FIG. 11B, in block 1121, the TRP receives a notification from a UE for beam switching, for example, to prevent radio link failure. In block 1122, the TRP sends CSI-RS configuration(s) to the UE for refine beam measurement. In block 1123, the TRP receives the refine beam measurement report(s) from the UE. In block 1124, the TRP determines whether there are refine beams qualified for transmission. If the result of the determination of block 1124 is Yes, then the TRP sends an indication to the UE to switch to a qualified refine beam as shown in block 1125. If the result of the determination of block 1124 is No, then the TRP sends an indication to the UE to perform coarse beam switching as shown in block 1126. It should be noted that, although FIGS. 11A and 11B describe coarse beam management between a serving TRP and a UE, in another implementation, the UE may switch to a different coarse beam from another TRP different from the serving TRP.

Case 2

Coordinated Multi-TRP Transmission

Coordinated communication, such as coordinated multipoint (CoMP) transmission and reception operations, can be used to reduce interference and improve throughput. There are several different schemes for coordinated communication. For example, Joint Transmission (JT) in LTE CoMP is a coordinated communication scheme where data can be transmitted to a UE simultaneously among different base stations/cells (e.g., inter-eNB/cell JT) for improving the UE's downlink throughput. Dynamic Transceiver Switch (DTS) in LTE CoMP is another coordinated communication scheme where a UE's data may be available at several TRPs, but the data is only transmitted to the UE from one TRP at one time depending on the channel quality of each link. Coordinated Scheduling/Coordinated Beamforming (CS/CB) in LTE CoMP is yet another coordinated communication scheme where several TRPs may communicate among other TRPs and then schedule the resource and beam to their own serving UEs all together to minimize interference. The TRPs can coordinate resource scheduling or beam management to increase transmission performance. To achieve coordinate transmission across several TRPs in beam-based operation, a network may need to schedule additional resource for performing beam sweeping among all of the TRPs. For example, a TRP may need to assign multiple CSI-RS resources for beam measurement. According to implementations of the present application, the two-stage DCI configurations can be used in CoMP transmission and/or reception operations, such that a UE can monitor the RS precoded together with second stage DCI to obtain signal quality or interference level. As a result, the TRP(s) may not need to assign additional resources (e.g., multiple CSI-RS resources) for beam measurements. The descriptions for different coordinated communication schemes are provided in details below. It should be noted that in various implementations described below, the CoMP transmission/reception operations may be either inter-base station/cell (e.g., among multiple base stations/cells) or intra-base station/cell (e.g., among multiple TRPs controlled by the base station/cell).

Case 2.1—Joint Transmission (JT)

Example 1: JT Using Beam-Specific Second Stage DCI Configuration

Figure 12:
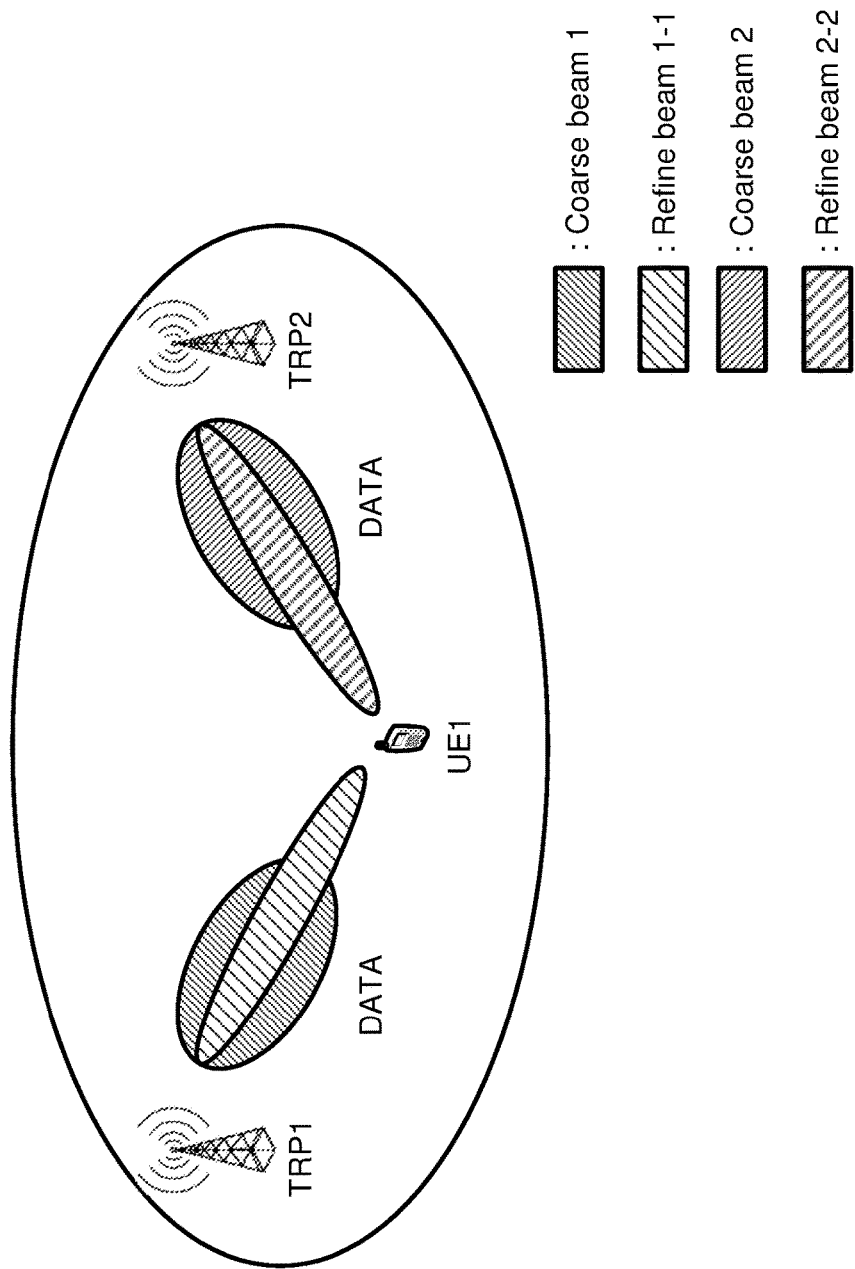
FIG. 12 is a diagram illustrating an exemplary network architecture of Joint Transmission (JT) as an example of a coordinated communication scheme, in accordance with an exemplary implementation of the present application.

FIG. 12 is a diagram illustrating an exemplary network architecture of Joint Transmission as an example of a coordinated communication scheme, in accordance with an exemplary implementation of the present application. In FIG. 12, TRP1 and TRP2 are located in a cell of a base station (e.g., a gNB), where UE1 is served by TRP1 initially. In the present implementation, TRP1 and TRP2 are connected by ideal backhaul, such that they can perform coherent transmission. Once TRP1 decides to perform JT across TRP1 and TRP2 to serve UE1, TRP1 may send a notification to UE1 and ask UE1 to measure all the first stage DCIs in all coarse beams from TRP2 to determine the quality of each of the coarse beams from TRP2. If there is a qualified coarse beam for transmission, UE1 may further measure the refine beams that belong to the coarse beam group from TRP2 and determine whether there are any qualified refine beams for transmission. If a qualified refine beam (e.g., refine beam 2-2) is found, TRP1 may send the scheduling information to TRP2 and notify UE1 that JT is to start. After TRP2 receives the scheduling information, TRP2 may follow the information obtained from TRP1 to allocate the second stage DCI within refine beam 2-2 to the same resource location as refine beam 1-1, which is used by TRP1 for transmitting data to UE1. In addition, TRP2 may transmit data to UE1 in the same resource (e.g., time and frequency) as TRP1, but TRP1 and TRP2 may use different beams for transmission.

Figure 13:
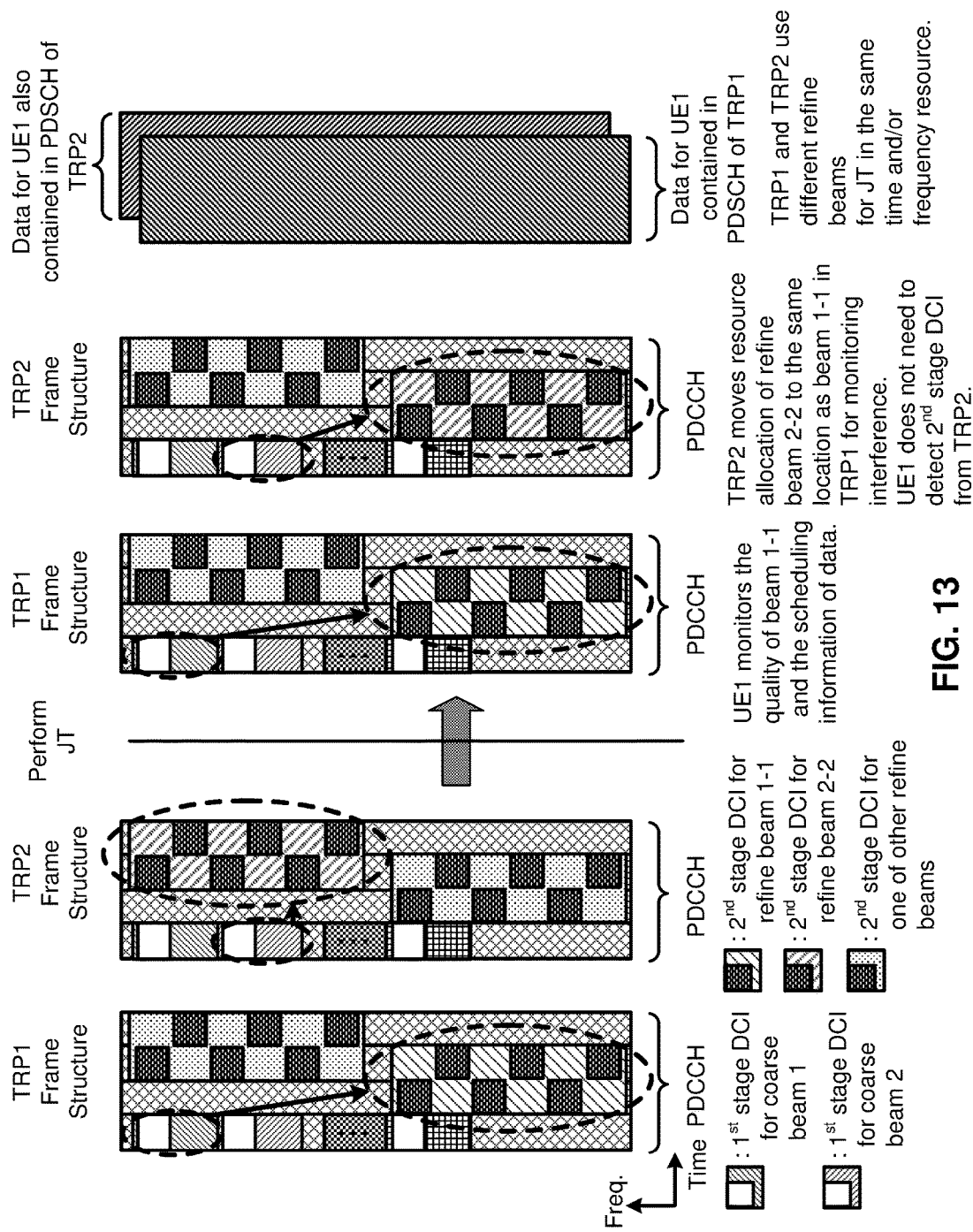
FIG. 13 illustrates exemplary frame structures of TRP1 and TRP2, as shown in FIG. 12, for JT with beam-specific second stage DCI, in accordance with an exemplary implementation of the present application.

FIG. 13 illustrates exemplary frame structures of TRP1 and TRP2 for JT with beam-specific second stage DCI, in accordance with one implementation of the present application. In FIG. 13, TRP1, TRP2, coarse beam 1, refine beam 1-1, coarse beam 2, and refine beam 2-2 may substantially correspond to TRP1, TRP2, coarse beam 1, refine beam 1-1, coarse beam 2, and refine beam 2-2, respectively, in FIG. 12. The detailed operations for JT with beam-specific second stage DCI are further shown in FIGS. 14A, 14B and 14C.

Figure 14A:
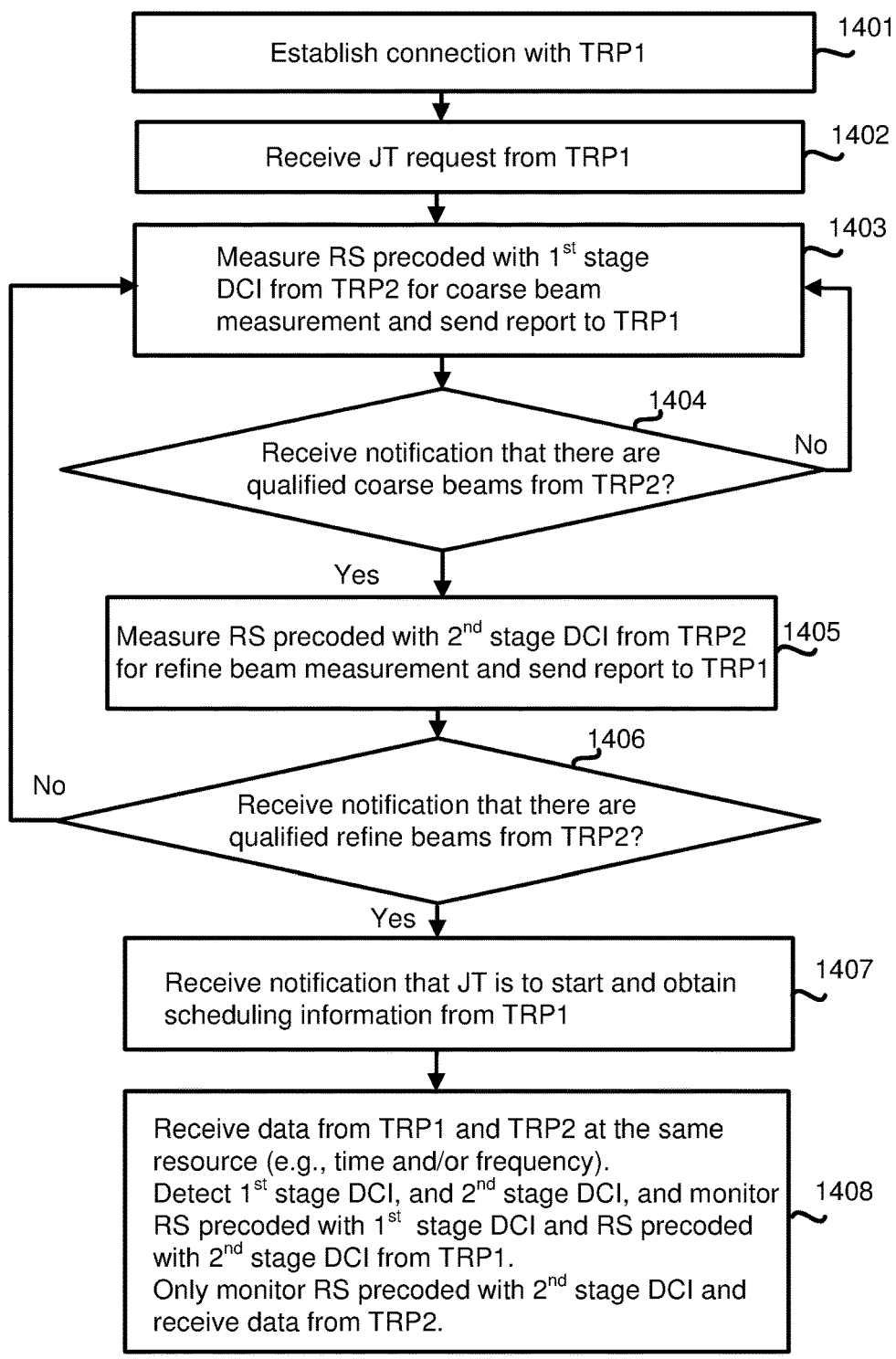
FIGS. 14A, 14B and 14C are diagrams illustrating the detailed operations taken by UE1, TRP1, and TRP2, respectively, as shown in FIG. 12, for JT with beam-specific second stage DCI, in accordance with exemplary implementations of the present application.

FIG. 14A is a diagram illustrating actions taken by UE1 in FIG. 12 for JT with beam-specific second stage DCI, in accordance with an exemplary implementation of the present application. As shown in FIG. 14A, in block 1401, with reference to FIG. 12, UE1 establishes a connection with TRP1. TRP1 may desire to start JT with TRP2 to UE1. TRP1 sends a JT request to UE1 to ask UE1 to monitor the quality of the coarse beams of TRP2 to find a qualified coarse beam for JT. In block 1402, UE1 receives the JT request from TRP1. In block 1403, UE1 detects and measures RSs (e.g., coarse beam RSs) precoded with the first stage DCIs in the coarse beams from TRP2, and sends the measurement reports to TRP1. TRP1 may determine whether there are coarse beams qualified for transmission based on the measurement reports from UE1.

Block 1404 determines whether UE1 receives a notification that there are qualified coarse beams from TRP2. If the result of the determination of block 1404 is No, then UE1 returns to block 1403 to monitor coarse beams from TRP2, for example, periodically. If the result of the determination of block 1404 is Yes, then UE1 receives a notification to enable refine beam measurements. For example, in block 1405, UE1 measures refine beam RSs precoded with second stage DCIs by the information contained in the first stage DCI from TRP2 for refine beam measurements, then sends the measurement reports to TRP1. TRP1 then determines whether TRP2 can support JT based upon the measurement reports. If there is a qualified refine beam, TRP1 sends a notification of JT to UE1 and TRP2, and transmits the scheduling information of JT to UE1 and TRP2.

Block 1406 determines whether UE1 receives a notification from TRP1 indicating there are qualified refine beams from TRP2 for JT. If the result of determination of block 1406 is No, then UE1 returns to block 1403 to monitor coarse beams from TRP2, for example, periodically. If the result of the determination of block 1406 is Yes, then UE1 receives a notification from TRP1 that JT is to start, and obtains scheduling information from TRP1, as shown in block 1407. TRP2 also receives the scheduling information from TRP1, TRP2 may follow the information obtained from TRP1 to allocate the second stage DCI within a refine beam (e.g., refine beam 2-2 in FIG. 12) to the same resource location as the refine beam (e.g., refine beam 1-1 in FIG. 12) from TRP1, which is used by TRP1 for transmitting data to UE1. In addition, TRP2 may transmit data to UE1 in the same resource (e.g., time and/or frequency) as TRP1, but TRP1 and TRP2 may use different beams for transmission. For example, when JT starts, TRP2 allocates the second stage DCI within refine beam 2-2 to the same location as the second stage DCI within refine beam 1-1 in TRP1, and transmits data within refine beam 2-2 to UE1 according to the scheduling information from TRP1. In one implementation, the data transmitted in refine beam 2-2 from TRP2 is identical to the data transmitted in refine beam 1-1 from TRP1.

In block 1408, UE1 receives data from TRP1 and TRP2 in the same resource (e.g., time and/or frequency). Also, UE1 obtains the scheduling information, refine beam information of TRP1 and TRP2, and RSs (e.g., CSI-RS configurations) from the first stage and second stage DCIs from TRP1. Therefore, TRP2 does not need to transmit scheduling information for UE1 via its DCI. In addition, UE1 can monitor interference between refine beam 1-1 from TRP1 and refine beam 2-2 from TRP2 by detecting the RSs in the second stage DCI of TRP1 and TRP2.

Figure 14B:
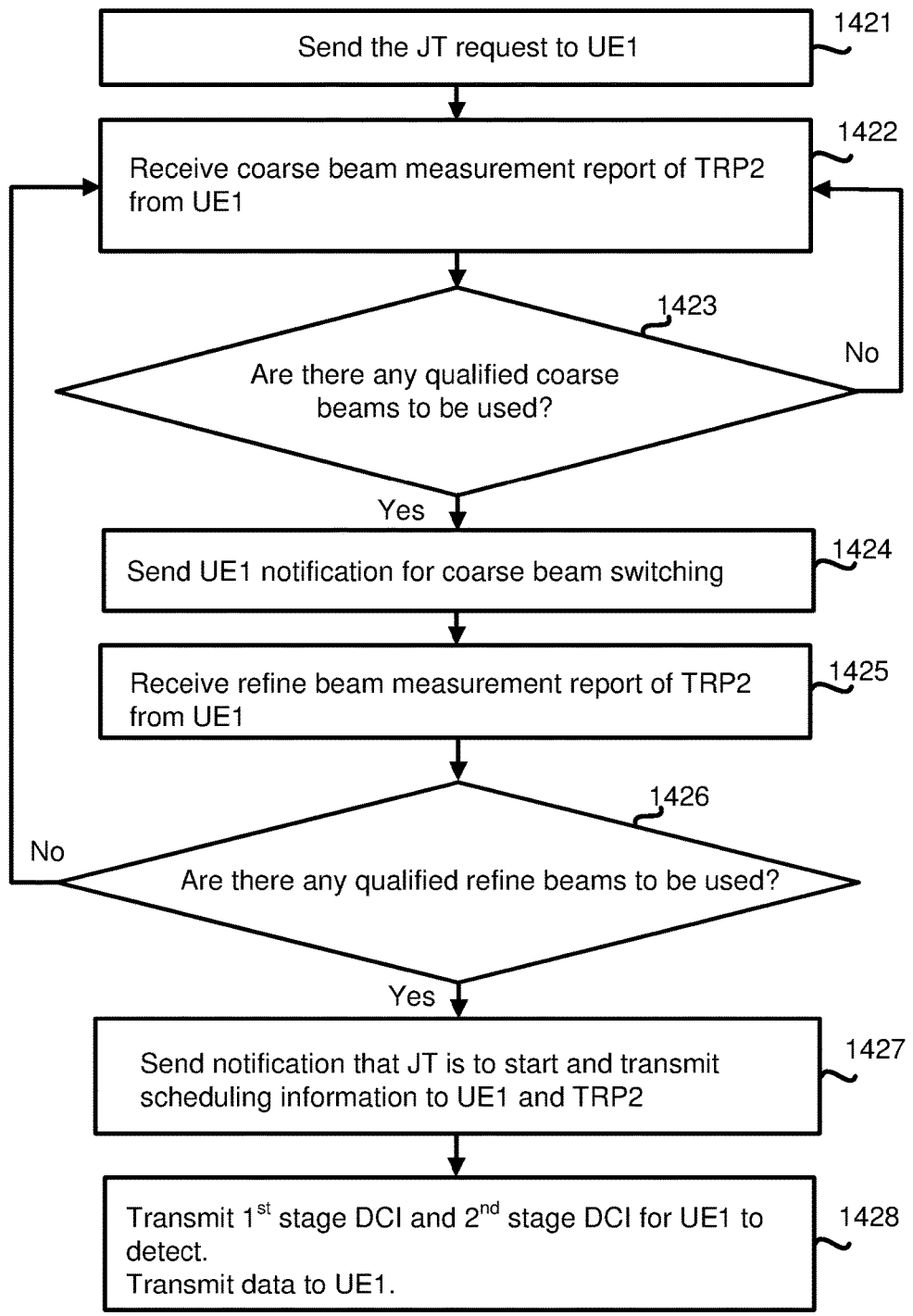

FIG. 14B is a diagram illustrating actions taken by TRP1 in FIG. 12 for JT with beam-specific second stage DCI, in accordance with an exemplary implementation of the present application. In block 1421, with reference to FIG. 12, TRP1 may desire to start JT with TRP2 to UE1. TRP1 sends a JT request to UE1 to monitor the quality of the coarse beams of TRP2 to find a qualified coarse beam for JT. In block 1422, TRP1 receives the measurement reports of TRP2 from UE1.

In block 1423, TRP1 determines whether there are coarse beams qualified for transmission based on the measurement reports of TRP2 from UE1. If the result of the determination of block 1423 is No, then TRP1 returns to block 1422 to monitor coarse beam measurement reports of TRP2 from UE1. If the result of the determination of block 1423 is Yes, then TRP1 sends UE1 a notification for coarse beam switching to enable refine beam measurements, as shown in block 1424. UE1 measures refine beam RSs precoded with second stage DCIs by the information contained in the first stage DCI from TRP2 for refine beam measurements, then sends the measurement reports to TRP1.

In block 1425, TRP1 receives refine beam measurement reports of TRP2 from UE1. In block 1426, TRP1 determines whether there are any qualified refine beams of TRP2 that can support JT based upon the measurement reports. If the result of the determination of block 1426 is No, then TRP1 returns to block 1422 to monitor coarse beam measurement reports of TRP2 from UE1. If the result of the determination of block 1426 is Yes, then TRP1 sends a notification about JT to UE1 and TRP2, and transmits the scheduling information of JT to UE1 and TRP2 as shown in block 1427. In block 1428, TRP1 starts JT with TRP2, and transmits data to UE1. TRP1 also transmits scheduling information, refine beam information of TRP1 and TRP2, and RSs (e.g., CSI-RS configurations) from the first stage and second stage DCIs to UE1.

Figure 14C:
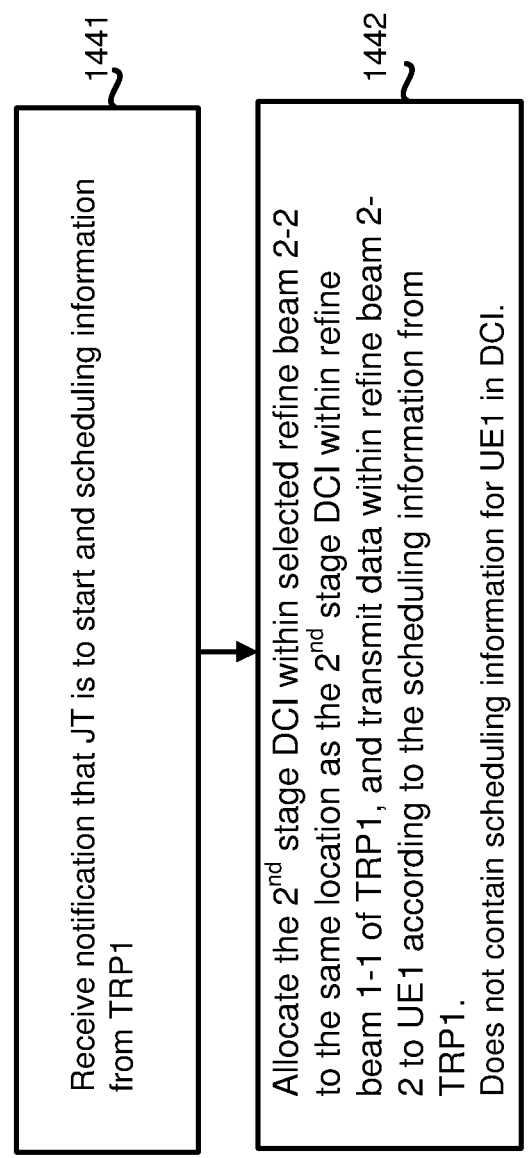

FIG. 14C is a diagram illustrating actions taken by TRP2 in FIG. 12 for JT with beam-specific second stage DCI, in accordance with an exemplary implementation of the present application. In block 1441, with reference to FIG. 12, TRP2 receives a notification that JT is to start and scheduling information from TRP1 (e.g., TRP1 in FIG. 12). In block 1442, TRP2 allocates the second stage DCI within selected refine beam 2-2 to the same location as the second stage DCI within refine beam 1-1 of TRP1, and transmits data within refine beam 2-2 to UE1 according to the scheduling information from TRP1. It should be noted that TRP2 does not need to transmit scheduling information for UE1 via its DCI.

Example 2: JT Using UE-Specific Second Stage DCI Configuration

Figure 15:
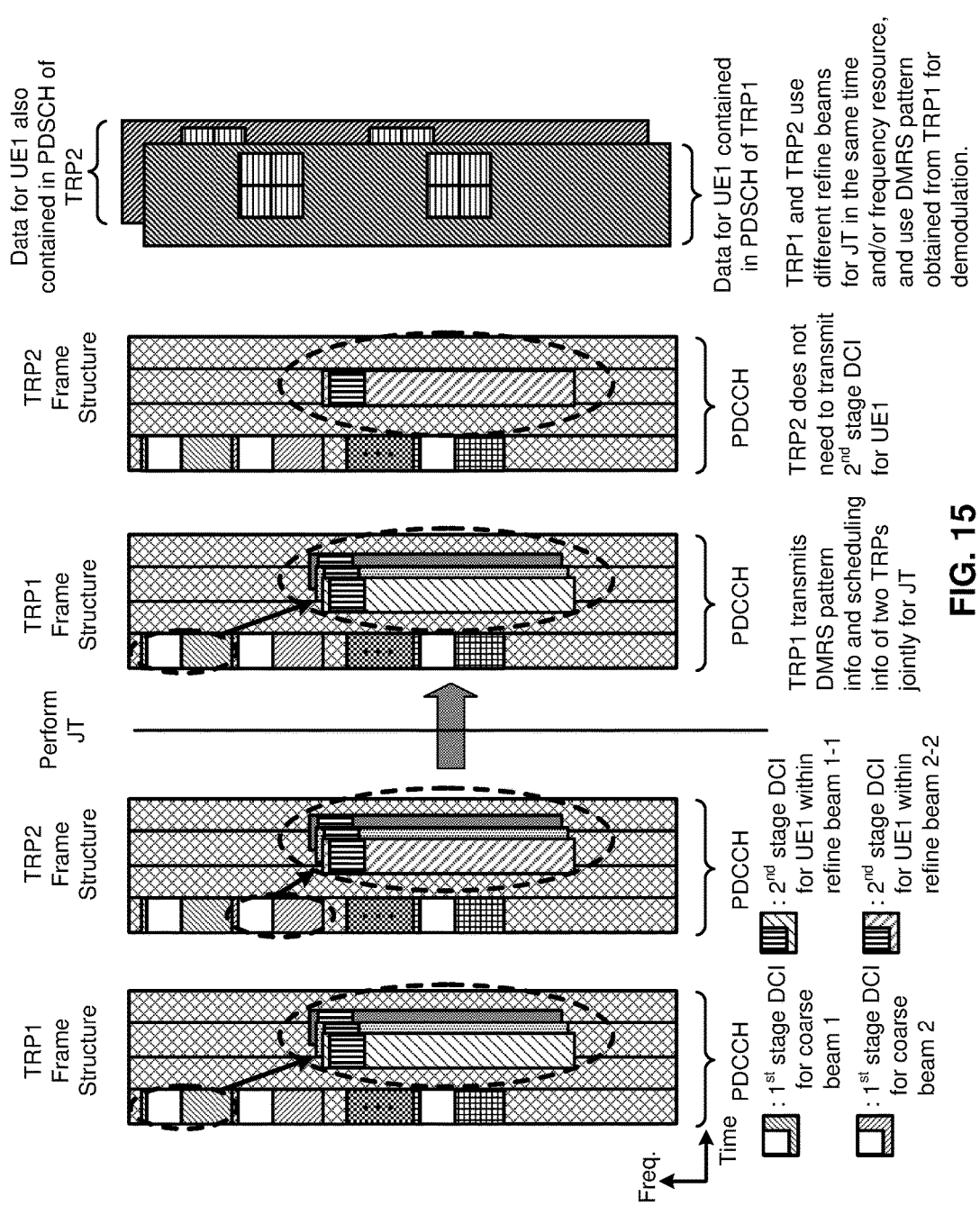
FIG. 15 illustrates exemplary frame structures of TRP1 and TRP2, as shown in FIG. 12, for JT with UE-specific second stage DCI, in accordance with an exemplary implementation of the present application.

FIG. 15 illustrates exemplary frame structures of TRP1 and TRP2 for JT with UE-specific second stage DCI, in accordance with an exemplary implementation of the present application. In FIG. 15, TRP1, TRP2, coarse beam 1, refine beam 1-1, coarse beam 2, and refine beam 2-2 may substantially correspond to TRP1, TRP2, coarse beam 1, refine beam 1-1, coarse beam 2, and refine beam 2-2, respectively, in FIG. 12. The detailed operations for JT with UE-specific second stage DCI are further shown in FIGS. 16A, 16B and 16C.

Figure 16A:
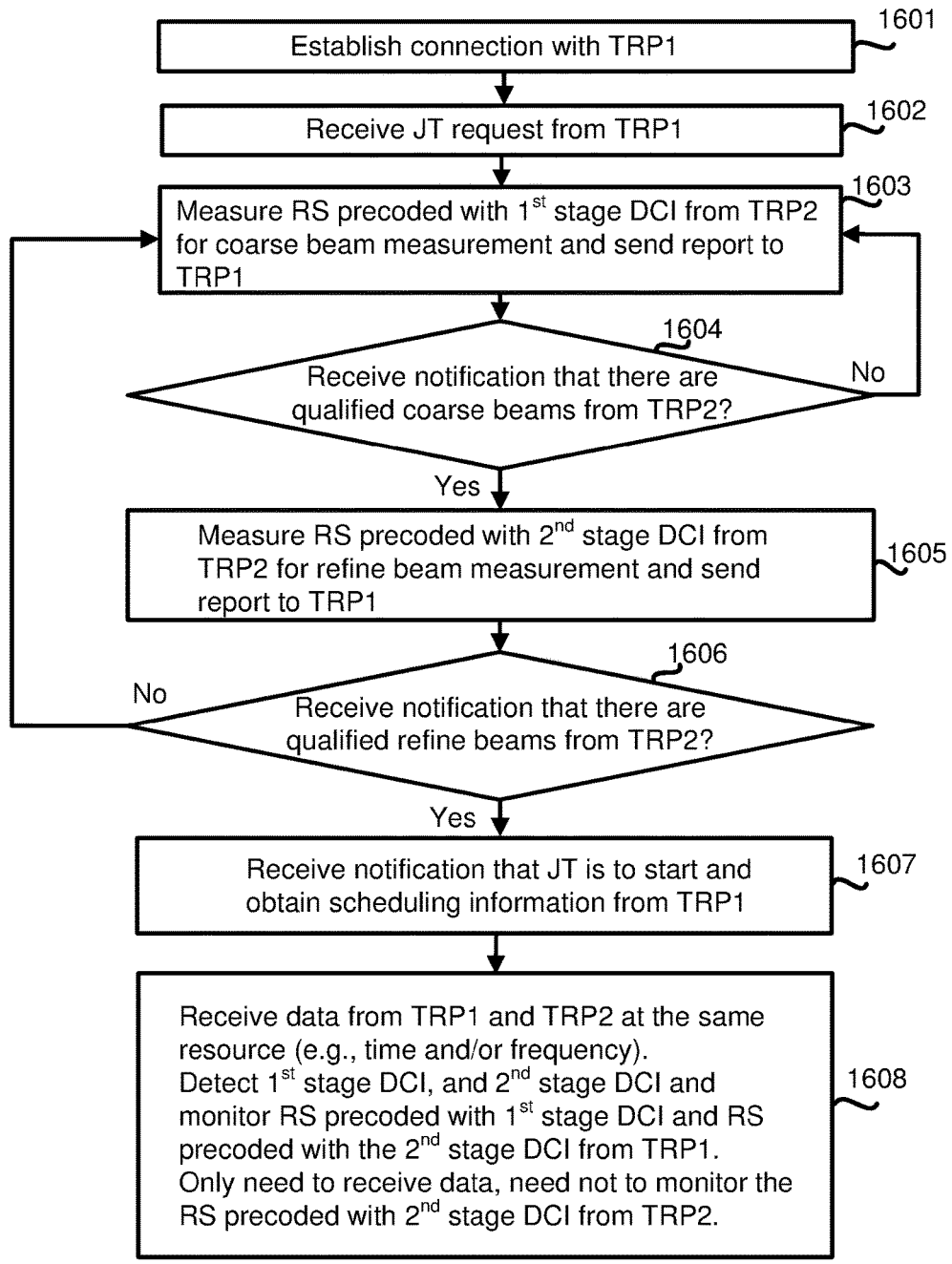
FIGS. 16A, 16B and 16C are diagrams illustrating the detailed operations taken by UE1, TRP1, and TRP2, respectively, as shown in FIG. 12, for JT with UE-specific second stage DCI, in accordance with exemplary implementations of the present application.

FIG. 16A is a diagram illustrating actions taken by UE1 in FIG. 12 for JT with UE-specific second stage DCI, in accordance with an exemplary implementation of the present application. As shown in FIG. 16A, blocks 1601, 1602, 1603, 1604, 1605, 1606, and 1607, may be substantially similar to blocks 1401, 1402, 1403, 1404, 1405, 1406, and 1407, respectively, in FIG. 14A. In block 1608, UE1 receives data from TRP1 and TRP2 in the same resource (e.g., time and/or frequency). Also, UE1 may obtain scheduling information, DMRS pattern combination of TRP1 and TRP2, CSI-RS configuration, and CSI-IM configuration from the first stage and the second stage DCIs from TRP1. UE1 may monitor interference between refine beam 1-1 from TRP1 and refine beam 2-2 from TRP2 by CSI-IM from TRP1.

In JT using UE-specific second stage DCI configuration, TRP2 does not transmit UE1 specific second stage DCI. UE1 does not need to monitor the RS in second stage DCI from TRP2. That is, UE1 only needs to receive control channel from TRP1 to be able to receive data channel from both TRP1 and TRP2 simultaneously (e.g., allocated in the same time and/or frequency resource). Since there are no second stage DCI for UE1 from TRP2, UE1 can monitor interference by configuring CSI-IM for UE1.

Figure 16B:
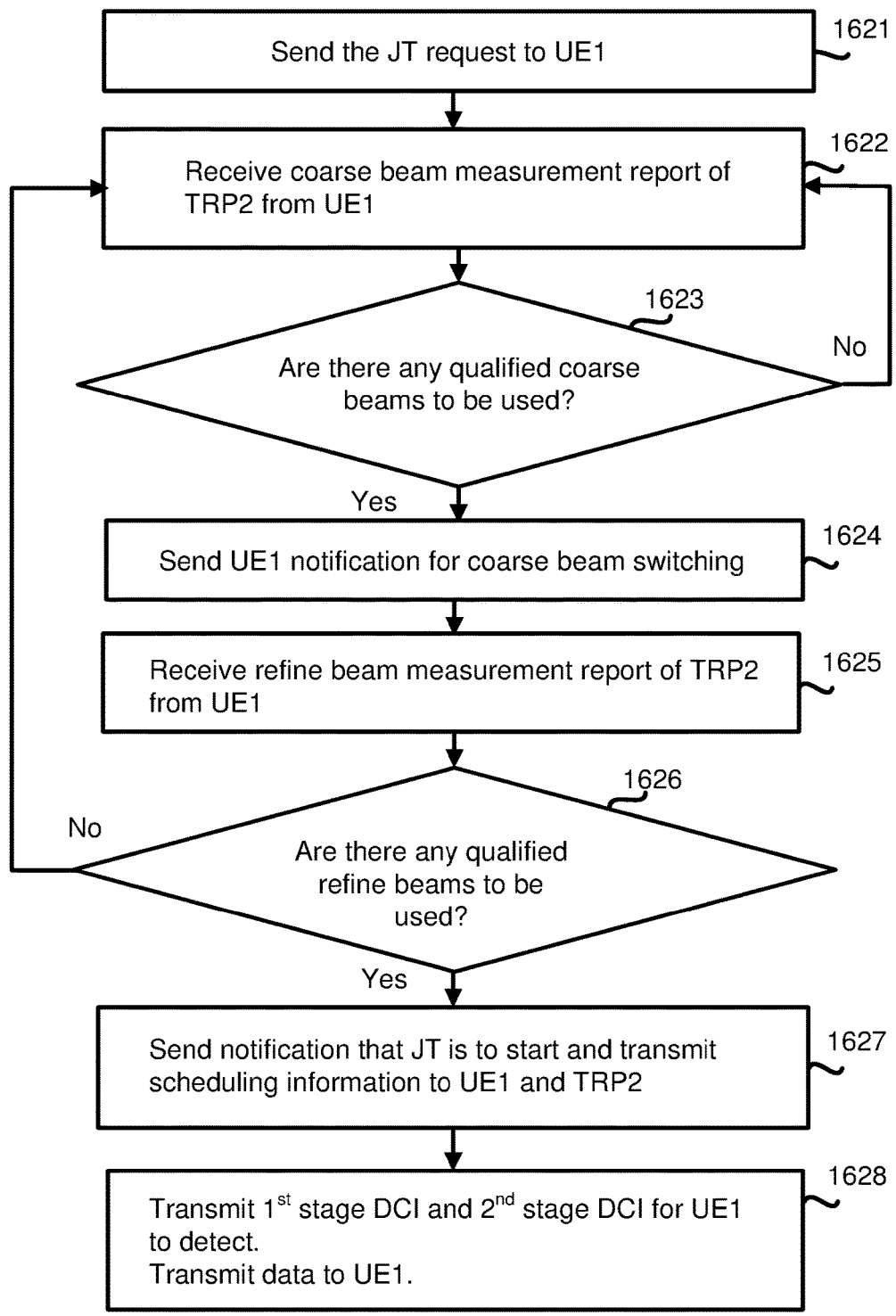

FIG. 16B is a diagram illustrating actions taken by TRP1 in FIG. 12 for JT with UE-specific second stage DCI, in accordance with an exemplary implementation of the present application. As shown in FIG. 16B, blocks 1621, 1622, 1623, 1624, 1625, 1626, and 1627, may be substantially similar to blocks 1421, 1422, 1423, 1424, 1425, 1426, and 1427, respectively, in FIG. 14B. In block 1628, in addition to transmitting data to UE1, TRP1 also transmits DMRS pattern combination of TRP1 and TRP2, CSI-RS configuration, and CSI-IM configuration from the first stage and the second stage DCIs to UE1.

Figure 16C:
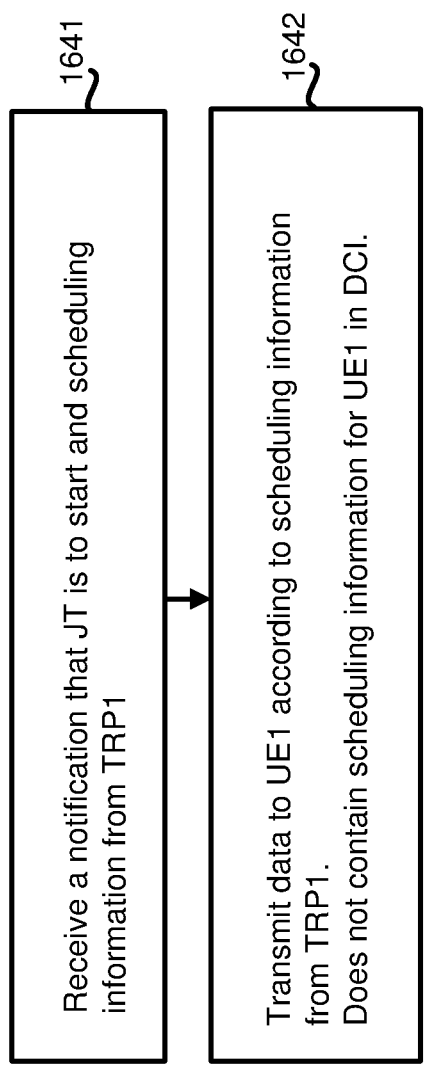

FIG. 16C is a diagram illustrating actions taken by TRP2 in FIG. 12 for JT with UE-specific second stage DCI, in accordance with an exemplary implementation of the present application. In block 1641, TRP2 receives a notification that JT is to start and scheduling information from TRP1. In block 1642, TRP2 transmits data to UE1 according to the scheduling information from TRP1, but TRP2 does not transmit UE-specific second stage DCI for UE1.

Case 2.2—Dynamic Transceiver Switch (DTS)

Example 1: DTS Using Beam-Specific Second Stage DCI Configuration

Figure 17:
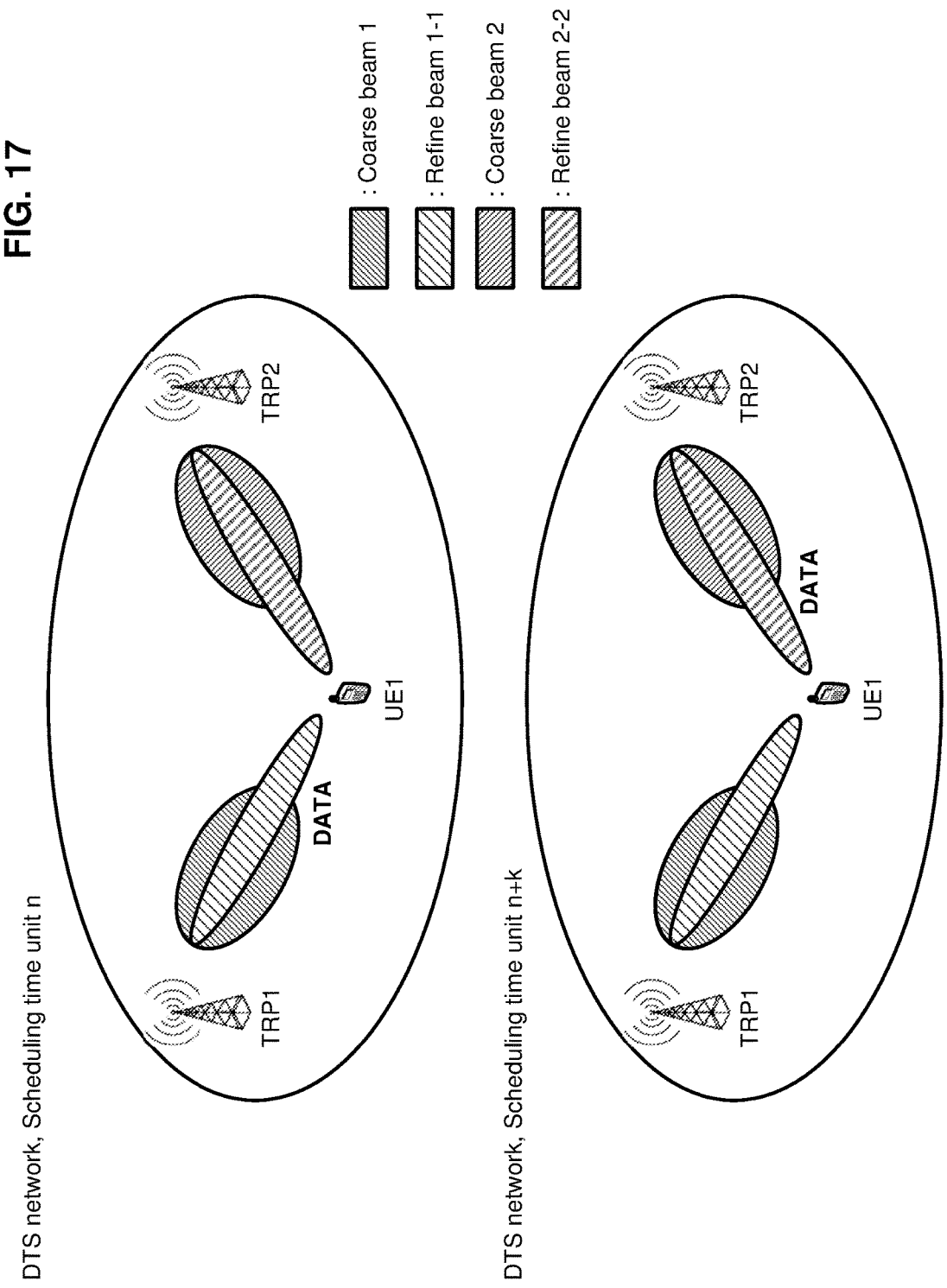
FIG. 17 is a diagram illustrating an exemplary network architecture of Dynamic Transceiver Switch (DTS) as an example of a coordinated communication scheme, in accordance with an exemplary implementation of the present application.

FIG. 17 is a diagram illustrating an exemplary network architecture of Dynamic Transceiver Switch as an example of a coordinated communication scheme, in accordance with an exemplary implementation of the present application. In FIG. 17, TRP1 and TRP2 are located in a cell of a base station (e.g., a gNB), where UE1 is served by TRP1 initially. For example, in scheduling time unit n, TRP1 transmits data to UE1 using refine beam 1-1. In the present implementation, TRP1 and TRP2 are connected by ideal backhaul, such that they can perform coherent transmission. Once TRP1 decides to perform DTS across TRP1 and TRP2 to serve UE1, TRP1 may send a notification to UE1 and ask UE1 to measure all the first stage DCIs to determine the quality of all coarse beams from TRP2 to determine the quality of each of the coarse beams from TRP2. If there is a coarse beam qualified for transmission, UE1 may further measure the refine beams that belong to the coarse beam group from TRP2 and determine whether there are any refine beams qualified for transmission. If a qualified refine beam (e.g., refine beam 2-2) is found, TRP1 may send the scheduling information to TRP2 and notify UE1 that DTS is to start. During DTS, UE1 not only needs to detect scheduling and other control information in the DCI, but also needs to periodically monitor the beam quality of refine beam 2-2 from TRP2 and refine beam 1-1 from TRP1, and to send measurement reports to TRP1. If the beam quality of TRP2 is better than the refine beam 1-1 from TRP1, TRP2 may transmit data to UE1 using refine beam 2-2 in scheduling time unite n+k, as shown in FIG. 17.

Figure 18:
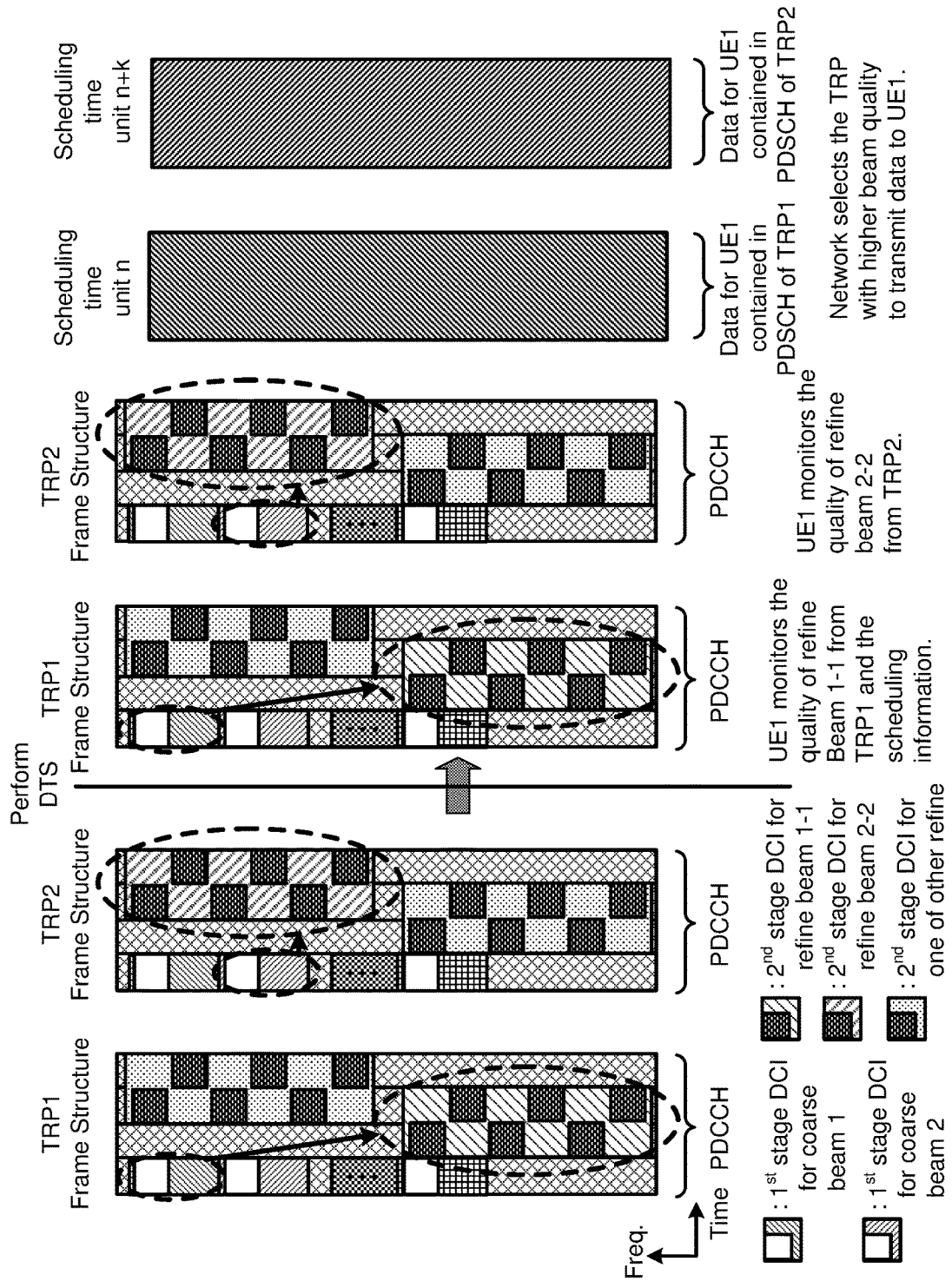
FIG. 18 illustrates exemplary frame structures of TRP1 and TRP2, as shown in FIG. 17, for DTS with beam-specific second stage DCI, in accordance with an exemplary implementation of the present application.

FIG. 18 illustrates exemplary frame structures of TRP1 and TRP2 for DTS with beam-specific second stage DCI, in accordance with one implementation of the present application. In FIG. 18, TRP1, TRP2, coarse beam 1, refine beam 1-1, coarse beam 2, and refine beam 2-2 may substantially correspond to TRP1, TRP2, coarse beam 1, refine beam 1-1, coarse beam 2, and refine beam 2-2, respectively, in FIG. 17. The detailed operations for DTS with beam-specific second stage DCI are further shown in FIGS. 19A, 19B and 19C.

Figure 19A:
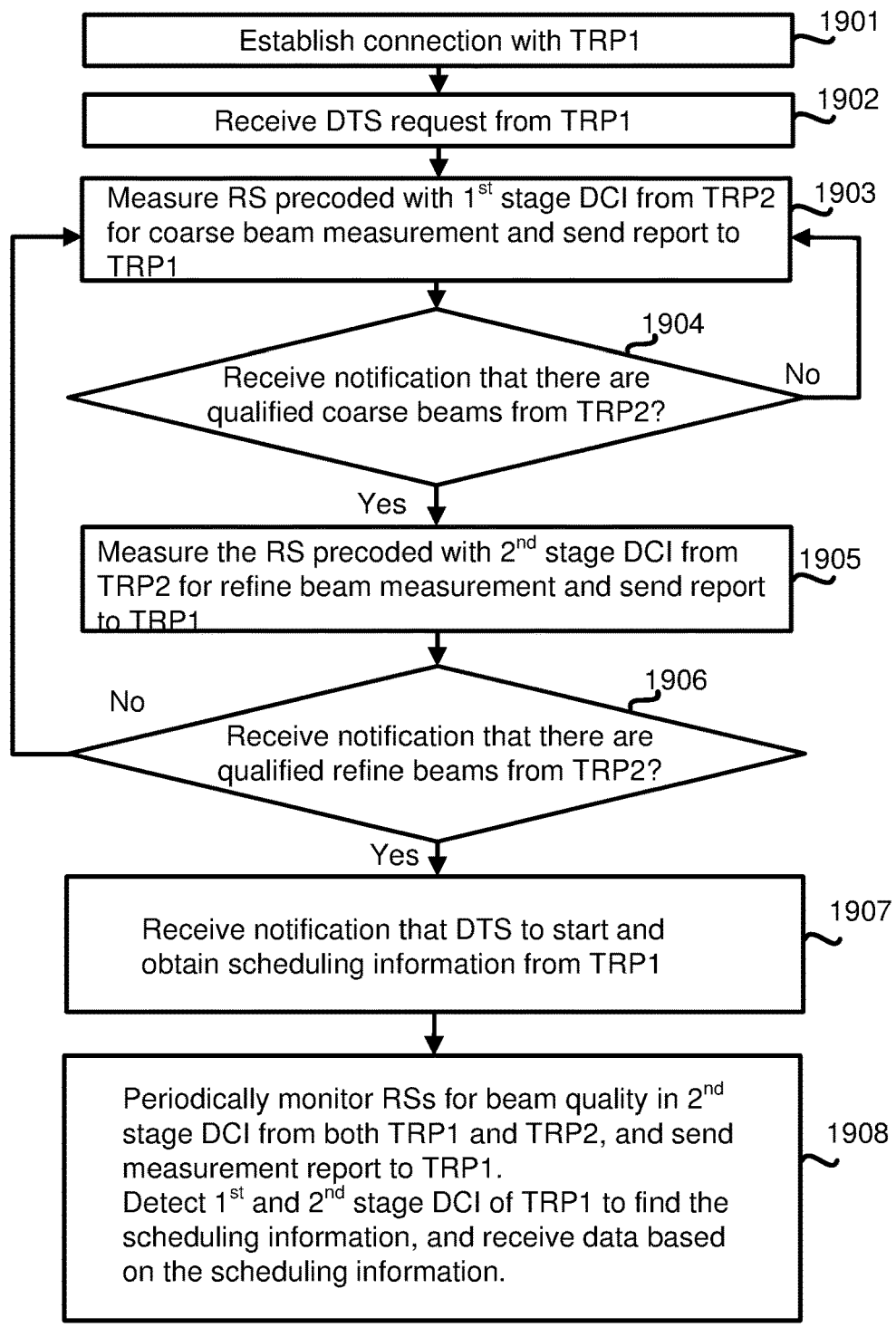
FIGS. 19A, 19B and 19C are diagrams illustrating the detailed operations taken by UE1, TRP1, and TRP2, respectively, as shown in FIG. 17, for DTS with beam-specific second stage DCI, in accordance with exemplary implementations of the present application.

FIG. 19A is a diagram illustrating actions taken by UE1 in FIG. 17 for DTS with beam-specific second stage DCI, in accordance with an exemplary implementation of the present application. As shown in FIG. 19A, in block 1901, with reference to FIG. 17, UE1 establishes a connection with TRP1. TRP1 may desire to start DTS with UE1. TRP1 sends a DTS request to UE1 to ask UE1 to monitor the quality of the coarse beams of TRP2 to find a qualified coarse beam for DTS. In block 1902, UE1 receives the DTS request from TRP1. In block 1903, UE1 detects and measures RSs (e.g., coarse beam RSs) precoded with the first stage DCI in the coarse beams from TRP2, and sends the measurement reports to TRP1. TRP1 may determine whether there are coarse beams qualified for transmission based on the measurement reports from UE1.

Block 1904 determines whether UE1 receives a notification that there are qualified coarse beams from TRP2. If the result of the determination of block 1904 is No, then UE1 returns to block 1903 to monitor coarse beams from TRP2, for example, periodically. If the result of the determination of block 1904 is Yes, then the UE1 receives a notification to enable refine beam measurements. For example, in block 1905, UE1 measures refine beam RSs precoded with second stage DCIs by the information contained in the first stage DCI from TRP2 for refine beam measurements, then sends the measurement reports to TRP1. TRP1 then determines whether TRP2 can support DTS based upon the measurement reports. If there is a qualified refine beam, TRP1 sends a notification of DTS to UE1 and TRP2, and transmits the scheduling information of DTS to UE1 and TRP2.

Block 1906 determines whether UE1 receives a notification from TRP1 indicating there are qualified refine beams from TRP2 for DTS. If the result of determination of block 1906 is No, then UE1 returns to block 1903 to monitor coarse beams from TRP2, for example, periodically. If the result of the determination of block 1906 is Yes, then UE1 receives a notification from TRP1 that DTS is to start, and obtains scheduling information from TRP1, as shown in block 1907.

In block 1908, UE1 obtains scheduling information, refine beam information of TRP1 and TRP2, and CSI-RS configuration from the first stage and the second stage DCIs in TRP1. In the present implementation, although data channel may be transmitted from TRP1 or TRP2, the control information is contained only in TRP1. UE1 may detect data channel of TRP1 or TRP2 depending on the scheduling information from TRP1. During DTS, UE1 needs to periodically monitor the beam quality from both TRP1 and TRP2 by detecting the RSs (e.g., refine beam RSs) in the second stage DCIs, and transmit the measurement reports to TRP1. TRP1 may determine which TRP is better suited for data transmission, and transmit scheduling information to TRP2 and UE1.

Figure 19B:
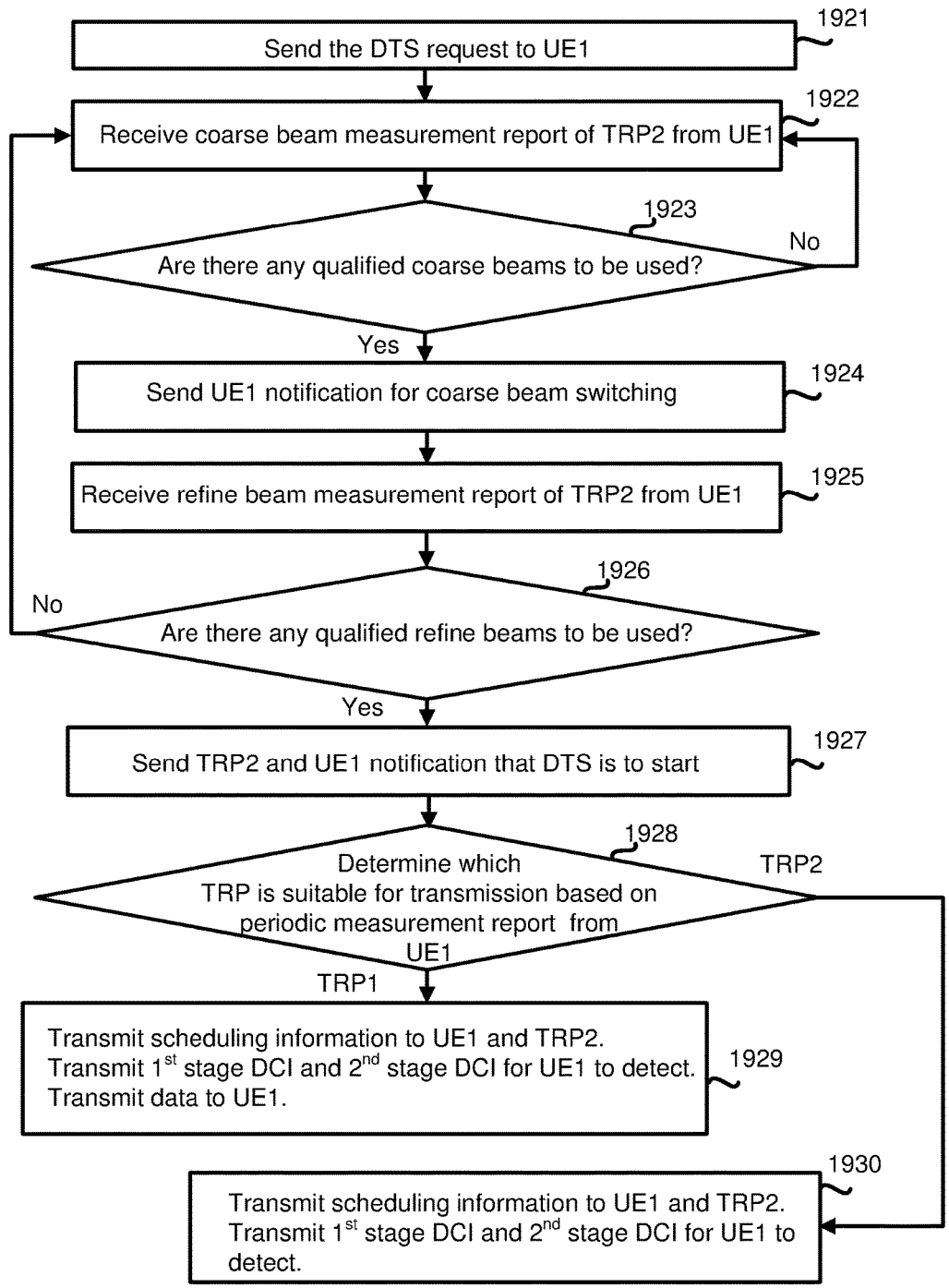

FIG. 19B is a diagram illustrating actions taken by TRP1 in FIG. 12 for DTS with beam-specific second stage DCI, in accordance with an exemplary implementation of the present application. In block 1921, with reference to FIG. 17, TRP1 may desire to start DTS with UE1. TRP1 sends a DTS request to UE1 to ask UE1 to monitor the quality of the coarse beams of TRP2 to find a qualified coarse beam for DTS. In block 1922, TRP1 receives the measurement reports of TRP2 from UE1. In block 1923, TRP1 determines whether there are coarse beams qualified for transmission based on the measurement reports of TRP2 from UE1. If the result of the determination of block 1923 is No, then TRP1 returns to block 1922 to monitor coarse beam measurement reports of TRP2 from UE1. If the result of the determination of block 1923 is Yes, then TRP1 sends UE1 a notification for coarse beam switching to enable refine beam measurement, as shown in block 1924. UE1 measures refine beam RSs precoded with second stage DCIs by the information contained in the first stage DCI from TRP2 for refine beam measurements, then sends the measurement reports to TRP1. In block 1925, TRP1 receives refine beam measurement reports of TRP2 from UE1.

In block 1926, TRP1 determines whether there are any qualified refine beams of TRP2 that can support DTS based upon the measurement report(s). If the result of the determination of block 1926 is No, then TRP1 returns to block 1922 to monitor coarse beam measurement reports of TRP2 from UE1. If the result of the determination of block 1926 is Yes, then TRP1 sends a notification about DTS to UE1 and TRP2, as shown in block 1927.

In block 1928, TRP1 determines which TRP is better suitable for transmission based on measurement reports from UE1, and transmits scheduling information to TRP2 and UE1. If TRP1 is better suitable for transmission, then TRP1 transmits scheduling information of DTS to UE1 and TRP2, as shown in block 1929. Also in block 1929, TRP1 transmits refine beam information of TRP1 and TRP2, and CSI-RS configuration from the first stage and the second stage DCIs in TRP1 to UE1. Although data channel may be transmitted from TRP1 or TRP2, the control information is contained only in TRP1. As TRP1 is better suitable for data transmission, in block 1929, TRP1 transmits data to UE1.

If the result of determination of block 1928 is that TRP2 is better suitable for transmission, then TRP1 transmits scheduling information of DTS to UE1 and TRP2, as shown in block 1930. Also, in block 1930, TRP1 transmits refine beam information of TRP1 and TRP2, and CSI-RS configuration from the first stage and the second stage DCIs in TRP1 to UE1. Although data channel may be transmitted from TRP2, the control information is contained only in TRP1. UE1 may detect data channel of TRP2 according to the scheduling information from TRP1. As TRP2 is better suitable for data transmission, in block 1930, TRP1 does not transmit data to UE1.

Figure 19C:
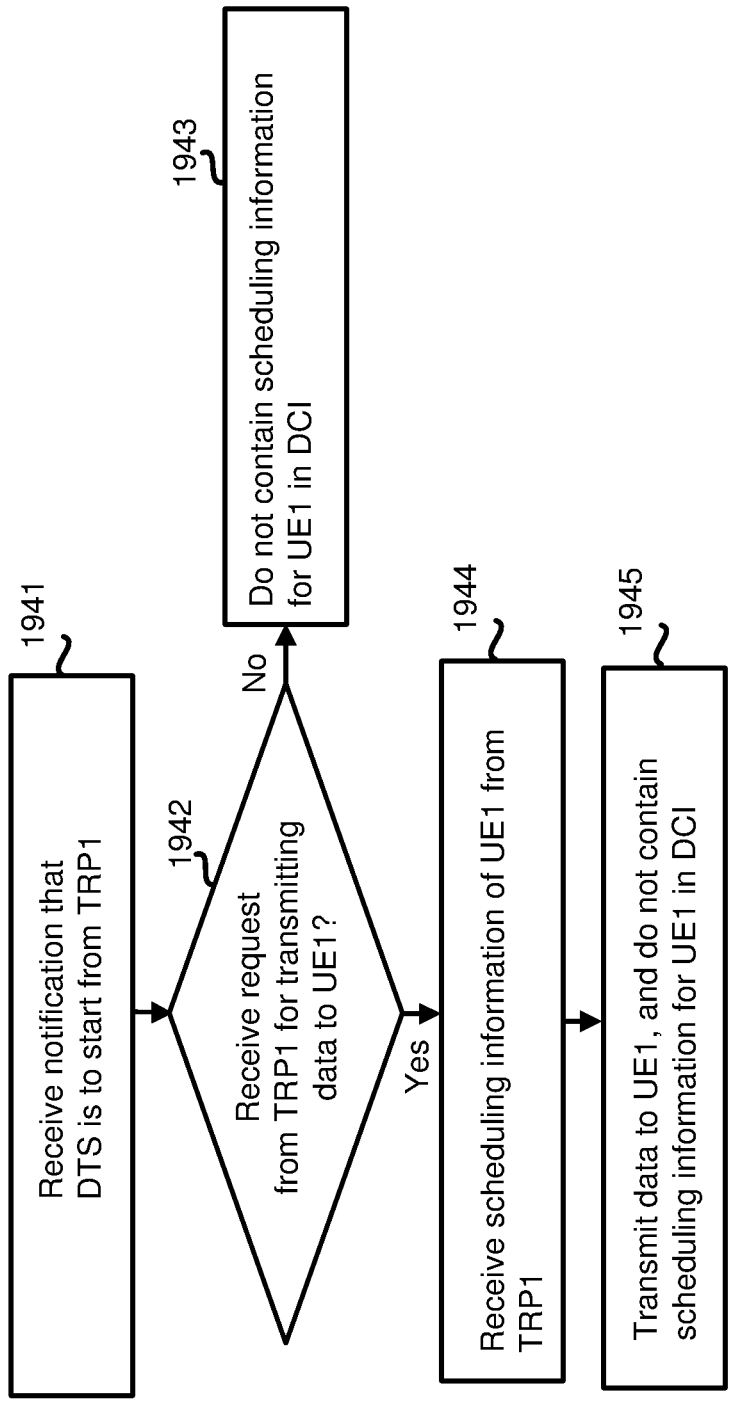

FIG. 19C is a diagram illustrating actions taken by TRP2 in FIG. 17 for DTS with beam-specific second stage DCI, in accordance with an exemplary implementation of the present application. In block 1941, with reference to FIG. 17, TRP2 receives a notification that DTS is to start from TRP1. Since TRP1 determines which TRP is better suitable for transmission based on measurement reports from UE1, in block 1942, TRP2 determines whether it receives a request from TRP1 for transmitting data to UE1. If the result of determination of block 1942 is Yes, which means TRP1 determines that TRP2 is better suitable for transmission, then TRP2 receives scheduling information of DTS from TRP1, as shown in block 1944. In block 1945, TRP2 transmits data to UE1 according to the scheduling information from TRP1. Although data channel may be transmitted from TRP2, the control information is contained only in TRP1. Thus, TRP2 does not contain scheduling information for UE1 in its DCI. If the result of determination of block 1942 is No, which means TRP1 determines that TRP1 is better suitable for transmission, then TRP2 does not transmit data to UE1. Also, TRP2 does not contain scheduling information for UE1 in its DCI.

Example 2: DTS Using UE-Specific Second Stage DCI Configuration

Figure 20:
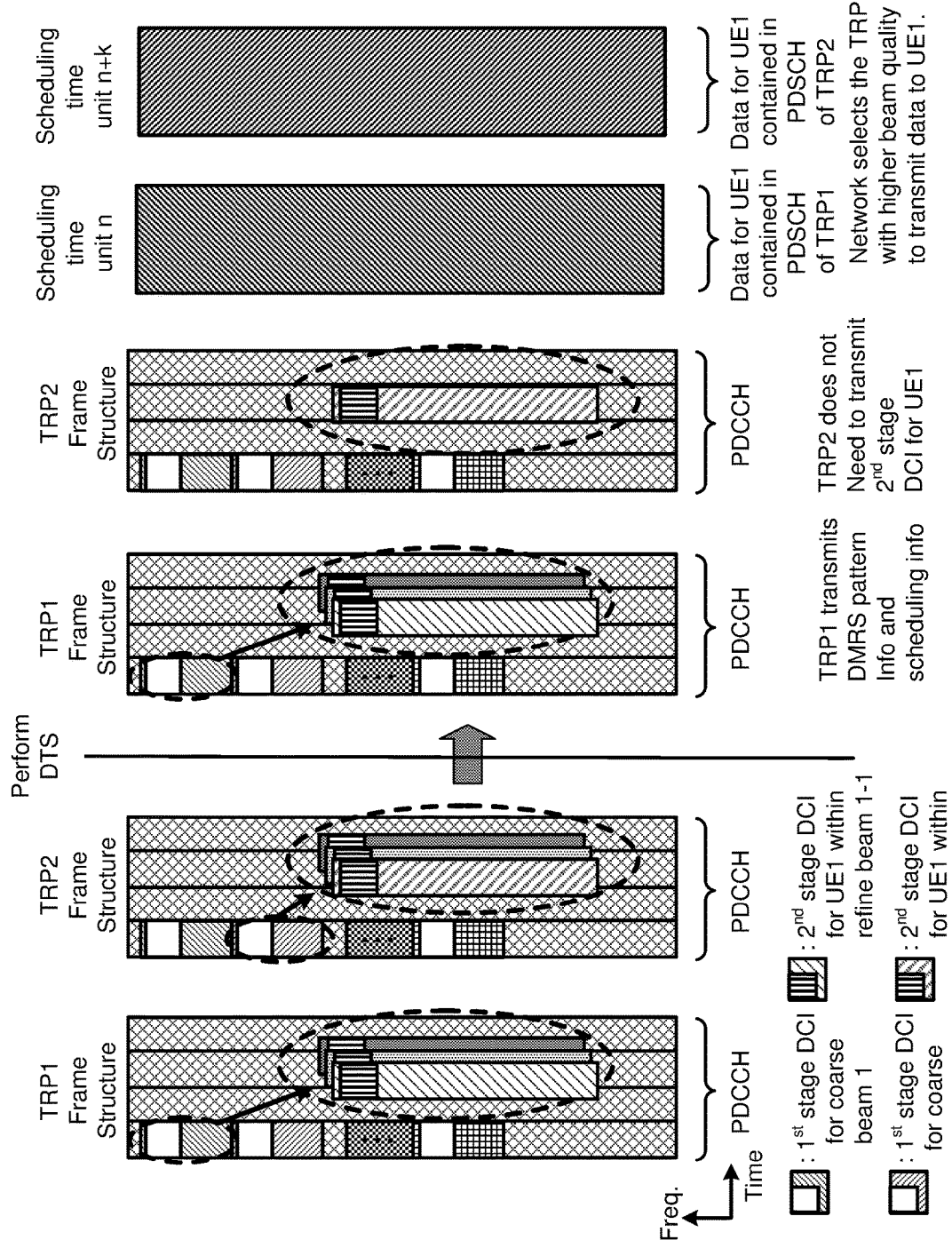
FIG. 20 illustrates exemplary frame structures of TRP1 and TRP2, as shown in FIG. 17, for DTS with UE-specific second stage DCI, in accordance with an exemplary implementation of the present application.

FIG. 20 illustrates exemplary frame structures of TRP1 and TRP2 for DTS with UE-specific second stage DCI, in accordance with an exemplary implementation of the present application. In FIG. 20, TRP1, TRP2, coarse beam 1, refine beam 1-1, coarse beam 2, and refine beam 2-2 may substantially correspond to TRP1, TRP2, coarse beam 1, refine beam 1-1, coarse beam 2, and refine beam 2-2, respectively, in FIG. 17. The detailed operations for DTS with UE-specific second stage DCI are further shown in FIGS. 21A, 21B and 21C.

The measurement procedures for DTS using UE-specific second stage DCI configuration may be substantially similar to DTS using beam-specific second stage DCI configuration except, for example, how to measure link quality toward PDSCH during DTS. In DTS using UE-specific second stage DCI configuration, TRP2 does not transmit UE1 specific second stage DCI. That is, UE1 only needs to receive the data channel from TRP2. Since UE1 needs to monitor the data channel quality in both TRP1 and TRP2, TRP1 needs to transmit scheduling information, DMRS pattern combination of TRP1 and TRP2, CSI RS configuration of both TRP1 and TRP2 from the first stage and the second stage DCIs in TRP1. UE1 needs to send CSI RS measurement report to TRP1. TRP1 determines which TRP is suitable for data transmission, and then transmits the scheduling information to UE1 and TRP2.

Figure 21A:
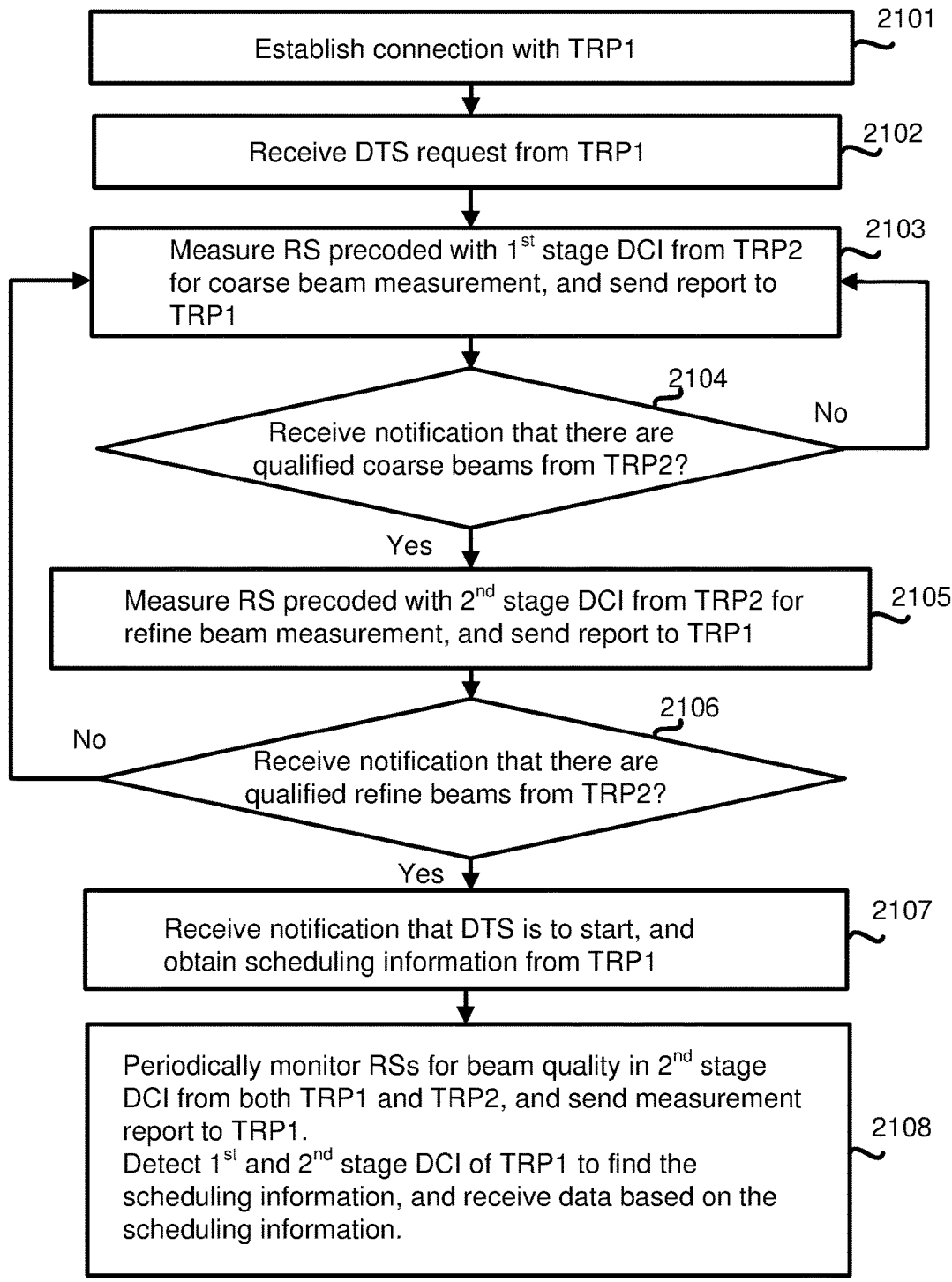
FIGS. 21A, 21B and 21C are diagrams illustrating the detailed operations taken by UE1, TRP1, and TRP2, respectively, as shown in FIG. 17, for DTS with UE-specific second stage DCI, in accordance with exemplary implementations of the present application.

FIG. 21A is a diagram illustrating actions taken by UE1 in FIG. 17 for DTS with UE-specific second stage DCI, in accordance with an exemplary implementation of the present application. As shown in FIG. 21A, blocks 2101, 2102, 2103, 2104, 2105, 2106, and 2107, may be substantially similar to blocks 1901, 1902, 1903, 1904, 1905, 1906, and 1907, respectively, in FIG. 19A. In block 2108, UE1 receives scheduling information, DMRS patterns of TRP1 and TRP2, and CSI-RS configurations of TRP1 and TRP2 from the first stage and the second stage DCIs from TRP1, and sends measurement reports to TRP1. Although the data channel may be transmitted from either TRP1 or TRP2, the control information is contained only from TRP1. UE1 may detect the data channel of TRP1 or TRP2 depending on the scheduling information from TRP1. Also, during DTS, UE1 may periodically monitor the beam quality from both TRP1 and TRP2 by detecting the CSI-RS, and transmits the measurement reports to TRP1. TRP1 then determines which TRP is better suitable for data transmission, and transmits the scheduling information to TRP2 and UE1.

Figure 21B:
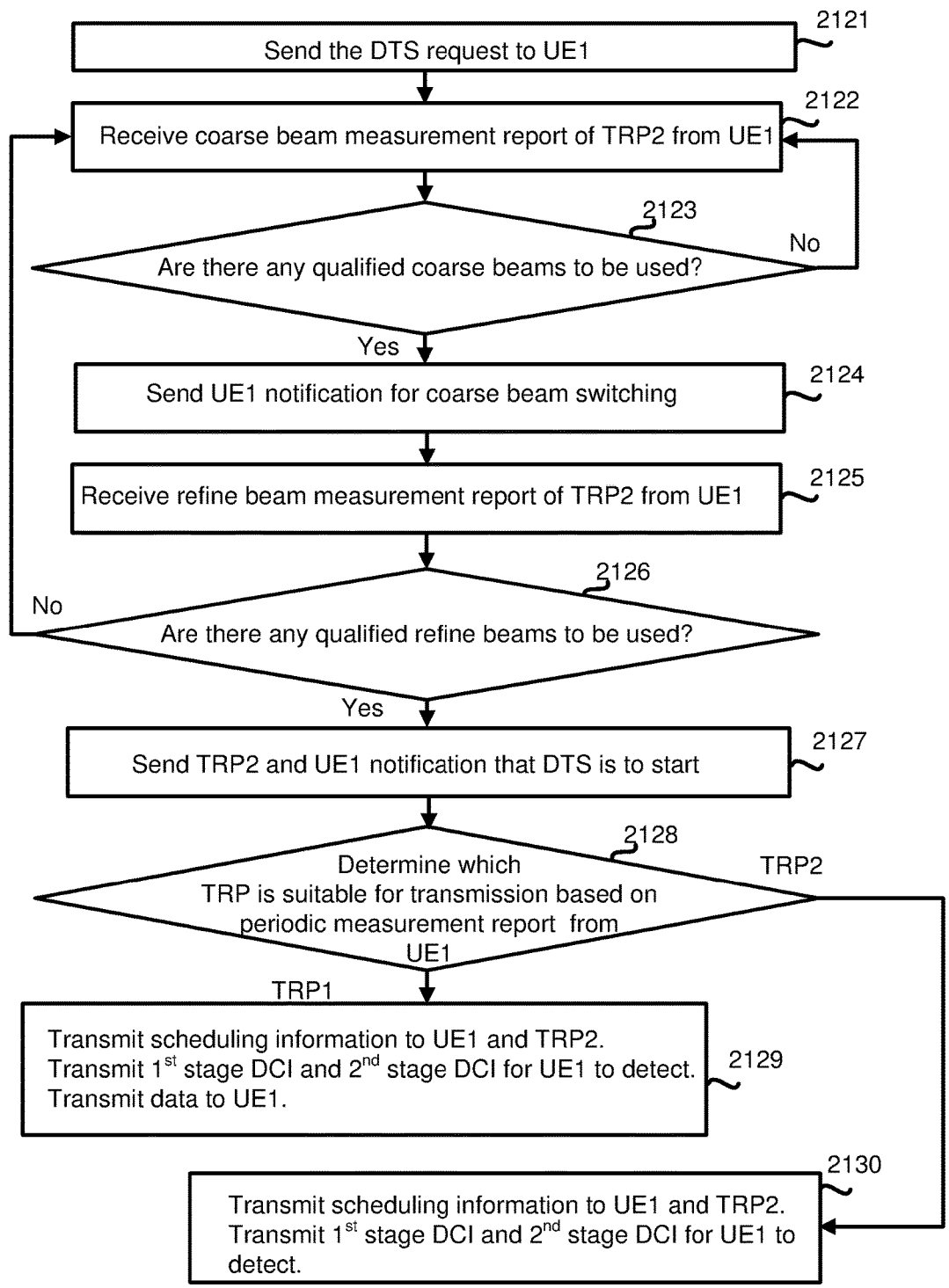

FIG. 21B is a diagram illustrating actions taken by TRP1 in FIG. 17 for DTS with UE-specific second stage DCI, in accordance with an exemplary implementation of the present application. As shown in FIG. 21B, blocks 2121, 2122, 2123, 2124, 2125, 2126, 2127, 2128, 2129, and 2130, may be substantially similar to blocks 1921, 1922, 1923, 1924, 1925, 1926, 1927, 1928, 1929, and 1930, respectively, in FIG. 19B.

Figure 21C:
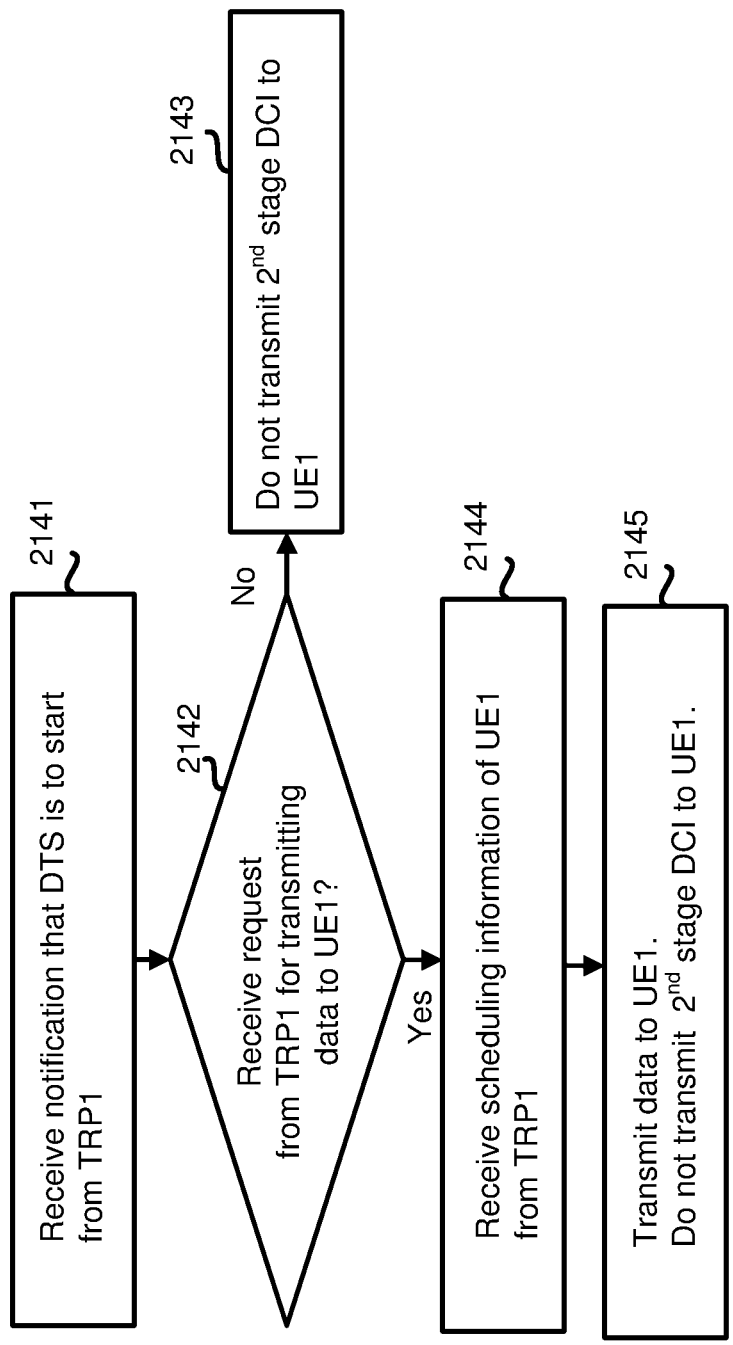

FIG. 21C is a diagram illustrating actions taken by TRP2 in FIG. 17 for DTS with UE-specific second stage DCI, in accordance with an exemplary implementation of the present application. In block 2141, with reference to FIG. 17, TRP2 receives a notification that DTS is to start from TRP1. TRP1 determines which TRP is better suitable for transmission based on measurement reports from UE1. In block 2142, TRP2 determines whether it receives a request form TRP1 for transmitting data to UE1. If the result of determination of block 2142 is Yes, which means TRP1 determines that TRP2 is better suitable for transmission, then TRP2 receives scheduling information of DTS from TRP1, as shown in block 2144. In block 2145, TRP2 transmits data to UE1 according to the scheduling information from TRP1. Although data channel may be transmitted from TRP2, the control information is contained only in TRP1. Thus, TRP2 does not transmit second stage DCI to UE1. If the result of determination of block 2142 is No, which means TRP1 determines that TRP1 is better suitable for transmission, then TRP2 does not transmit data to UE1. Also, TRP2 does not transmit second stage DCI to UE1.

Case 2.3—Coordinated Schedule and Coordinated Beamforming (CS/CB)

Example 1: CS/CB Using Beam-Specific Second Stage DCI Configuration

Figure 22:
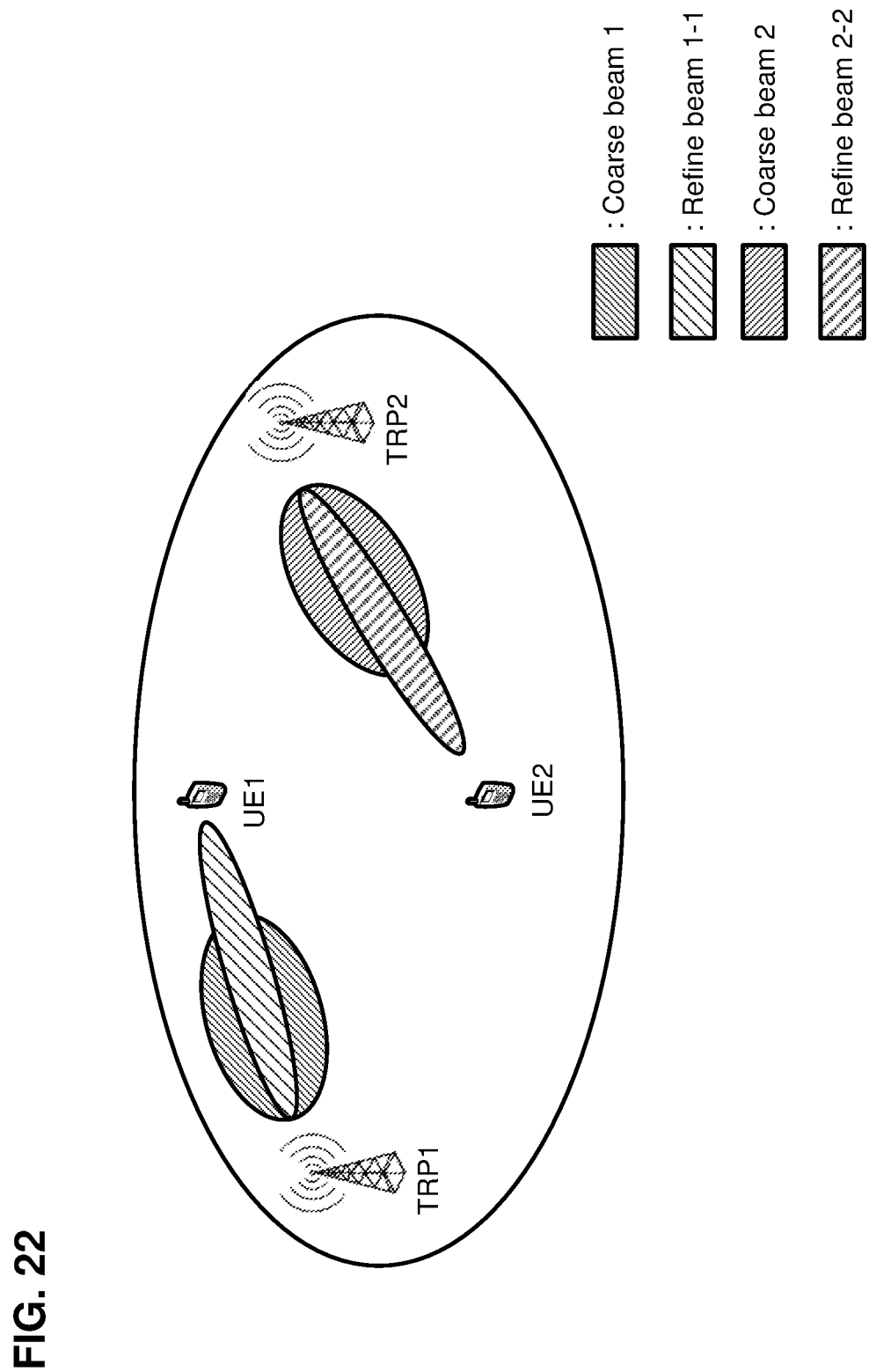
FIG. 22 is a diagram illustrating an exemplary network architecture of Coordinated Schedule and Coordinated Beamforming (CS/CB) as an example of a coordinated communication scheme, in accordance with an exemplary implementation of the present application.

FIG. 22 is a diagram illustrating an exemplary network architecture of Coordinated Schedule and Coordinated Beamforming as an example of a coordinated communication scheme, in accordance with an exemplary implementation of the present application. In FIG. 22, TRP1 and TRP2 are located in a cell of a base station (e.g., a gNB), where UE1 is served by TRP1, and UE2 is served by TRP2. In the present implementation, once TRP1 decides to perform CS/CB across TRP1 and TRP2, TRP1 may send a notification to UE1 to ask UE1 to measure all the first stage DCIs to determine the quality of all coarse beams from TRP2. TRP1 selects the weakest coarse beam and sends a notification to UE1 for further measurements. For example, in FIG. 22, coarse beam 2 may cause the least interference to UE1. As such, TRP1 may ask UE1 to further measure all refine beams belonging to coarse beam group 2. After UE1 measures all the refine beams that belong to coarse beam group 2, UE1 may send the measurement reports to TRP1. Based upon the measurement reports, TRP1 may transmit scheduling information to TRP2 and UE1. During CS/CB, TRP2 may allocate the second stage DCI within a beam (e.g., refine beam 2-2) causing the least interference to UE1 to the same location as the second stage DCI within the beam used by TRP1 for serving UE1. In addition, TRP2 may allocate data transmitted with refine beam 2-2 to the same resource (e.g., time and/or frequency) location as the data transmitted with refine beam 1-1 from TRP1 to UE1 to minimize interference. It is noted that TRP2 may allocate the data transmitted within refine beam 2-2 to the same resource location as the data transmitted from TRP1 to its other serving UEs as well. UE1 may monitor the RSs in the second stage DCI from TRP1 for interference measurement and send the measurement report to TRP1 to adjust scheduling of TRP2 and TRP1.

Figure 23:
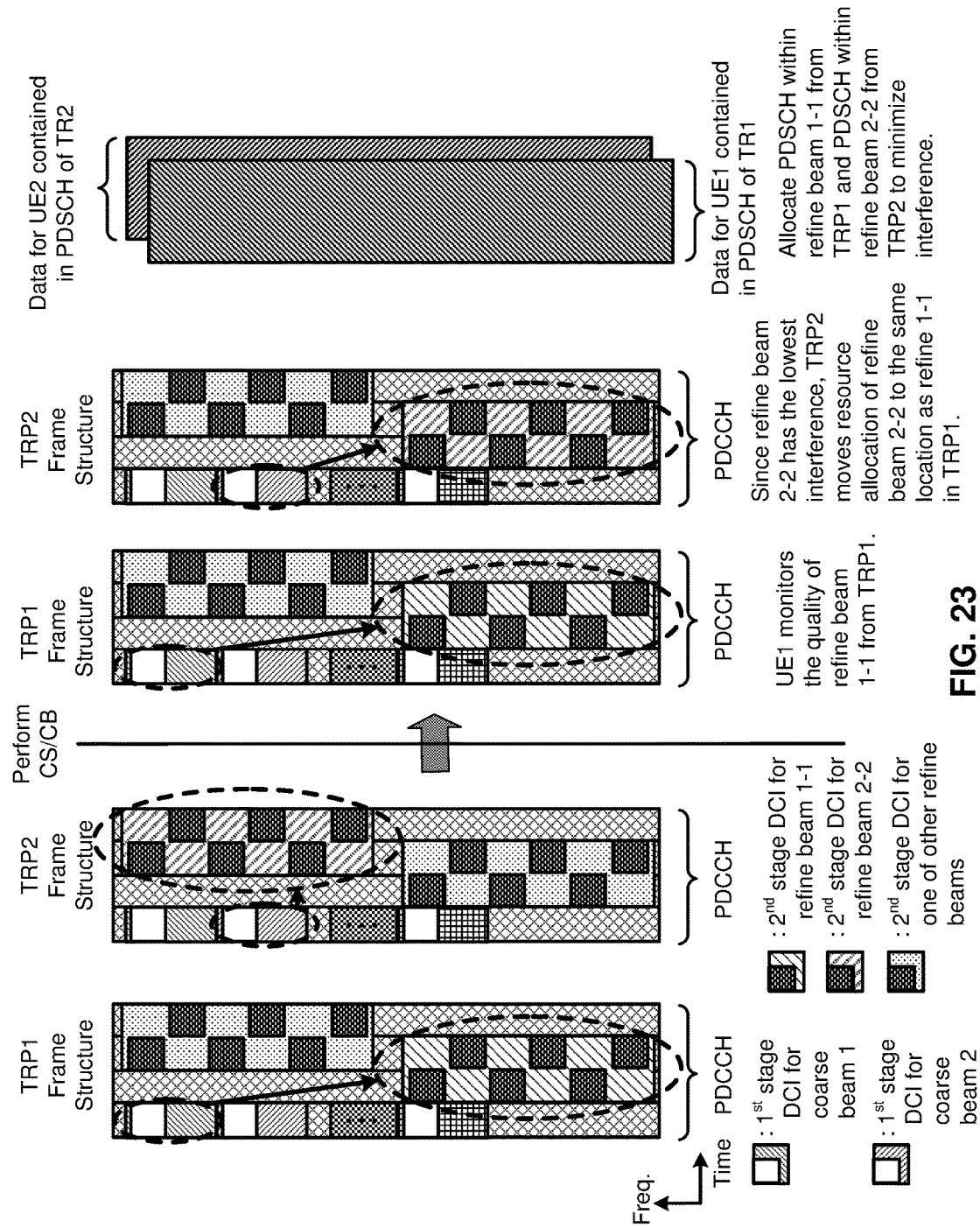
FIG. 23 illustrates exemplary frame structures of TRP1 and TRP2, as shown in FIG. 22, for CS/CB with beam-specific second stage DCI, in accordance with an exemplary implementation of the present application.

FIG. 23 illustrates exemplary frame structures of TRP1 and TRP2 for CS/CB with beam-specific second stage DCI, in accordance with one implementation of the present application. In FIG. 23, TRP1, TRP2, UE1, UE2, coarse beam 1, refine beam 1-1, coarse beam 2, and refine beam 2-2 may substantially correspond to TRP1, TRP2, UE1, UE2, coarse beam 1, refine beam 1-1, coarse beam 2, and refine beam 2-2, respectively, in FIG. 22. The detailed operations for CS/CB with beam-specific second stage DCI are further shown in FIGS. 24A, 24B and 24C.

Figure 24B:
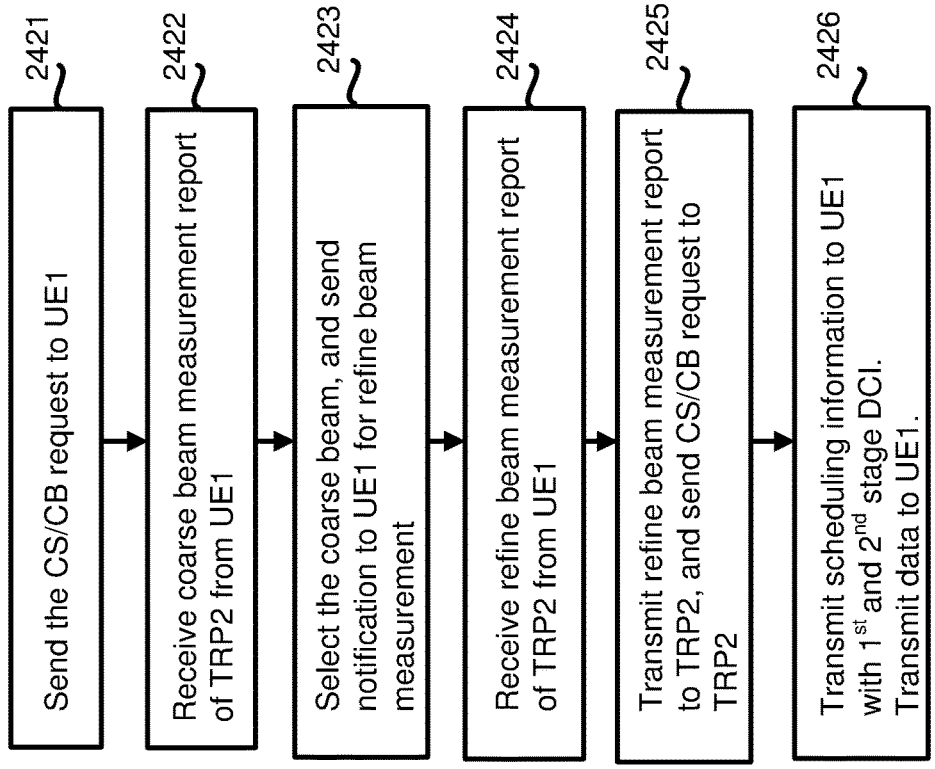
FIGS. 24A, 24B and 24C are diagrams illustrating the detailed operations taken by UE1, TRP1, and TRP2, respectively, as shown in FIG. 22, for CS/CB with beam-specific second stage DCI, in accordance with exemplary implementations of the present application.
Figure 24A:
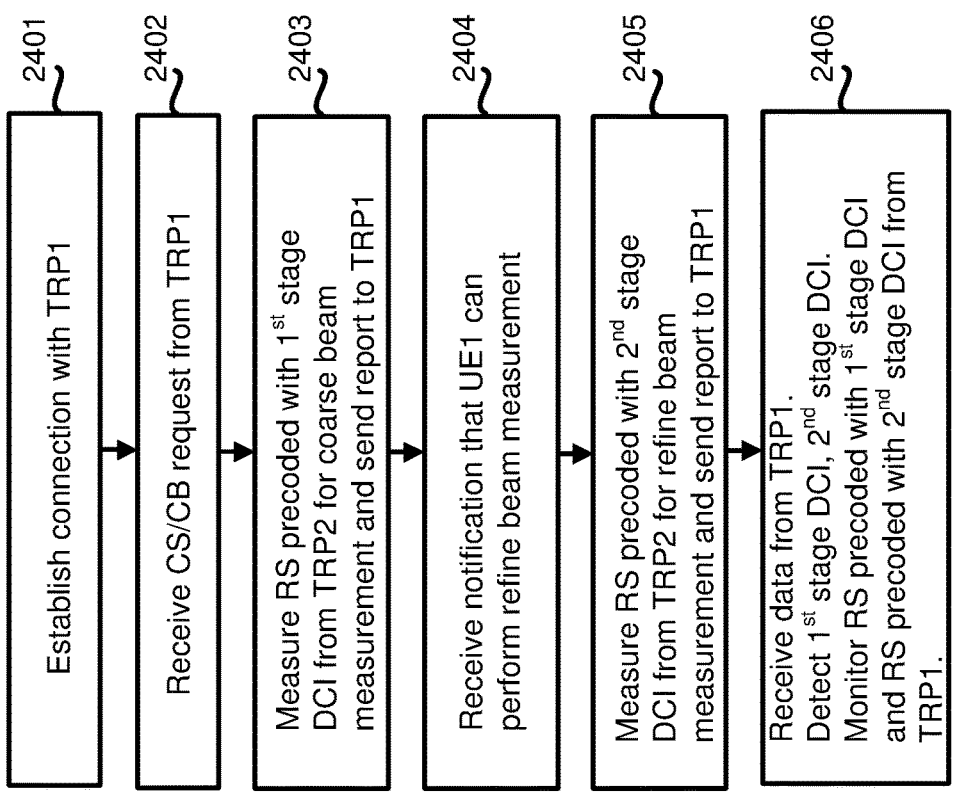

FIG. 24A is a diagram illustrating actions taken by UE1 in FIG. 22 for CS/CB with beam-specific second stage DCI, in accordance with an exemplary implementation of the present application. As shown in FIG. 24A, in block 2401, with reference to FIG. 22, UE1 establishes a connection with TRP1. TRP1 may desire to start CS/CB with UE1. TRP1 sends a CS/CB request to UE1 to ask UE1 to monitor the quality of the coarse beams of TRP2 to find a qualified coarse beam for CS/CB. In block 2402, UE1 receives the CS/CB request from TRP1. In block 2403, UE1 detects and measures RSs (e.g., coarse beam RSs) precoded with the first stage DCI in the coarse beams from TRP2, and sends the measurement reports to TRP1. TRP1 may select the coarse beam with the least interference based upon the measurement reports, and sends a notification to UE1 to further measure refine beams in the selected coarse beam group from TRP2.

In block 2404, UE1 receives the notification from TRP1 to measure refine beams in the selected coarse beam group from TRP2. In block 2405, UE1 measures the beam quality of all of the refine beams in the selected coarse beam group from TPR2. UE1 detects the refine beam RSs in the second stage DCI by the information contained in the first stage DCI from TRP2, and sends measurement reports to TRP1. TRP1 then selects a refine beam with the least interference based upon the measurement reports. TRP1 sends scheduling information to UE1 and TRP2. TRP2 allocates the second stage DCI within refine beam 2-2 to the same location as the second stage DCI within refine beam 1-1 in TRP1 to minimize interference. TRP2 may only transmit data and control channel for UE2 within refine beam 2-2. That is, UE1 does not need to detect DCI of TRP2. UE1 may obtain scheduling information, refine beam information of TRP1 and TRP2, and CSI RS configuration from the first and second stage DCI in TRP1. UE1 may only receive data channel from TRP1, and the control information of UE1 may be contained only in TRP1.

In block 2406, during CS/CB, UE1 receives data from TRP1. UE1 also needs to periodically monitor the beam quality from TRP1 by detecting the RSs in the first stage and second stage DCIs from TRP1, and transmits measurement reports to TRP1. TRP1 may determine whether the transmission from TRP2 is harmless (or having the least interference) to the transmission of UE1 based upon the measurement report. If the interference from refine beam 2-2 of TRP2 becomes severe, TRP1 may adjust the scheduling of TRP2 and UE1. For example, TRP1 may try to find another coarse beam and/or refine beam of TRP2 to perform CS/CB.

FIG. 24B is a diagram illustrating actions taken by TRP1 in FIG. 22 for CS/CB with beam-specific second stage DCI, in accordance with an exemplary implementation of the present application. In block 2421, with reference to FIG. 22, TRP1 may desire to start CS/CB with UE1. TRP1 sends a CS/CB request to UE1 to ask UE1 to monitor the quality of the coarse beams of TRP2 to find a qualified coarse beam for CS/CB. In block 2422, TRP1 receives the coarse beam measurement reports of TRP2 from UE1. In block 2423, TRP1 selects a coarse beam qualified for transmission based on the measurement reports of TRP2 from UE1, and send a notification to UE1 for refine beam measurements. In block 2424, TRP1 receives the refine beam measurement reports of TRP2 from UE1. In block 2425, TRP1 then selects a refine beam with the least interference based upon the measurement reports, and transmits refine beam measurement report to TRP2. TRP1 also sends a CS/CB request to TRP2. In block 2426, TRP1 then transmits scheduling information and the first and second stage DCIs to UE1. In block 2426, TRP1 also transmits data to UE1.

During CS/CB, TRP1 may determine whether the transmission from TRP2 is harmless (or having the least interference) to the transmission of UE1 based upon the measurement reports. If the interference from refine beam 2-2 of TRP2 becomes severe, TRP1 may adjust the scheduling of TRP2 and UE1. For example, TRP1 may try to find another coarse beam and/or refine beam of TRP2 to perform CS/CB.

Figure 24C:
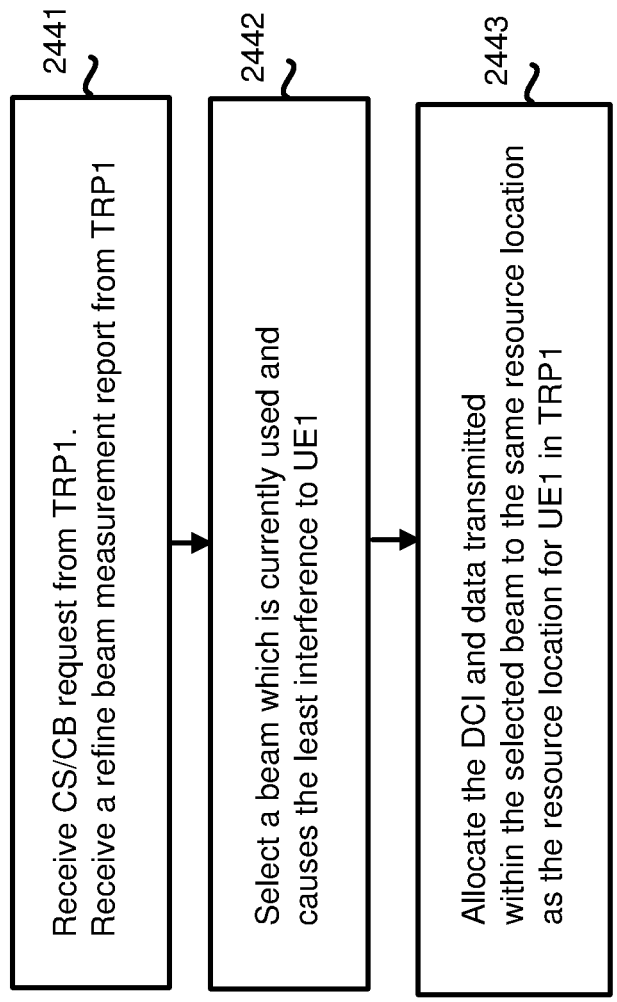

FIG. 24C is a diagram illustrating actions taken by TRP2 in FIG. 22 for CS/CB with beam-specific second stage DCI, in accordance with an exemplary implementation of the present application. In block 2441, with reference to FIG. 22, TRP2 receives a CS/CB request from TRP1. TRP2 also receives a refine beam measurement report from TRP1. In block 2442, based on the refine beam measurement report from TRP1, TRP2 selects a beam which causes the least interference to UE1. In block 2443, TRP2 allocates the second stage DCI within refine beam 2-2 to the same location as the second stage DCI within refine beam 1-1 in TRP1 to minimize interference. TRP2 may only transmit data and control channel for UE2 within refine beam 2-2. That is, UE1 does not need to detect DCI of TRP2. UE1 may obtain scheduling information, refine beam information of TRP1 and TRP2, and CSI RS configuration from the first and second stage DCI in TRP1.

Example 2: CS/CB Using UE-Specific Second Stage DCI Configuration

Figure 25:
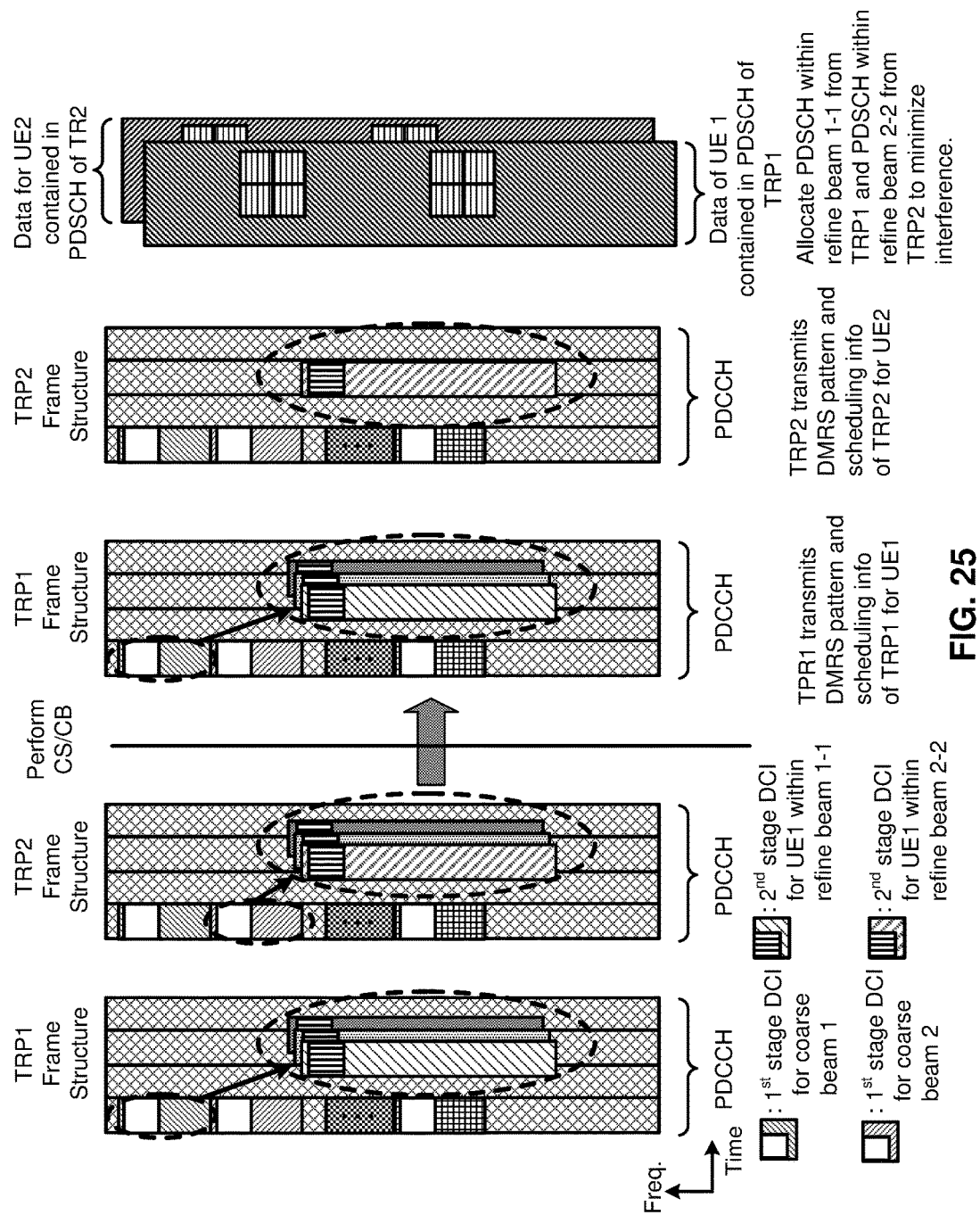
FIG. 25 illustrates exemplary frame structures of TRP1 and TRP2, as shown in FIG. 22, for CS/CB with UE-specific second stage DCI, in accordance with an exemplary implementation of the present application.

FIG. 25 illustrates exemplary frame structures of TRP1 and TRP2 for CS/CB with UE-specific second stage DCI, in accordance with one implementation of the present application. In FIG. 25, TRP1, TRP2, UE1, UE2, coarse beam 1, refine beam 1-1, coarse beam 2, and refine beam 2-2 may substantially correspond to TRP1, TRP2, UE1, UE2, coarse beam 1, refine beam 1-1, coarse beam 2, and refine beam 2-2, respectively, in FIG. 22. The detailed operations for CS/CB with UE-specific second stage DCI are further shown in FIGS. 26A, 26B and 26C. The measurement procedures for CS/CB using UE-specific second stage DCI configuration are substantially similar to CS/CB using beam-specific second stage DCI configuration except, for example, the actions in which TRP1 suggests TRP2 to use a specific refine beam for minimizing interference. In CS/CB using UE-specific second stage DCI configuration, TRP1 and TRP2 allocate their data channel with selected refine beam to the same resource. For example, the data to UE1 within refine beam 1-1 and the data to UE2 within refine beam 2-2 may be transmitted at the same time and frequency. Since TRP2 does not carry any control information or data channel for UE1, UE1 does not need to detect DCI from TRP2. UE1 may monitor the RS in the second stage DCI from TRP1 for interference measurements, and send the measurement report to TRP1 to adjust the scheduling of TRP2 and TRP1.

Figure 26A:
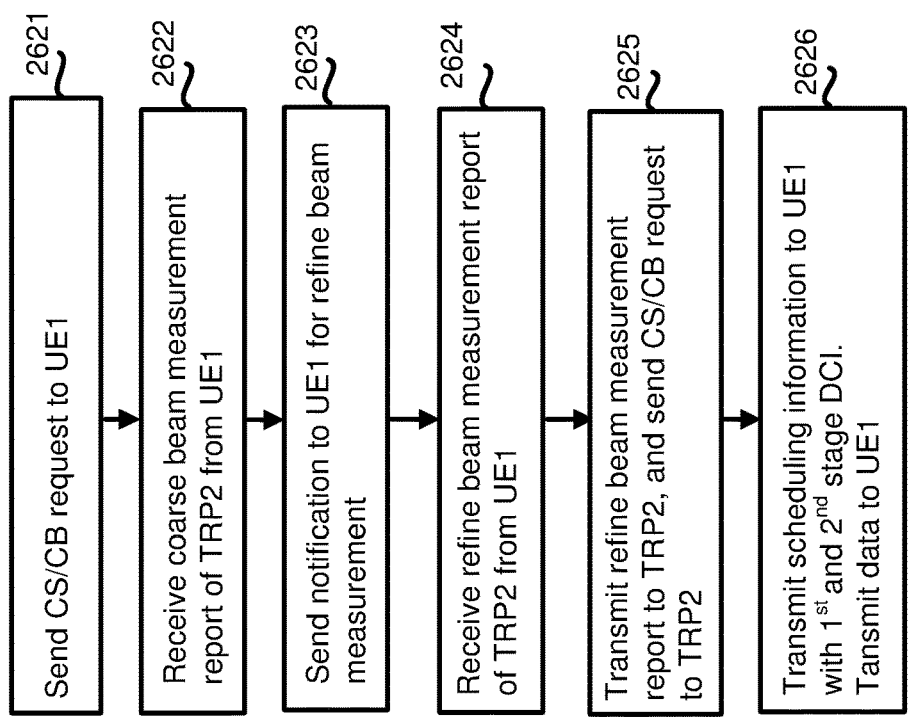
FIGS. 26A, 26B and 26C are diagrams illustrating the detailed operations taken by UE1, TRP1, and TRP2, respectively, as shown in FIG. 22, for CS/CB with UE-specific second stage DCI, in accordance with exemplary implementations of the present application.

FIG. 26A is a diagram illustrating actions taken by UE1 in FIG. 22 for CS/CB with UE-specific second stage DCI, in accordance with an exemplary implementation of the present application. As shown in FIG. 26A, blocks 2601, 2602, 2603, 2604, and 2605, may be substantially similar to blocks 2401, 2402, 2403, 2404, and 2405, respectively, in FIG. 24A. In block 2606, UE1 obtains scheduling information, DMRS pattern of TRP1, and CSI-RS configuration of TRP1 from the first stage and the second stage DCIs in TRP1. Data channel and control information of UE1 are transmitted from TRP1.

During CS/CB, UE1 needs to periodically monitor the beam quality from TRP1 by detecting the CSI RS data channel, and transmit the measurement reports to TRP1. TRP1 then determines whether the transmission from TRP2 is harmless (or having the least interference) to the transmission from TRP1 to UE1. If the interference from refine beam 2-2 of TRP2 become severe, TRP1 may adjust the scheduling of TRP2 and UE1. For example, TRP1 may attempt to find another beam (e.g., another coarse and/or refine beam) of TRP2 to perform CS/CB.

Figure 26B:
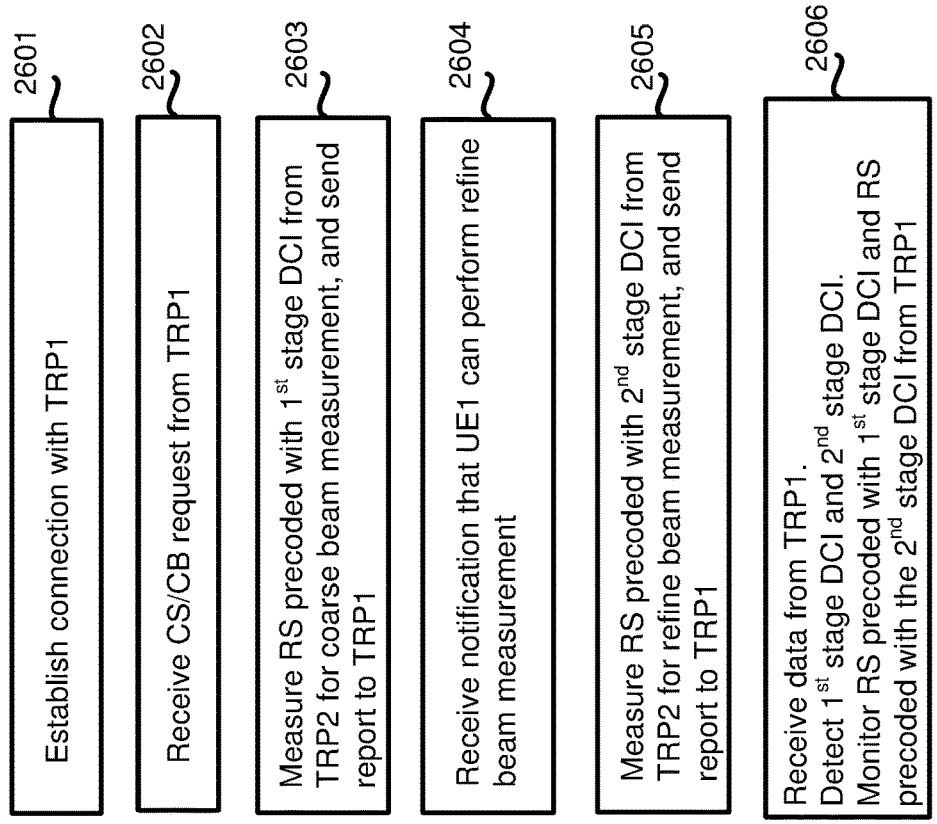

FIG. 26B is a diagram illustrating actions taken by TRP1 in FIG. 22 for CS/CB with UE-specific second stage DCI, in accordance with an exemplary implementation of the present application. As shown in FIG. 26B, blocks 2621, 2622, 2623, 2624, and 2606 may be substantially similar to blocks 2421, 2422, 2423, 2424, and 2426, respectively, in FIG. 24B. In action 2625, in the CS/CB request to TRP2, TRP1 may suggests TRP2 to use a specific refine beam for minimizing interference.

Figure 26C:
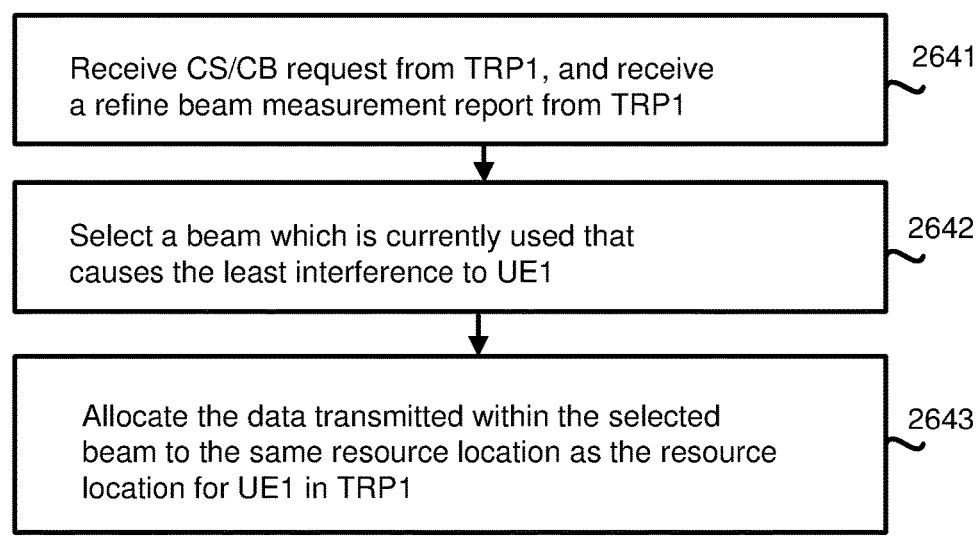

FIG. 26C is a diagram illustrating actions taken by TRP1 in FIG. 22 for CS/CB with UE-specific second stage DCI, in accordance with an exemplary implementation of the present application. As shown in FIG. 26C, blocks 2641 and 2642 may be substantially similar to blocks 2441 and 2442, respectively, in FIG. 24C. In block 2643, TRP2 allocates the data transmitted with the selected beam to the same resource location as the resource location for UE1 in TRP1.

In comparison to CS/CB using beam-specific second stage DCI configuration, for CS/CB using UE-specific second stage DCI configuration, UE1 obtains scheduling information, DMRS pattern of TRP1, and CSI RS configuration of TRP1 from the first stage and the second stage DCIs in TRP1. Data channel and control information of UE1 are transmitted from TRP1. TRP2 does not contain data and control information for UE1, but allocates data channel for UE2 transmitted within refine beam 2-2 to the same location as data channel transmitted within refine beam 1-1 from TRP1 to minimize interference to UE1. Also, during CS/CB, UE1 needs to periodically monitor the beam quality from TRP1 by detecting the CSI RS data channel, and transmits the measurement report to TRP1. TRP1 then determines whether the transmission from TRP2 is harmless (or having the least interference) to the transmission from TRP1 to UE1. If the interference from refine beam 2-2 of TRP2 become severe, TRP1 may adjust the scheduling of TRP2 and UE1. For example, TRP1 may attempt to find another beam (e.g., another coarse and/or refine beam) of TRP2 to perform CS/CB.

It should be noted that in implementations of the present application, the TRPs (e.g., TRP1 and TRP2) are controlled by their corresponding base stations (e.g., gNBs), where the scheduling information and resource allocation may be decided by the base stations and transmitted to the corresponding TRPs.

What is claimed is:

1. A method of communicating downlink control information (DCI) from a transmit/receipt point (TRP) to a user equipment (UE), the method comprising:
   transmitting a first stage DCI and a reference signal (RS) by a coarse beam, the first stage DCI comprising a first portion of control information in the DCI;
   transmitting a second stage DCI by a refine beam, the second stage DCI comprising a second remaining portion of the control information in the DCI;
   wherein the first stage DCI includes information identifying the second stage DCI.

2. The method of claim 1, wherein the second stage DCI includes one of beam-specific second stage DCI and UE-specific second stage DCI.

3. The method of claim 1, wherein the first stage DCI contains the refine beam information for receiving the second stage DCI.

4. The method of claim 1, wherein the first stage DCI includes at least one of:
   (a) a beam index;
   (b) a number of antenna ports for refine beams;
   (c) a configuration of the second stage DCI, wherein:
   when the second stage DCI is beam-specific, the first stage DCI contains the information of the refine beam;
   when the second stage DCI is UE-specific, the first stage DCI contains a specific refine beam index and resource allocation for the specific refine beam.

5. The method of claim 1, wherein the second stage DCI comprises beam-specific second stage DCI that contains at least one of:
   (a) a number of serving UEs;
   (b) a Channel State Information (CSI) reference signal (RS) configuration and resource allocation information for data channel for each UE, the CSI RS configuration having CSI RS resource and quasi co-location (QCL) information.

6. The method of claim 1, wherein the first stage DCI includes broadcast information.

7. The method of claim 6, wherein the broadcast information includes time critical information.

8. A method for coordinated multi-point (CoMP) transmission/reception operation among a first transmit/receipt point (TRP), a second TRP, and a user equipment (UE), the method comprising:
   measuring a first reference signal precoded with a first stage downlink control information (DCI) in a coarse beam from the second TRP, the first stage DCI comprising a first portion of control information in the DCI;
   measuring a second reference signal precoded with a second stage DCI in a refine beam from the second TRP, the second stage DCI comprising a second remaining portion of the control information in the DCI;
   performing the CoMP transmission/reception operation based on a measurement report of the second reference signal in the refine beam;
   wherein the first stage DCI precoded by the coarse beam from the second TRP includes information identifying the second stage DCI precoded by the refine beam from the second TRP.

9. The method of claim 8, wherein the CoMP transmission/reception operation is a joint transmission (JT) of the first TRP and the second TRP to the UE.

10. The method of claim 9, further comprising:
    receiving data, by the UE, from a refine beam from the first TRP and the refine beam from the second TRP in the same resource;
    monitoring, by the UE, interference between the refine beam from the first TRP and the refine beam from the second TRP by detecting a third reference signal precoded with a second stage DCI of the refine beam from the first TRP, and the second reference signal precoded with the second stage DCI of the refine beam from the second TRP.

11. The method of claim 9, wherein the UE further detects a first stage DCI and a second stage DCI from the first TRP, and monitors a coarse beam reference signal in the first stage DCI and a refine beam reference signal in the second stage DCI from the first TRP.

12. The method of claim 11, wherein the UE further monitors the refine beam reference signal in the second stage DCI of the refine beam from the second TRP.

13. The method of claim 9, wherein the second stage DCI from the second TRP is a beam-specific second stage DCI.

14. The method of claim 9, wherein the second stage DCI from the second TRP is a UE-specific second stage DCI.

15. The method of claim 14, further comprising:
    receiving data, by the UE, from a refine beam from the first TRP and the refine beam from the second TRP in the same resource;
    monitoring, by the UE, interference from the second TRP by configuring Channel State Information Interference Measurement (CSI-IM) for the UE, without a need to detect the second reference signal precoded with the second stage DCI of the refine beam from the second TRP.

16. The method of claim 8, wherein the CoMP transmission/reception operation includes the UE receiving transmission from the first TRP and the second TRP using Dynamic Transceiver Switch (DTS).

17. The method of claim 16, wherein, during the DTS, the UE monitors beam quality from the first TRP and the second TRP by detecting a third reference signal precoded with a second stage DCI of a refine beam from the first TRP, and the second reference signal precoded with the second stage DCI of the refine beam from the second TRP.

18. The method of claim 17, wherein the second stage DCI of the refine beam from the second TRP is a beam-specific second stage DCI.

19. The method of claim 18, wherein the UE further monitors a coarse beam reference signal in the first stage DCI and a refine beam reference signal in the second stage DCI from both the first and second TRPs.

20. The method of claim 16, wherein the second stage DCI from the second TRP is a UE-specific second stage DCI.

21. The method of claim 20, further comprising:
receiving data, by the UE, from the refine beam from the first TRP or the refine beam from the second TRP;
monitoring, by the UE, data channel quality in the first TRP and the second TRP, and transmitting CSI-RS measurement reports to the first TRP.

22. The method of claim 8, wherein the CoMP transmission/reception operation includes the UE receiving transmission from the first TRP and the second TRP using Coordinated Schedule and Coordinated Beamforming (CS/CB).

23. The method of claim 22, wherein the UE monitors a coarse beam reference signal precoded with a first stage DCI and a refine beam reference signal precoded with a second stage DCI from the first TRP, and sends a refine beam reference measurement report to the first TRP.

24. The method of claim 23, wherein the second stage DCI from the second TRP is a beam-specific second stage DCI.

25. The method of claim 24, wherein the second TRP allocates the refine beam second stage DCI to the same resource location as the refine beam second stage DCI of the first TRP.

26. The method of claim 24, wherein the UE monitors beam quality from the first TRP by detecting reference signals precoded with the first stage DCI and the second stage DCI from the first TRP, and transmits measurement reports to the first TRP.

27. The method of claim 22, wherein the second stage DCI from the second TRP is a UE-specific second stage DCI.

28. The method of claim 27, wherein the UE monitors interference from the second TRP, beam quality from the first TRP by detecting CSI-RS data channel, and transmits CSI-RS measurement reports to the first TRP.

* * * * *